US006978572B1

(12) United States Patent
Bernklau et al.

(10) Patent No.: US 6,978,572 B1
(45) Date of Patent: Dec. 27, 2005

(54) METHOD AND DEVICE FOR ATTRACTING INSECTS

(75) Inventors: Elisa J. Bernklau, Bellvue, CO (US); Erich A. Fromm, Greeley, CO (US); Louis B. Bjostad, Bellvue, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 09/831,094
(22) PCT Filed: Nov. 4, 1999
(86) PCT No.: PCT/US99/26074

§ 371 (c)(1),
(2), (4) Date: Nov. 21, 2001

(87) PCT Pub. No.: WO00/27187

PCT Pub. Date: May 18, 2000

Related U.S. Application Data
(60) Provisional application No. 60/107,285, filed on Nov. 6, 1998.

(51) Int. Cl.⁷ .............................. A01M 1/02; A01M 1/20
(52) U.S. Cl. ........................... 43/132.1; 43/107; 43/131
(58) Field of Search ....................... 43/131, 107, 121, 43/124, 152.1; 47/1.01 F, 57.6; 424/405, 84, 410–413; 426/1

(56) References Cited

U.S. PATENT DOCUMENTS

| | | | |
|---|---|---|---|
| 1,599,408 A | 9/1926 | Cardinet | 43/131 |
| 2,763,991 A | 9/1956 | Kennon | 61/13 |
| 4,383,391 A * | 5/1983 | Thomas et al. | 47/57.6 |

(Continued)

FOREIGN PATENT DOCUMENTS

| AU | 731309 | 3/2001 | A01M/1/02 |
|---|---|---|---|
| EP | 580553 A2 | 7/1993 | |
| EP | 0 846 417 | 6/1998 | A01N/45/00 |

(Continued)

OTHER PUBLICATIONS

Nicolas, G. and Sillans, D., "Immediate And Latent Effects of Carbon Dioxide On Insects", Annual Review of Entomology (Jan. 1989), vol. 34, pp. 97–116.*

Bernklau et al., *J. of Econ. Entomology*, 91 (6), pp. 1331–1340 (1998).

Branson, *J. of Kansas Entomological Society*, 62(4), pp. 521–523 (1989).

(Continued)

*Primary Examiner*—Darren W. Ark
(74) *Attorney, Agent, or Firm*—Sheridan Ross P.C.

(57) ABSTRACT

A method and device for attracting insects involving the generation and/or release of particular amounts of carbon dioxide, in combination with an insecticide that does not repel such insects. Particular formulations as well as devices which incorporate such formulations for trapping, attracting and destruction of particular insects, including boring insects, such as termites and corn root worm insects, is set forth. Particular methods of administration of formulations and devices to enhance insect control and to prevent crop damage are disclosed.

141 Claims, 32 Drawing Sheets

U.S. PATENT DOCUMENTS

| | | | |
|---|---|---|---|
| 4,459,334 A | 7/1984 | Blanpied et al. | 428/219 |
| 4,506,473 A | 3/1985 | Waters, Jr. | 43/107 |
| 4,608,774 A * | 9/1986 | Sherman | 43/121 |
| 4,626,528 A | 12/1986 | McHenry | 514/119 |
| 4,692,468 A | 9/1987 | Boisvenue | 514/616 |
| 4,742,060 A | 5/1988 | Shiokawa et al. | 514/252 |
| 5,057,315 A | 10/1991 | Gunner et al. | 424/93 |
| 5,091,436 A | 2/1992 | Frisch et al. | 521/137 |
| 5,112,843 A | 5/1992 | Bjostad, III et al. | 514/375 |
| 5,189,830 A | 3/1993 | Montemurro | 43/121 |
| 5,238,724 A | 8/1993 | Bjostad, III et al. | 424/84 |
| 5,304,566 A | 4/1994 | Ishimitsu et al. | 514/357 |
| 5,329,726 A | 7/1994 | Thorne et al. | 43/124 |
| 5,338,551 A | 8/1994 | Lajoie | 424/717 |
| 5,342,630 A | 8/1994 | Jones | 424/717 |
| 5,346,704 A | 9/1994 | Lajoie | 424/717 |
| 5,389,386 A | 2/1995 | Winston et al. | 424/717 |
| 5,394,643 A * | 3/1995 | Schmittmann | 43/124 |
| 5,415,877 A | 5/1995 | Winston | 424/717 |
| 5,424,270 A | 6/1995 | Winston | 504/101 |
| 5,425,952 A | 6/1995 | Winston | 424/717 |
| 5,432,146 A | 7/1995 | Winston | 504/101 |
| 5,432,147 A | 7/1995 | Winston et al. | 504/101 |
| 5,432,148 A | 7/1995 | Winston | 504/101 |
| 5,439,147 A | 8/1995 | Bitschnau | 222/333 |
| 5,439,945 A | 8/1995 | Smies | 521/50 |
| 5,443,835 A | 8/1995 | Winston | 424/407 |
| 5,464,805 A | 11/1995 | Winston | 504/101 |
| 5,468,715 A | 11/1995 | Joseph et al. | 504/101 |
| 5,468,716 A | 11/1995 | Winston | 504/101 |
| 5,484,587 A * | 1/1996 | Branly et al. | 424/405 |
| 5,496,568 A | 3/1996 | Winston | 424/717 |
| 5,518,986 A | 5/1996 | Winston | 504/101 |
| 5,518,987 A | 5/1996 | Winston | 504/101 |
| 5,571,522 A * | 11/1996 | Munson et al. | 424/405 |
| 5,583,089 A | 12/1996 | Winston | 504/101 |
| 5,607,684 A * | 3/1997 | Lew et al. | 424/405 |
| 5,661,164 A | 8/1997 | Otsu et al. | 514/341 |
| 5,690,951 A * | 11/1997 | Lew et al. | 424/410 |
| 5,707,638 A * | 1/1998 | Losel et al. | 424/405 |
| 5,770,695 A * | 6/1998 | Payne et al. | 530/350 |
| 5,849,320 A * | 12/1998 | Turnblad et al. | 424/410 |
| 5,874,097 A | 2/1999 | Henderson et al. | 424/405 |
| 5,880,142 A | 3/1999 | Otsu et al. | 514/357 |
| 5,965,491 A | 10/1999 | Wu et al. | 504/253 |
| 6,063,734 A | 5/2000 | Ogura et al. | 504/261 |
| 6,071,529 A | 6/2000 | Ballard et al. | 424/408 |
| 6,140,350 A | 10/2000 | Sembo | 514/332 |
| 6,147,062 A * | 11/2000 | Jacobson et al. | 514/118 |
| 6,149,913 A * | 11/2000 | Holmes | 424/84 |
| 6,153,181 A | 11/2000 | Nelson et al. | 424/84 |
| 6,158,166 A * | 12/2000 | Snell et al. | 43/132.1 |
| 6,164,010 A | 12/2000 | Snell et al. | 43/131 |
| 6,174,538 B1 * | 1/2001 | Branly et al. | 424/405 |
| 6,203,811 B1 | 3/2001 | McPherson et al. | 424/405 |
| 6,235,301 B1 | 5/2001 | Ballard et al. | 424/405 |
| 6,255,340 B1 * | 7/2001 | Fujimoto | 424/405 |
| 6,286,249 B1 | 9/2001 | Miller et al. | 43/139 |
| 6,306,416 B1 | 10/2001 | McKibben et al. | 424/410 |
| 6,316,017 B1 | 11/2001 | McKibben et al. | 424/410 |
| 6,352,703 B1 | 3/2002 | Henderson et al. | 424/406 |
| 6,397,516 B1 | 6/2002 | Su | 43/124 |
| 6,516,559 B1 * | 2/2003 | Simchoni et al. | 43/107 |
| 2002/0023382 A1 | 2/2002 | Snell et al. | 43/132.1 |

FOREIGN PATENT DOCUMENTS

| | | | | |
|---|---|---|---|---|
| EP | 1 018 869 | 7/2000 | | A01N/25/00 |
| JP | 61091101 | 5/1986 | | A01N/25/24 |
| JP | 62135402 | 8/1987 | | A01N/63/02 |
| JP | 63297303 | 12/1988 | | A01N/37/36 |
| JP | 4169178 | 6/1992 | | C12N/1/20 |
| JP | 2000199283 | 7/2000 | | E04B/1/64 |
| WO | WO 94/04034 | 3/1994 | | A01N/63/04 |
| WO | WO 97/02743 | 1/1997 | | A01N/25/12 |
| WO | WO 97/33471 | 9/1997 | | A01N/25/00 |
| WO | WO 99/29172 | 6/1999 | | A01N/25/34 |
| WO | WO 00/36914 | 6/2000 | | A01N/31/16 |
| WO | WO 00/48461 | 8/2000 | | A01M/31/00 |
| WO | WO 02/15685 | 2/2002 | | A01M/1/20 |
| WO | WO 02/052940 | 7/2002 | | A01N/25/12 |
| WO | WO 02/058463 | 8/2002 | | |
| WO | WO 02/06704 | 9/2002 | | A01N/25/02 |

OTHER PUBLICATIONS

Bernklau et al., *J. Econ. Entomol.*, 91 (2), pp. 444–456 (1998).
Bjostad et al., *J. Chemical Ecology*, 18 (7), pp. 931–944 (1992).
Branson et al., *J. Econ. Entomol.*, 60, pp. 201–203 (1967).
Branson, *Ned. Entomol. Ver. Amsterdam*, 31 pp. 303–307 (1982).
Branson et al., *J. Econ. Entomol*, 63, pp. 800–803 (1970).
Desjardins, *Agricultural and Forest Metcorology*, 36, pp. 29–41 (1985).
Doane et al., *The Canadian Entomologist*, 107 (12), pp. 1233–1252 (1975).
Dusenbery, *J. Chem. Ecology*, 13 (7), pp. 1617–1624 (1987).
Gustin et al., *Environ. Entomol.*, 18(3), pp. 343–346 (1989).
Hibbard et al., *J. Chem. Ecology*, 16 (12), pp. 3425–3439 (1990).
Harris et al., *Agronomy Journal*, pp. 182–184.
Hibbard et al., *J. Econ. Entomol*, 88 (3), pp. 716–724 (1995).
Hibbard et al., *J. Chem. Ecology*, 14 (6), pp. 1523–1539 (1988).
Hibbard et al., *J. Chem. Ecology*, 20 (12), pp. 3335–3344 (1994).
Hibbard et al., *J. Econ. Entomol*, 82 (3), pp. 773–781 (1989).
Jewett et al., *J. Chem. Ecology*, 22 (7), pp. 1331–1344 (1996).
Jewett et al., *J. Entomol. Sci.*, 32 (1), pp. 91–105 (1997).
Jones et al., *Physiological Entomology*, 4, pp. 353–360, (1979).
Jones et al., *Physiological Entomology*, 2, pp. 189–197, (1977).
Meeking et al., *Can. Ent.*, 106, pp. 257–262 (1974).
Novero et al., *Agron. J.*, 83, pp. 911–916 (1991).
Strnad et al., *Environ. Entomol.*, 16, pp. 975–979 (1987).
Strnad et al., *Environ. Entomol.*, 15, pp. 839–842 (1986).
Strnad et al., *J. Insect Physiol*, 36 (3), pp. 201–205 (1990).
Wijffels et al., *Biotechnology & Bioengineering*, 38, pp. 232–240 (1991).
Epperson, *The Denver Post*, Termite Secret Carries Impact, Saturday, Jan. 17, 1998.
Freeman, *The New York Times Science*, "Chemical Lunch for Termites", Tuesday, Jan. 27, 1998.
Miller, *Popular Science*, "Termite Tablets", May 1990.
Boyce, *New Scientist*, "A Deadly Passion", Dec. 1997.
Verrengia, *Rocky Mountain News*, "Aroma Tests Show How to Foil Pests", Wednesday, Jan. 28, 1998.
Bisbee, *Coloradoan*, "Discoery May Get Rid of Damaging Termites", Jan. 17, 1998.
*The IPM Practitioner*, "Carbon Dioxide Termite Baits".
Veomett et al., *Buinsess Week*, "To Best a Parasite, Confuse It", Sep., 1997.

*AES 1997 Annual Report*, "Turning the Worms", 1997.

Tardani, *Reporter–Herald*, "Professor Roots Out the Problems", Aug. 30, 1997.

Schafer, *North Forty News*, "New Recipe Lures Corn Rootworm to Certain Death", Sep., 1997.

*Industrial Processing*, "Carbon Dioxide Diverts Pests From Roots", Nov., 1997.

*Holdrege Daily Citizen*, "Sciene Targets Corn Rootworm", Jan., 1996.

*The Denver Post*, "CSU Devices Common Cure for Worm".

*Entomology News*, "Discovery Bewilders Rootworms", Jan. 21, 1995.

Jewett et al.; "Structure–Activity Study with Haloalkane Attractants of Western Corn Rootworm Larvae Using a Behavioral Bioassay"; *Agricultural Research Service*; May 24, 1996; 1 pg.

Gaugler et al.; "Orientation of the Entomogenous Nematode Neoaplectana carpocapsae to Carbon Dioxide"; *Entomological Sociate of America*; 1980; v. 9, No. 5, pp. 649–652.

Jewett; "Biology and Chemistry of Western Corn Rootworm Host–Finding Behavior"; *Colorado State University*; Jun. 12, 1995; pp. ii–162.

Lance; "Odors Influence Choice of Oviposition Sites by Diabrotica virgifera vigifera (Coleoptera: Chrysomelidae)"; *Journal of Chemical Ecology*; 1992, v. 18, No. 7, pp. 1227–1237.

Nicolas et al.; "Immediate and Latent Effects of Carbon Dioxide on Insects"; *ann. Rev. Entomol.*; 1989, v. 34, pp. 97–116.

Palm et al.; "The Carbon Dioxide Related Behavior of the Adults of Orthosoma Brunneum (Forster) (Coleoptera, Cerambycidae)"; *Canadian Journal of Zoology*; 1964, v. 42, pp. 295–305.

Robinson; "Optimal Release Rates for Attracting Meloidogyne incognita, Rotylenchulus reniformis, and Other Nematodes to Carbon Dioxide in Sand"; *Journal fo Nematology*, 1995, v. 27, No. 1, pp. 42–50.

"Notification of Transmittal of International Preliminary Examination Report" dated Jan. 31, 2003 for International Patent Application Ser. No. PCT/US00/13477 with an International Filing Date of May 17, 2000, and a priority date of Nov. 4, 1999.

"Written Opinion" dated Sep. 5, 2001 for International Patent Application Ser. No. PCT/US00/13477 with an International Filing Date of May 17, 2000, and a priority date of Nov. 4, 1999.

"Notification of Transmittal of the International Search Report of the Declaration" dated Oct. 17, 2000 for International Patent Application Ser. No. PCT/US00/13477 with an International Filing Date of May 17, 2000, and a priority date of Nov. 4, 1999.

"Notification of Transmittal of International Preliminary Examination Report" dated Jul. 5, 2001 for International Patent Application Ser. No. PCT/US99/26074 with an International Filing Date of Nov. 4, 1999, and a priority date of Nov. 6, 1998.

"Written Opinion" dated Apr. 16, 2001 for International Patent Application Ser. No. PCT/US99/26074 with an International Filing Date of Nov. 4, 1999, and a priority date of Nov. 6, 1998.

"Notification of Transmittal of the International Search Report or the Declaration" dated Aug. 24, 2000 for Internatioanl Patent Application Ser. No. PCT/US99/26074 with an International Filing Date of Nov. 4, 1999, and a priority date of Nov. 6, 1998.

U.S. Appl. No. 09/573,795, filed May 16, 2000, Bernklau et al.

"Attracting Termites with Carbon Dioxide"; *Forest Products Journal*; Jul./Aug. 1998; vol. 48, No. 7/8; 1 pg.

Derzko; "Benefits of Perceived Negatives LO16577–Opportuni–Tease #5"; *Learning–Org;* Jan. 16, 1998; 4 pp.

Bjostad; "Termites'Attraction to Small Amounts of Carbon Dioxide lures Pests to Their Deaths"; *Colorado State University*; Jan. 15, 1998; 2 pp.

"Common Foods Replace Pesticide"; *The EnviroNews Service*; Jul. 29, 1997; 2 pp.

Kingler; *Die Orienthierung Von Ditylenchus Dipsaci in Gemessenen Kunstichen Und Biologischen $CO_2$–Gradienten, Nematologica*; 1963, vol. 9, pp. 185–199.

Kusch et al,; "Analysis of Residual Styrene Monomer and Other Volatile Orgnaic Compounds in Expanded Polysterene by Headspace Solid–Phase Microextraction Followed by Gas Chromatography and Gas Chromatography/Mass Spectrometry"; *Journal of Separation Science*; 2002; 25;539–542.

Labouriau et al.; $CO_2$ Efflux of Germinating Caryopses of Zea Mays L. Hydrated with Heavy Water ($D_2O$); *An. Acad. bras. Ci.*; 1987, vol. 59, No. 4, pp. 185–192.

"Life Cycle Assessment of the Industrial Use of Expanded Polystyrene Packaging in Europe";i PriceWaterHouseCoopers; August 2001: pp. 1–141.

Moursi; "The Attractiveness of $CO_2$ and $N_2$ to Soil Anthropoda"; *Pedobiologia*:: 1962, Bd. 1, H. 4. pp. 299–302.

Stmad et al., "First–Instar Western Corn Rootworm (Coleoptera: Chrysomelidae) Response to Carbon Dioxide"; *Environmental Entolmology*; vol. 15, No. 4; Aug. 1986; pp. 839–842.

Stmad et al.; "Movement of First–Instart Western Corn Rootworms (Coleoptra: Chrysomelidae) in Soil", *Environmental Entomology*; vol. 16, No. 4, Aug. 1987; pp. 975–978.

"Termites and Carbon Dioxide": *New York Times via Access–Pesticides, University of Arizona*; Jan. 27, 1998; 1 p.

* cited by examiner

Baited Trap Discovery Time

24 Hour Choice-Test Termite Bioassays
R. tibialis

R. virginicus

CO2 Concentrations for 24 Hour Choice-Test Bioassays

Modified DOW Sentricon Bait Stations with Formulations

Modified DOW Sentricon Bait Stations with Formulations

R. virginicus

First Response

R. flavipes

R. tibialis

|  | area eaten square mm | | |
|---|---|---|---|
|  | Mean | SE | Replications |
| Charred Dow Wood | 345.67 | 26.82 | 6 |
| Control Dow Wood | 25.00 | 8.02 | 6 |
| Charred Pine | 0.00 | 0.00 | 6 |
| Control Pine | 116.67 | 34.44 | 6 | area eaten
square mm

|  | Mean | SE | Replications |
|---|---|---|---|
| Treated Dow Wood | 1304.50 | 0.00 | 1 |
| Control Dow Wood | 0.00 | 0.00 | 1 |

(zero)

Number of Termites

|  | Mean | SE | Replications |
|---|---|---|---|
| Treated Dow Wood | 98 | 0.00 | 1 |
| Middle | 29 | 0.00 | 1 |
| Control Dow Wood | 6 | 0.00 | 1 |

Carbon Dioxide Added to Syringes

Carbonated Water Dilutions in Shell Vials

Carbon Dioxide (microliters) added to syringe source

Carbon Dioxide (microliters) added to syringe source

Non-Diapausing Larvae

Diapausing Larvae

US 6,978,572 B1

METHOD AND DEVICE FOR ATTRACTING INSECTS

RELATED APPLICATION

The present application is a 371 of International Patent Application Serial No. PCT/US99126074 filed November 4, 1999 (published as Publication No. WO 00/27187), which claims priority from U.S. Provisional Patent Application Ser. No. 60/107,285 filed Nov. 6, 1998.

GOVERNMENT RIGHTS

This invention was made in part with government support under United States Department of Agriculture Funding No. 0095958, COLO 0-622. The government has certain rights to this invention.

FIELD OF THE INVENTION

The present invention is directed to a method and device for attracting certain insects, and more particularly is directed to a method and device for attracting termites to ultimately trap or otherwise destroy such termites, as well as a method to reduce damage caused by corn root worms.

BACKGROUND OF THE INVENTION

The damage caused by various insects, and in particular, wood boring and eating inspects, such as termites, is extensive around the world, totaling in the hundreds of millions of dollars. Various methods and devices have been used in the past in an attempt to alleviate or at least ameliorate the significant destruction caused by such insects. For example, so called "baits stations" have been utilized in an attempt to attract termites and thereby trap and/or destroy the termites that enter into such bait stations. Bait stations are available in a variety of shapes, sizes and structures, but principally rely upon the attractiveness of a cellulase product, such as paper or wood, to attract termite populations. It is believed that the termites are attracted to the cellulase wood product as a food source, however, prior art investigators have never conclusively determined what particular aspect of the cellulase product used in such bait stations actually is the attractive agent. Such cellulase products are typically treated with a toxin so that when the termites consume the treated cellulase products, such termites are incapacitated and/or killed. A significant problem in termite control, however, is the long period of time required for termites to discover the food baits.

There is presently a long felt but unsolved need for a method and device that is capable of attracting termites, and in particular, a method and device for attracting and incapacitating and/or killing boring insects such as termites, beetles, etc. in a fashion superior to prior art methods and devices.

Another aspect of the present invention involves the reduction of damage to crops, particularly corn crops, caused by the corn root worm. The damages caused by such insects is estimated to be over one billion dollars in the U.S. alone. Although pesticides have been used in the past to remedy such problems, they have been largely ineffective and have proven to cause environmental problems and to be fairly expensive. The present inventors were the first to discover that root worm larvae navigate to food sources by detecting carbon dioxide. There is therefore a long felt, but unsolved need for a method and formulation capable of attracting corn root worms to avoid the significant damage done by such insects every year.

SUMMARY OF THE INVENTION

The present invention is directed to a method and device for attracting certain insects, and in particular, boring insects such as termites and beetles. A separate aspect of the invention relates to a method and formulations for alleviating and/or reducing corn root worm damage. In one embodiment to the present invention, the method comprises the use of particular amounts of $CO_2$ as an attractant for such boring insects. The present invention includes not only the method for using particular novel formations, but the formulations themselves, as well as devices which incorporate such formulations for the trapping and/or destruction of boring insects.

With respect to the present novel formulations, such formulations generally have in common the ability to give off particular amounts of $CO_2$ found by the present inventors to be particularly attractive to boring insects such as termites. In one embodiment, the present formulation comprises the generation of $CO_2$ in a concentration of from between about 2 mmol/mol to about 50 mmol/mol, more particularly in amounts greater than about 2 mmol/mol and less than about 20 mmol/mol, and even more preferably between about 5 and about 10 mmol/mol. Preferred $CO_2$ concentrations are at least above ambient concentrations. Such $CO_2$ concentrations can be generated using one or mote of a biological generation source, a chemical generation source and a mechanical generation source. For example, certain bacterial, fungal (e.g., yeast), algal and other microorganism formulations can be used that generate the above-referenced concentrations of $CO_2$ over a particular period of time, Alternatively, chemical reactions that generate $CO_2$ can be utilized to achieve such concentrations such as carbonate, calcium carbonate and various bicarbonate formulations as set forth and/or referred to herein. Finally, mechanical systems which incorporate the slow release of contained sources of $CO_2$ can be utilized to achieve desired objectives of the present invention. Combinations of the biological, chemical and mechanical methods and devices are also within the scope of the present invention. The detailed description of such embodiments can be found in the detailed description of the preferred embodiments, below.

The novel method of the present invention comprises the generation of $CO_2$ in an amount within the above-specified ranges in order to attract boring insect populations. For example, such method comprises positioning an enclosure containing one or more of the above-referenced biological, chemical and/or mechanical sources of $CO_2$ in an area sought to be protected from boring insects such as termites. Various controls with respect to $CO_2$ generation fall within the scope of the present invention, including temperature, light sensors, temporal adjustment mechanisms, etc., to achieve desired $CO_2$ emissions within appropriate concentration ranges at particular times of day and/or night, and/or at particular ambient temperatures at which insects may be most attracted to such sources, etc.

With respect to the device of the present invention, various forms and structures are in contemplated including bait traps and stations similar to those commercially available. Still other embodiments, however, have a varied configuration as set forth in the figures.

A separate aspect of the present invention involves the use of charred cellulose material, and in particular charred wood, as an attractant for boring insects such as termites. While not being bound by theory, the present inventors believe that charred wood provides an easier target material for boring insects and thus, over evolutionary time, such boring insects have evolved a particular attraction to charred cellulase as a feeding stimulant. A farther aspect of the present invention, therefore, includes the particular novel compositions and formulations found in charred wood that attracts such boring insects and the use of such compounds in the above-described method, devices and formulations for attracting and extermination of undesired insects such as boring beetles, termites, etc.

Also included within the scope of the present invention are the use of chemical mimics of $CO_2$ to induce behavioral manipulation of any boring insect population, including all termite species. Such $CO_2$ mimics include, but are not limited to, haloalkanes and alkylcarbonates.

The various formulations of the present invention that comprise $CO_2$ or $CO_2$ mimics, may further be combined with sources of insecticide, sources of food, feeding stimulants, or other materials that arrest and/or stimulate termite movement or behavior. In addition, the use of $CO_2$ or $CO_2$ mimics, alone or in combination with other components, can be used to disrupt the orientation behavior of termites in a behavioral fashion, rather than as acting as a physiologically deleterious fumigant. Thus, $CO_2$ and $CO_2$ mimics can be used as co-attractants for termites along with other attractive materials that may have fundamentally different chemical compositions. The formulations of the present invention can be used to attract termites to termite traps, and further can be used to monitor the presence or abundance of particular termite species. Indeed, in one embodiment of the present invention manipulation of the amount of $CO_2$ generated can be adjusted to attract a particular species of termite, given the present inventors' appreciation and recognition that different $CO_2$ concentrations are more or less attractive to various species of termites. An extensive list of termite bait compounds that can be used in conjunction with the present invention to fashion appropriate formulations is shown in tables set forth below.

A separate aspect of the present invention relates to a method and formulation for ameliorating the damage caused by corn root worms. The present inventors were the first to discover that corn root worms are capable of navigating to food sources by detecting carbon dioxide emitted from roots. The present invention is directed to various formulations found effective in attracting such root worms in a manner that protects growing crops from destruction by such insects. In particular, the present inventors are the first to discover an inexpensive and readily available material that, if applied properly, can be used to vastly reduce the damage caused by corn root worms. In particular, the present inventors are first to discover that spent grain and distillers grain can be used by farmers as a readily available and inexpensive source of a $CO_2$ evolving agent. Farmers must apply such spent grain/distillers grain components into the soil during planting and/or cultivation (e.g., in temperate climates such as Colorado, from May–July) so that $CO_2$ is generated during a period of time that the corn root worm larvae are present. By plowing such material into the soil, $CO_2$ is evolved and corn root worm larvae are confused as to the source of $CO_2$ being generated, thus sparing the corn roots which would normally be the target for such root worms.

In a particularly preferred method of the present invention, rather than generally plowing spent grains/distillers grain materials into a field, such material is administered to the fields in strips in between or adjacent to corn rows, thus providing a source of $CO_2$ that attracts corn root worms away from growing corn plants. The present invention not only encompasses, therefore, the method of applying such materials at particular times during the growing season, but also to machinery used to preferably administer such material. Indeed, the present invention involves a new use for existing machinery used in planting and in fertilizer applications, such as a cone planter and starter fertilizer equipment, conventionally used for corn planting and fertilization. Such existing machines can be further modified to achieve the desired objective of the present invention so that sources of $CO_2$ evolving substances can be precisely contacted with the soil to achieve the corn root worm attractant objective.

Corn root worms can be attracted by use of biological, chemical and mechanical means, most preferably biological and chemical means as set forth herein as applicable to other boring insects, such as termites.

An obvious advantage of the present invention is that $CO_2$ is an inexpensive, environmentally-friendly compound that is readily available and can be generated in a number of ways.

These and other advantages and aspects of the present invention will be described in detail below and with reference to the experimental examples and figures.

BRIEF DESCRIPTION OF THE DRAWINGS

FIG. 48 shows the preferences of western corn root worm larvae when exposed to 1 mmol/mol versus each of 1, 1.115, 1.125 and 1.5 mmol/mol minimum $CO_2$ concentration. FIG. 49 shows the preferences of western corn root worm larvae when exposed to 2 mmol/mol versus each of 2, 2.115, 2.25 and 2.5 mmol/mol minimum $CO_2$ concentration. FIG. 50 shows the preferences of western corn root worm larvae when exposed to 5 mmol/mol versus each of 5, 5.125, 5.25 and 5.5 mmol/mol minimum $CO_2$ concentration. FIG. 51 shows the preferences of western corn root worm larvae when exposed to 10 mmol/mol versus each of 10, 10.125, 10.25 and 10.5 mmol/mol minimum $CO_2$ concentration. FIG. 52 shows the preferences of western corn root worm larvae when exposed to 20 mmol/mol versus each of 20, 20.125, 20.25 and 20.5 mmol/mol minimum $CO_2$ concentration. Significant differences ($p<0.05$) are indicated by different lower case letters. Bars "I" represent standard errors.

DETAILED DESCRIPTION OF THE PREFERRED EMBODIMENTS

Figure 1:
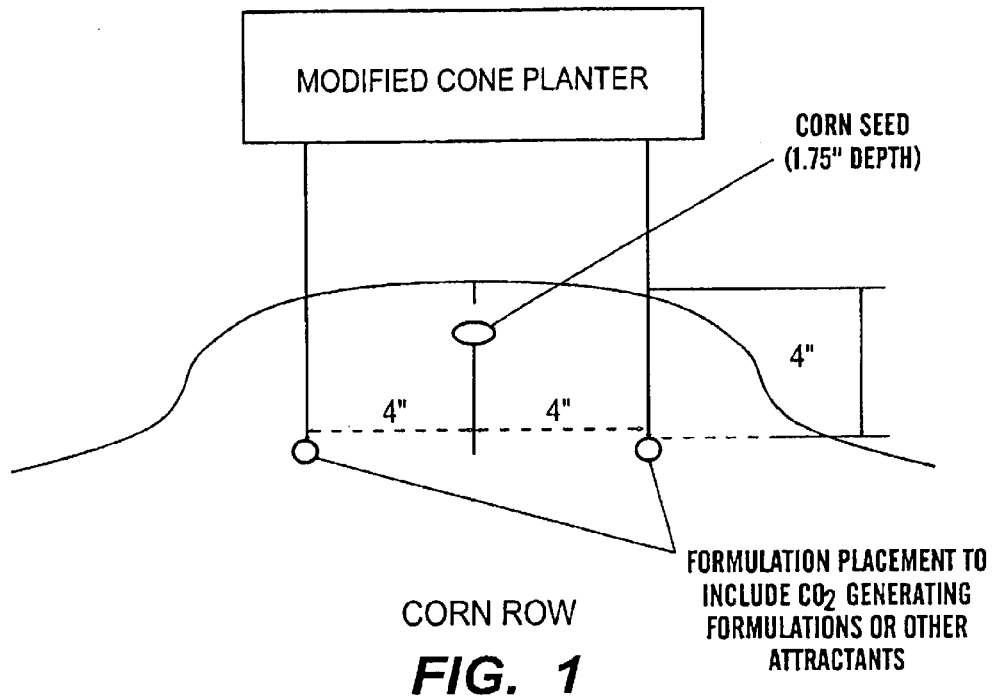
FIG. 1 illustrates how a typical cone planter can be modified in order to place formulations of the present invention a desired distance from a particular corn seed.
Figure 2:
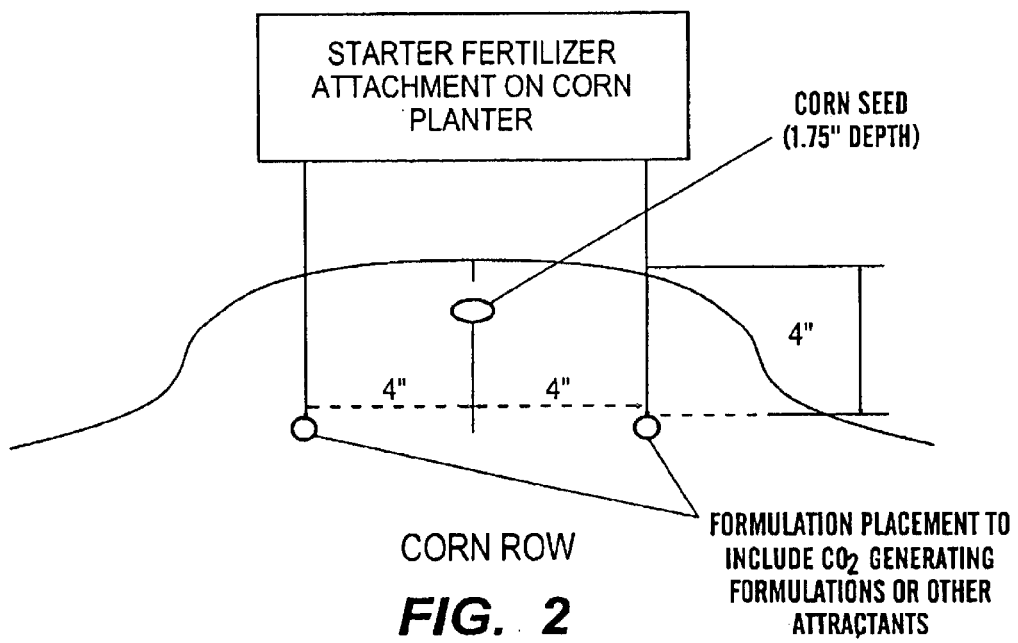
FIG. 2 illustrates how a starter fertilizer attachment on a corn planter can be utilized to properly place the formulations of the present invention within a desired distance from a corn seed.

The present inventors incorporate by reference the following U.S. Patents in their entirety, such patents disclosing various compounds and formulations that are useful in conjunction with the present invention. U.S. Pat. No. 5,338,551 filed Jul. 2, 1992 to Lajoie: U.S. Pat. No. 5,342,630 filed Jul. 1, 1992 to Jones: U.S. Pat. No. 5,346,704 filed Aug. 11, 1993, to Lajoie; U.S. Pat. No. 5,389,386 filed Jun. 30, 1994 to Winston et al., U.S. Pat. No. 5,415,877 filed Dec. 22, 1993, U.S. Pat. No. 5,424,270 filed Jul. 7, 1993, U.S. Pat. No. 5,425,952 filed Oct. 13, 1993, U.S. Pat. No. 5,432,146 filed Dec. 20, 1993, U.S. Pat. No. 5,432,147 filed Oct. 19, 1994, U.S. Pat. No. 5,432,148 filed Dec. 7, 1994, U.S. Pat. No. 5,443,835 filed Sep. 30, 1993 and U.S. Pat. No. 5.464.805 filed Mar. 23, 1995 to Winston: U.S. Pat. No. 5,468,715 filed Jun. 2, 1993 to Joseph et al.: U.S. Pat. No. 5,468,716 filed Oct. 3, 1994, U.S. Pat. No. 5,496,568 filed Jun. 26, 1995, U.S. Pat. No. 5,518,986 filed Apr. 4, 1995, U.S. Pat. No. 5,518,987 filed Oct. 3, 1995 and U.S. Pat. No. 5,583,089 filed May 9, 1995 to Winston.

One aspect of the present invention is directed to the alleviation of corn root worm damage by providing a $CO_2$ evolving agent in a planted field so as to attract and/or otherwise confuse corn root worms, thus reducing the damage caused by such root worm to corn roots. Although biological, chemical and mechanical methods, as otherwise set forth herein can be used, biological and chemical formulations are particularly preferred. Indeed, the present inventors are first to appreciate the use of inexpensive and readily available materials to accomplish the objective of reducing corn root worm damage done to corn crops in the United States and elsewhere in the world. Specifically, the present inventors have discovered that spent grain and/or distiller's grain can be used, easily obtainable from breweries and alcohol generation facilities, such materials being either generally plowed into fields at appropriate times during the planting, cultivation and/or growing season, and/or precisely located in such fields to achieve desired attractant functions. Farmers typically plow organic materials into their soils in the fall, however, this practice means that $CO_2$ is long evolved and dissipated long before the springtime planting and cultivation periods. It is during the planting and cultivation periods that the corn root worm larvae is present and initiates destruction of corn roots. The present invention thus entails the first appreciation and recognition that by contacting (e.g., plowing) particular biological material, such as spent grain/distiller's grain into a field (e.g., corn fields), at an appropriate time in the spring or early summer (or any other planting and/or cultivation period in more temperate climates) it is possible to ameliorate the destruction caused by corn root worms.

In addition to the above-referenced $CO_2$ evolving agents, charcoal, activated carbon and decolorizing carbon, all readily available in the commercial marketplace, also have behavior activities against insects and are useful as substrates that can form carbon dioxide when they are placed in contact with soil. Moreover, corn cob grits can be used as an acceptable microbial substrate for the production of $CO_2$. This material is readily available, inexpensive and provides a long, slow release formulation for the production of $CO_2$ to accomplish the objectives of the present invention.

In a preferred embodiment, strips of biological and/or chemical $CO_2$ evolving material are contacted with fields between or adjacent to the rows of plants. This can be accomplished by using various existing machines such a cone planters or starter fertilizer equipment. Modifying such equipment to achieve the desired precise placement of $CO_2$ evolving materials is preferred and such modifications will be obvious to one of skill in the art given the general teachings and guidance of the present invention. Various biological sources for $CO_2$ evolving agents include ground germinated corn, clean cracked corn, malted barley, any other malted grain, corn gluten feed, fungal organisms such as yeast, bacteria, such as *S. cervisae* (sour dough bread starter), algae, and various other microorganisms that exist in soil.

Various chemical $CO_2$ evolving agents can be used, such as those mentioned herein, preferably including carbonates, including inorganic carbonates such as calcium carbonate, bicarbonates and alkyl carbonates. Urea-based compounds can also be utilized. In addition, double or other multiple acting compounds such as double acting baking powder can be utilized. It is within the scope of the present invention to combine the chemical and biological $CO_2$ evolving agents in various formulations. For example, spent grain, preferably in a dried form, can be mixed with appropriate amounts of carbonates and/or bicarbonates and/or urea to form appropriate compounds for attracting corn root worm larvae/ insects.

Another aspect of the present invention involves the new use of dried spent grain and/or distiller's grain. Typically, spent grain and distiller's grain is provided in a "wet" composition. Such a form is not suitable for commercial sale for use as a $CO_2$ evolving agent since in such a "wet" and/or moist state, the material will rot and will evolve $CO_2$ prior to the time that it is administered to the soil. Thus, one aspect of the present invention involves the manufacture of dry spent grain/distiller's grain having a long shelf life so that it can be sold and properly administered to fields so as to accomplish the $CO_2$ evolving objective of the present invention.

Various other co-attractants can be added to the present inventive formulations (e.g., phermones, etc.) to further enhance the attractive features of the present formulations.

In preferred embodiments, the formulations of the present invention are produced in either a solid or liquid form. In a solid form, the present invention is preferably in granular form of a nature and size that facilitates administration of such granules through existing insecticide administering equipment used in conventional farming operations. These include, but are not limited to a noble meter and a Winter-Steiger meter. In addition, liquid forms of the various formulations are contemplated which are believed to be easier to handle and to administer. For example, such liquids could be crop dusted and/or subject to chemigation, using center pivot irrigation systems. Moreover, the present invention can be in the form of a gel or slurry for particular applications.

It is further within the scope of the present invention to use other available sources of $CO_2$ generation such as dry ice or more concentrated forms of $CO_2$ agents. Indeed, one aspect of the present invention involves a method for applying $CO_2$ evolving agents at a particular advantageous distance from roots of plants to attract various insects (e.g., corn root worms). The farther away a $CO_2$ agent is placed from a plant root, the stronger (e.g., concentrated) the $CO_2$ evolving agent can be. The goal is to attract desired larvae/insects without causing damage to plant roots and thus, the distance and concentration parameters will vary depending upon the particular plant involved and the particular $CO_2$ evolving agent employed.

The inventors are also the first to appreciate the generation and use of a compound that is useful not only to alleviate corn root worm problems, but at the same time, provides advantageous fertilization to desired plants. By use of ammonium bicarbonate, for example, not only is $CO_2$ generated which attracts corn root worm larvae, such compound also acts to provide needed nutrients and fertilizer to corn plants.

Another aspect of the present invention relates to the use of charred cellulose material, such as wood, to attract various insects, such as boring insects, and in particular, termites. The present inventors are the first to appreciate the use of charred wood as a bait for termites, including the role of burned wood as a source of volatile and nonvolatile attractants and as a source of feeding stimulants for termites. As with corn root worms, in addition to charcoal, activated carbon decolorizing carbon and corn cob grits can be used as the attractant/$CO_2$ evolving agent.

Any form of burned or charred natural materials or artificial materials (e.g., plastic, inorganic materials (clay)) may be used, preferably burned cellulosic matrix/burned polymeric matrix. The pyrolysis products of burning are similar for such materials as wood, paper, cardboard, fabric, textiles, wool, silk, bone, hair, horn, claws, or any other natural products, and the pyrolysis products of artificial polymers mimic the pyrolysis products of natural materials in many instances.

Examples of behavioral manipulation of termite species include, but are not limited to, the following:

Use of charred wood, products of charred wood, or other burned materials: (a) to attract termites to traps for monitoring the presence or abundance of termite species; (b) to attract termites to sources of insecticides, insect growth regulators, or other toxic or physiologically active materials; (c) as feeding stimulants for termites, to induce them to feed on sources of insecticides, insect growth regulators, or other toxic or physiologically active materials; (d) to attract termites to sources of food, feeding stimulants, or other materials that arrest termite movement; (e) to disrupt the orientation behavior of termites behaviorally rather than acting as a physiologically deleterious fumigant; (e as co-attractants for termites along with other attractive materials that may have fundamentally different chemistry, and (g) for the behavioral manipulation of any termite species, including use of such burned materials as attractants or feeding stimulants for termites.

Still other aspects of the present invention relate to the use of compounds that are chemically isolated from burned wood or other burned materials: (a) as attractants for termites; (b) as feeding stimulants for termites; and (c) for use in disrupting termite behavior in any way.

Figure 3:
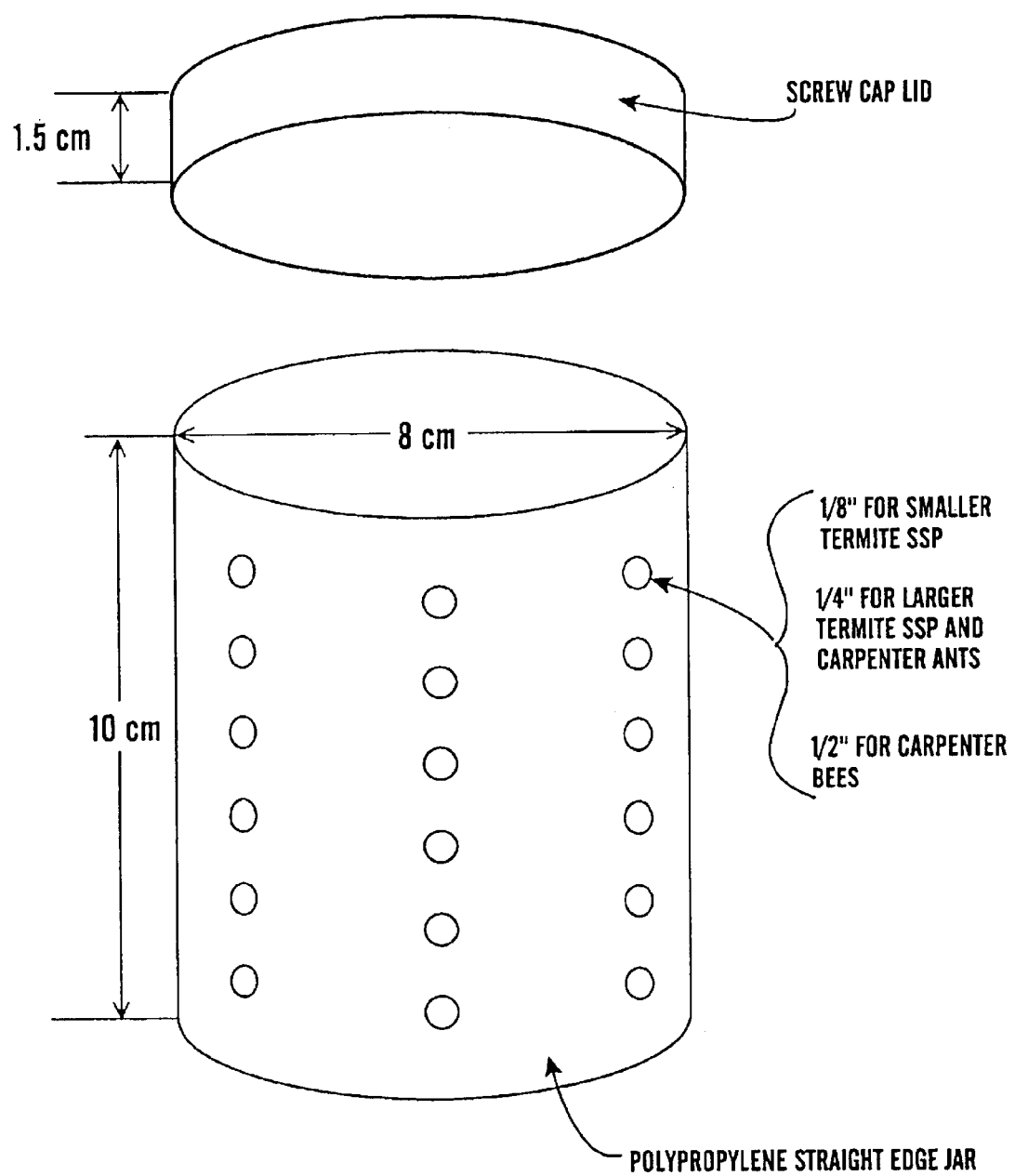
FIG. 3 illustrates one embodiment of a jar trap for insects, including termites.

With respect to the aspect of the present invention involving the attraction and/or termination of termites, the herein described biological, chemical and mechanical means can be utilized. With respect to mechanical means, in a preferred embodiment, jars having appropriately sized holes therein are utilized within which are stored attractant material. As can be seen in FIG. 3, the physical configuration of such jars can be greatly varied, however, a shorter, squatter configuration is particularly preferred. Moreover, apertures in the jars are preferably spaced about the circumference of the jar, and more preferably, evenly spaced throughout the surface area of the jar's sides. An important aspect of the present invention is the total area of apertures with respect to the jar's surface. In a preferred embodiment, no more than about 10% of the surface area of the jar comprises apertures, and more preferably, less than about 5% of the surface area of the jar. In a particularly preferred embodiment, the limited access of termites to the interior of the jar is believed to be advantageous given that termites seek such relatively small openings, potentially due to the higher concentrations of $CO_2$ emitting from such orifices. The physical configuration of such bait traps is typically that of "jars", such jars constructed of any suitable material including plastic, glass, ceramic, metal, etc. In general, the larger the volume of the bait trap, the better. In a particular embodiment, the diameter of the bait jar used is about 90 mm, with a height of about 100 mm and has hole diameters of approximately 3 mm wherein at least about 50 holes are evenly distributed over the entire circumference of the jar.

Within such bait traps, the attractant material of the present invention is provided. Indeed, in one embodiment, the present invention comprises the addition of soil to bait traps as the attractant material. Soil, which may include sand, gravel, pebbles, dirt, as well as other constituents, is freely attainable and especially when used in conjunction with conventional bait traps having cellulose products therein, the addition of soil is found to provide impressive and unexpected attractant results.

With respect to chemical attractive agents for use in termite attraction, regulation and extermination, citric acid combined with sodium bicarbonate is particularly preferred, especially in a pelletized form. Indeed, "fizzies" have been found to be particularly advantageous as a termite control attractant when added to soil having a moisture content of at least about 10% and more preferably about 20% of moisture.

While the majority of the Detailed Description of the Present Invention has been directed to boring insects such as termites and corn root worms, it should be appreciated that the present invention has application with various other insects, including, but not limited to carpenter arts and carpenter bees. Indeed, as set forth in the figures, various devices can be produced in accordance with the particular identifying characteristics of an insect sought to be attracted. For example, a carpenter ant and a carpenter bee attractant/trapping device is set forth in the figures.

With respect to the production of appropriate amounts of $CO_2$, an amount over the ambient $CO_2$ concentrations is required. Typically, ambient $CO_2$ concentrations are around 0.05% and up to 0.1% in urban areas. Thus, $CO_2$ concentrations of at least about 0.2%, preferably between 0.5% and 1% by volume and more preferably at least about 1% by volume. In other embodiments, however, concentrations of between 2% and 50%, and even up to 100% of $CO_2$ by volume, may be useful, dependent upon the particular application of the present invention to a particular insect. At 100% $CO_2$ concentrations, $CO_2$ acts as a fumigant rather than an attractant. It will be appreciated, however, that at sufficient distances from a $CO_2$ source, the more concentrated $CO_2$ source may be desired to act as an attractant so that appropriate $CO_2$ concentrations in the particular area in the vicinity of an insect is achieved.

Other compounds can be added to the present formulations to achieve either attractant or destruction ability of the formulation. For example, various poisons can be mixed with the $CO_2$ bait traps of the present invention. Essentially, any insecticide or insect growth regulator can be used in conjunction with a $CO_2$ evolving source. Examples of such compounds include hexaflumuron and hydramethylnon. As mentioned elsewhere, various phermones can also be utilized for particular insect species sought to be attracted, such phermones added with the formulations of the present invention.

In the use of the present invention to attract termites, suitable bait traps are positioned away from building structures or other wooden edifices sought to be protected. Depending upon the $CO_2$ attractant utilized, the devices should have an effective life of several weeks, preferably several months, and as much as a year or more.

The attractant compounds and formulations of the present invention are generally referred to herein as "attracticides".

Yet another aspect of the present invention involves the manufacture of building materials so as to make such materials less susceptible to termite damage. For example, conventional foam panels used in insulation materials emit carbon dioxide. The elimination of carbon dioxide in the manufacture of such foam materials, by, for example, use of other non-$CO_2$ containing gases, provides a method to produce termite resistant building and/or insulation materials. Further aspects of the present invention also include methods to seal existing structures that are prone to emit $CO_2$ concentrations in amounts found attractive to various boring insects. For example, creating substantially air-tight seals around conventional $CO_2$ based foam products is effective in reducing the attractant quality of such materials to boring insects such as termites. Other aspects of the present invention include chemical abatement or reduction of $CO_2$ emitting insulation and building materials to avoid possible destruction by boring insects attracted to $CO_2$ emitting substances. $CO_2$ emitting concentrations should be reduced to below the dose found in soils so as to eliminate any source of $CO_2$ that may attract insects.

Preferred formulations of the present invention are in pelleted form to achieve slow release of $CO_2$ at the above-described concentrations.

The following examples are illustrative only of particular embodiments of the present invention.

EXAMPLE 1

Figure 4:
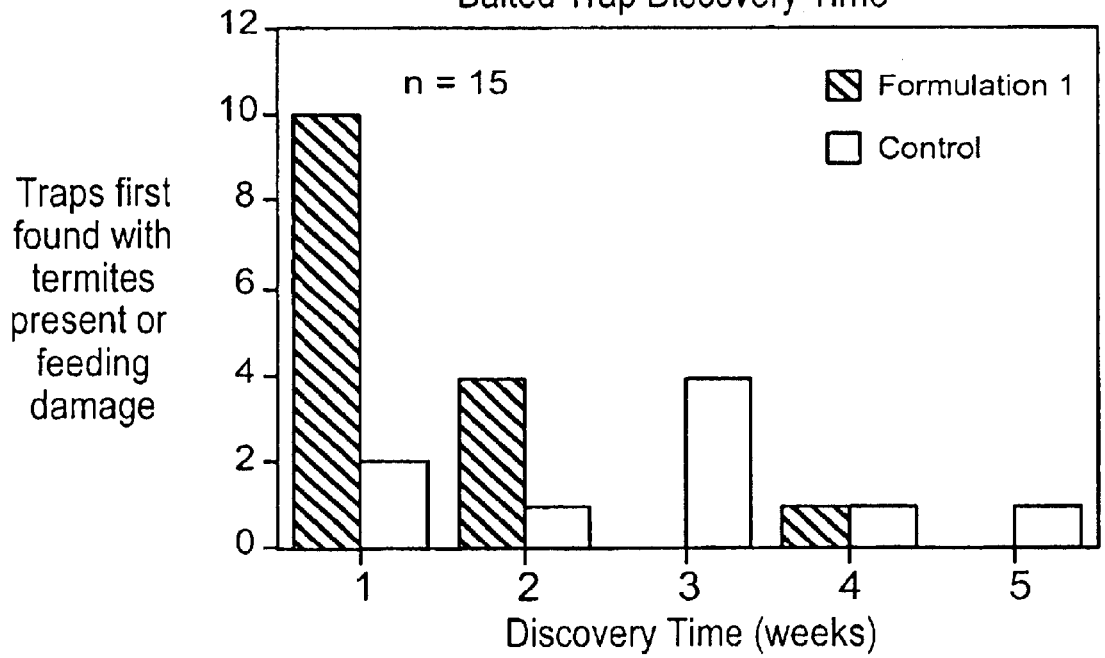
FIGS. 4 and 5 illustrate baited trap and unbaited trap discovery time by termites in Example 1.
Figure 5:
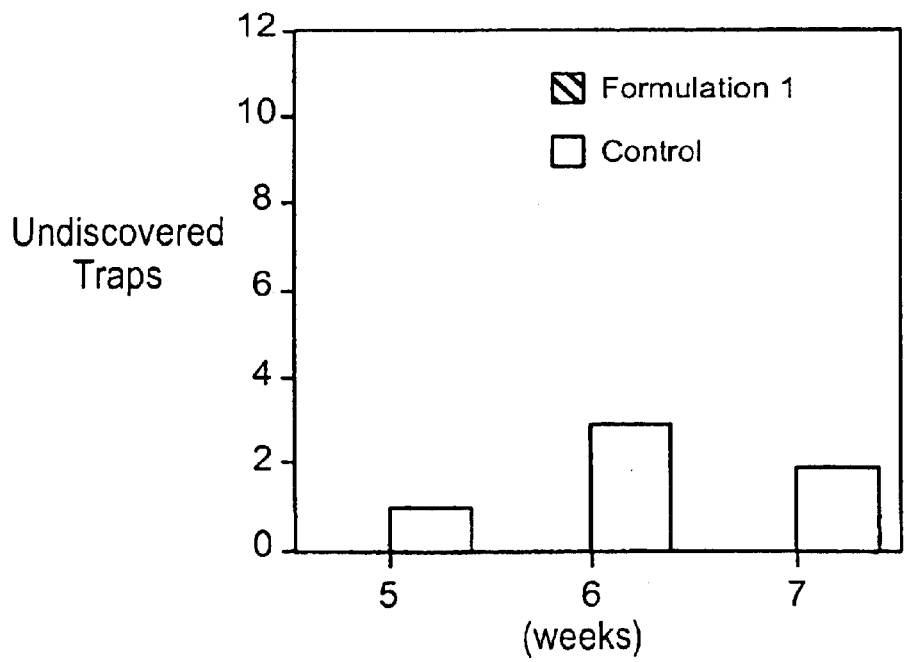

Formulation 1 In Jar Traps at 1 Meter
Composition of Formulation 1 (Dried Spent Brewer's Grain): Spent brewer's grain obtained from a local brewery was spread out on trays and allowed to air dry overnight. The dried spent brewer's grain was then added to soil that contained 20% moisture (12 grams (g) dried spent brewer's grain per 100 grams moist soil).
Trap Design: Jar traps were constructed from 16 ounce polyethylene jars with plastic screw caps. Each jar was drilled with 36 evenly-spaced holes (3 mm diameter) to allow volatiles to diffuse out of the trap and to allow termites to enter. A cylindrical basket was constructed for each cup trap from plastic fencing to facilitate removing the trap from the soil. Baited traps were prepared by placing 300 grams of Formulation 1 in a jar trap. Unbaited traps were filled with 300 grams of soil (20% moisture). A disk of cardboard (8 cm diameter) was placed in the top of each trap (baited and unbaited), covered with a thin layer of soil, and the lid was then screwed onto the trap.
Field sites: Fence posts infested with termites (*Reticulitermes tibialis*) were used for field trapping experiments at three different ranches in Colorado (Fort Collins, Nunn, and Akron). Each infested fence post was used as a point source for an experiment. Six traps, three baited and three unbaited, were placed in the ground evenly around the fence post at a distance of 1 meter. The traps were placed in the ground at a depth of 20 to 25 cm and covered completely with soil. Traps were checked weekly for the presence of termites. Traps were checked for feeding damage on the cardboard disks. Cardboard disks were taken back to the laboratory, where each piece was carefully washed and spread out to dry. The amount of cardboard eaten was determined by scanning the pieces with a desktop scanner and calculating the area by using a computer graphics program (Adobe Photoshop). The experiment was continued for six weeks at each location.
Results:
1. Traps baited with dried spent brewer's grain (Formulation 1) were discovered sooner by termites than unbaited traps (FIG. 4).
2. Termites consumed more cardboard from baited traps than from unbaited traps (data collected, but not shown here).
3. Termites were found more often in the baited traps than the unbaited traps (FIG. 5).
Conclusion:
This experiment demonstrated that dried spent brewer's grain mixed with moist soil is effective as a bait for termites.

EXAMPLE 2

Formulation 2 in Jar Traps at 1 Meter
Composition of Formulation 2 (Dried Ground Germinated Corn Seeds): Corn seeds were soaked in soapy water overnight, rinsed well and germinated in a covered plastic tub containing moist germination paper. After 3 days of germination, the germinating corn was ground to meal using a kitchen food processor, then spread out on trays and allowed to air dry overnight. Dried, ground, germinated corn seed (12 grams per 100 grams soil) was added to soil that contained 20% moisture.
Trap Design: Jar traps were constructed from 16 ounce polyethylene jars with plastic screw caps. Each jar was drilled with 36 evenly-spaced holes (3 mm diameter) to allow volatiles to diffuse out of the trap and to allow termites to enter. A cylindrical basket was constructed for each cup trap from plastic fencing to facilitate removing the trap from the soil. Baited traps were prepared by placing 300 grams of Formulation 2 in ajar trap. Unbaited traps were filled with 300 grams soil (20% moisture). A disk of cardboard (8 cm diameter) was placed in the top of each trap (baited and unbaited), covered with a thin layer of soil, and the lid was then screwed onto the trap.
Field sites: Fence posts infested with termites (*Reticulitermes tibialis*) were used for field trapping experiments at three different ranches in Colorado (Fort Collins, Nunn, and Akron). Each infested fence post was used as a point source for an experiment. Six traps, three baited and three unbaited, were placed in the ground evenly around the fence post at a distance of 1 meter. The traps were placed in the ground at a depth of 20 to 25 cm and covered completely with soil. Traps were checked weekly for the presence of termites. Traps were checked for feeding damage on the cardboard disks. Cardboard disks were taken back to the laboratory, where each piece was carefully washed and spread out to dry. The amount of cardboard eaten was determined by scanning the pieces with a desktop scanner and calculating the area by using a computer graphics program (Adobe Photoshop). The experiment was continued for six weeks at each location.

Figure 6:
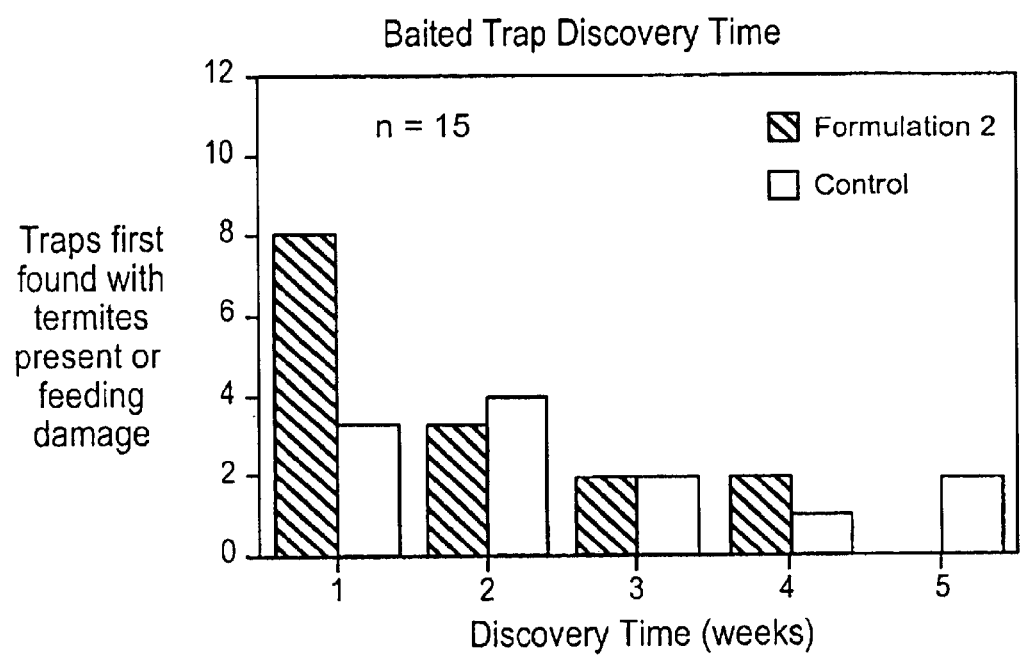
FIG. 6 illustrates baited trap discovery time by termites in Example 2.
Figure 7:
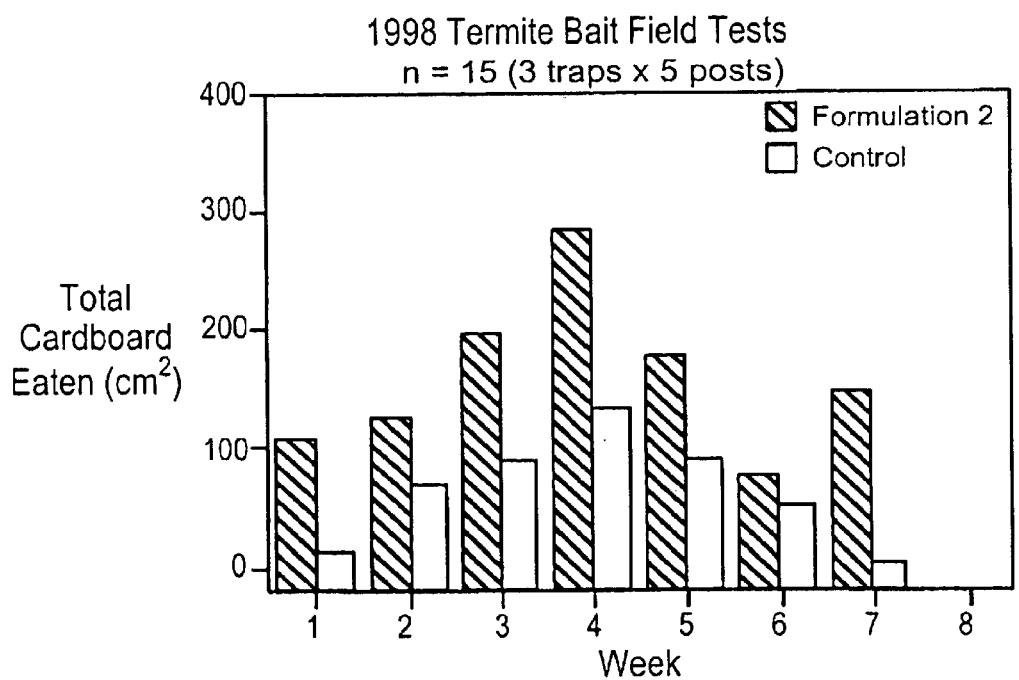
FIG. 7 illustrates total cardboard consumed by termites in baited traps in Example 2.

Results:
1. The discovery time was shorter for the baited traps than for the unbaited traps (FIG. 6).
2. More cardboard was consumed by termites in the baited traps for weeks 1 through 7 (FIG. 7).
3. Termites were found more often in the baited traps than the unbaited traps (data collected, but not shown here).

Conclusion:
This experiment demonstrated that dried ground germinated corn seeds mixed with moist soil is effective as a bait for termites.

EXAMPLE 3

Formulation 3 in Jar Traps at 1 Meter

Composition of Formulation 3 (Whole Dry Malted Barley): Whole dry malted barley was obtained from a local brewer's store. The whole dry malted barley was then added to soil that contained 20% moisture (12 grams whole dry malted barley per 100 grams moist soil).

Trap Design: Jar traps were constructed from 16 ounce polyethylene jars with plastic screw caps. Each jar was drilled with 36 evenly-spaced holes (3 mm diameter) to allow volatiles to diffuse out of the trap and to allow termites to enter. A cylindrical basket was constructed for each cup trap from plastic fencing to facilitate removing the trap from the soil. Baited traps were prepared by placing 300 grams of Formulation 3 in a jar trap. Unbaited traps were filled with 300 grams of soil (20% moisture). A disk of cardboard (8 cm diameter) was placed in the top of each trap (baited and unbaited), covered with a thin layer of soil, and the lid was then screwed onto the trap.

Field sites: Fence posts infested with termites (*Reticulitermes tibialis*) were used for field trapping experiments at three different ranches in Colorado (Fort Collins, Nunn, and Akron). Each infested fence post was used as a point source for an experiment. Six traps, three baited and three unbaited, were placed in the ground evenly around the fence post at a distance of 1 meter. The traps were placed in the ground at a depth of 20 to 25 cm and covered completely with soil. Traps were checked weekly for the presence of termites. Traps were checked for feeding damage on the cardboard disks. Cardboard disks were taken back to the laboratory, where each piece was carefully washed and spread out to dry. The amount of cardboard eaten was determined by scanning the pieces with a desktop scanner and calculating the area by using a computer graphics program (Adobe Photoshop). The experiment was continued for six weeks at each location.

Figure 8:
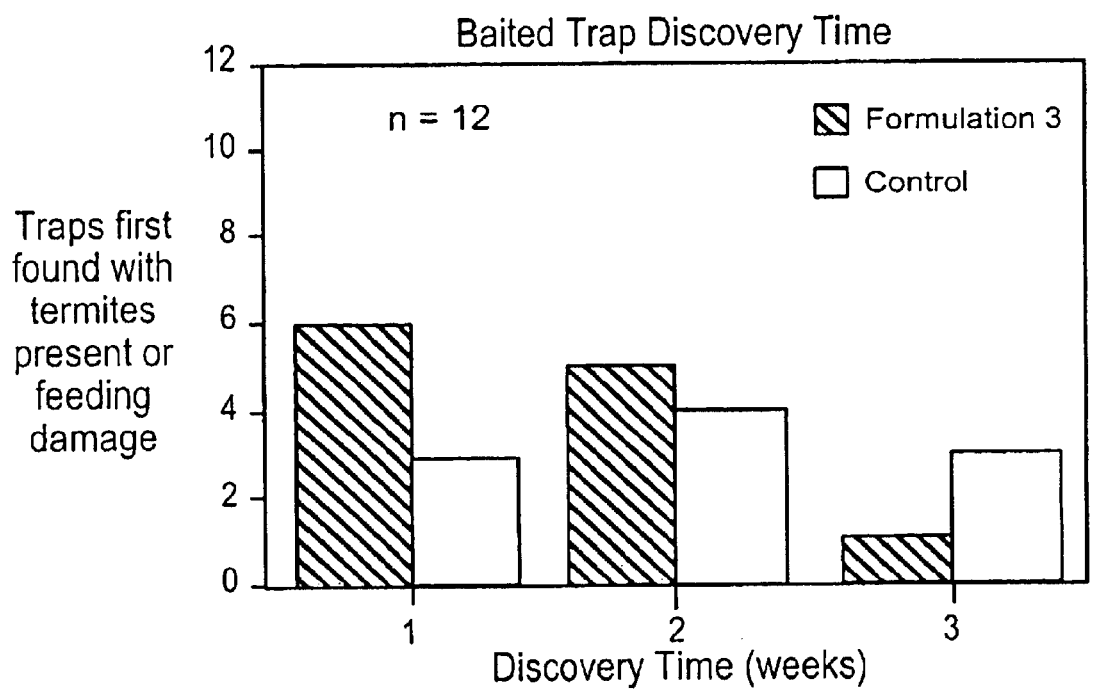
FIG. 8 illustrates baited trap discovery time by termites in Example 3.
Figure 9:
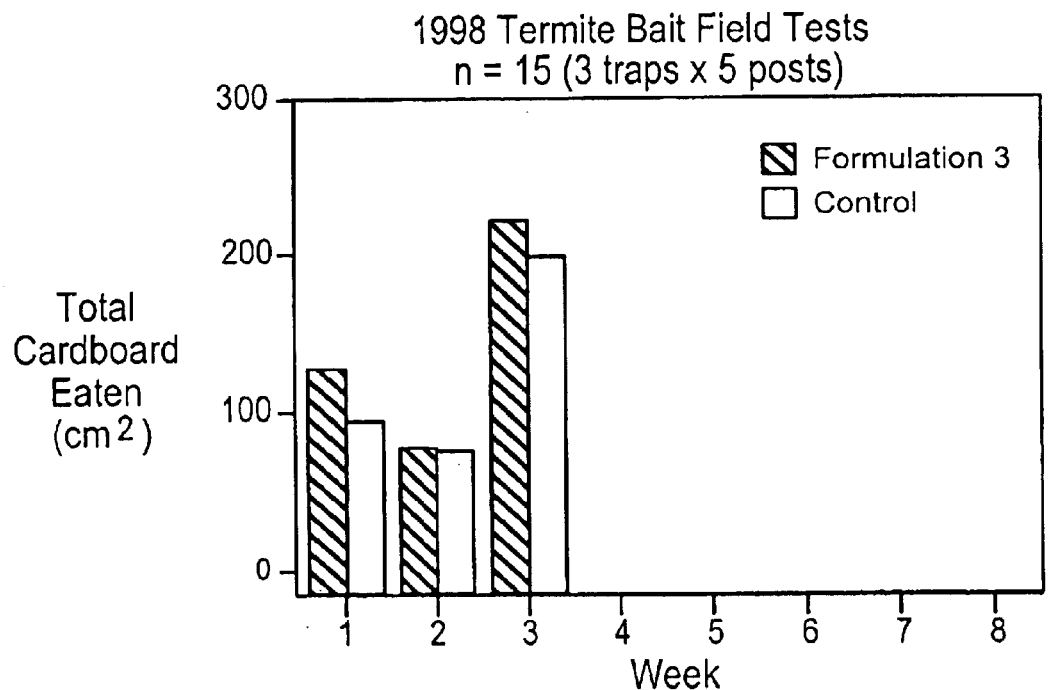
FIG. 9 illustrates total cardboard consumed by termites in baited traps in Example 3.

Results:
1. Traps baited with whole malted barley (Formulation 3) were not discovered sooner by termites than unbaited traps (FIG. 8). Within 3 weeks, 10 baited and 10 unbaited traps had been discovered by termites.
2. Termites did not consume more cardboard from baited traps than from unbaited traps (FIG. 9).
3. Termites were not found more often in the baited traps than the unbaited traps (data collected, but not shown here).

Conclusion:
This experiment demonstrated that not all vegetable co-products are effective as baits for termites. In the specific context tested here, whole malted barley did not attract termites or enhance feeding.

EXAMPLE 4

Formulation 4 In Jar Traps at 1 Meter

Composition of Formulation 4 (Coated Sucrose Pellets): Sucrose pellets with a light wax coating were obtained from a local supplier (Sprinkle Decorations, Wilton Enterprises, Woodridge, Ill.). The sucrose pellets with a light wax coating were then added to soil that contained 20% moisture (12 grams per 100 grams moist soil).

Trap Design: Jar traps were constructed from 16 ounce polyethylene jars with plastic screw caps. Each jar was drilled with 36 evenly-spaced holes (3 mm diameter) to allow volatiles to diffuse out of the trap and to allow termites to enter. A cylindrical basket was constructed for each cup trap from plastic fencing to facilitate removing the trap from the soil. Baited traps were prepared by placing 300 rams of Formulation 4 in a jar trap. Unbaited traps were filled with 300 grams of soil (20% moisture). A disk of cardboard (8 cm diameter) was placed in the top of each trap (baited and unbaited), covered with a thin layer of soil, and the lid was then screwed onto the trap.

Field sites: Fence posts infested with termites (*Reticulitermes tibialis*) were used for field trapping experiments at three different ranches in Colorado (Fort Collins, Nunn, and Akron). Each infested fence post was used as a point source for an experiment. Six traps, three baited and three unbaited, were placed in the ground evenly around the fence post at a distance of 1 meter. The traps were placed in the ground at a depth of 20 to 25 cm and covered completely with soil. Traps were checked weekly for the presence of termites. Traps were checked for feeding damage on the cardboard disks. Cardboard disks were taken back to the laboratory, where each piece was carefully washed and spread out to dry. The amount of cardboard eaten was determined by scanning the pieces with a desktop scanner and calculating the area by using a computer graphics program (Adobe Photoshop). The experiment was continued for six weeks at each location.

Figure 10:
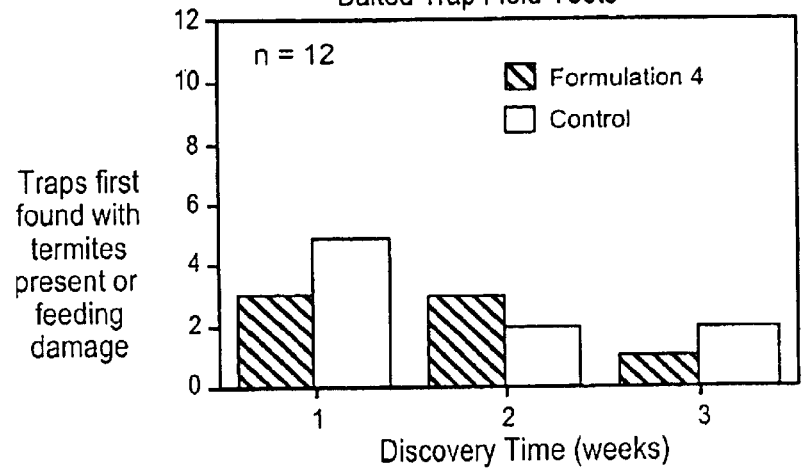
FIG. 10 illustrates baited trap discovery time by termites in Example 4.
Figure 11:
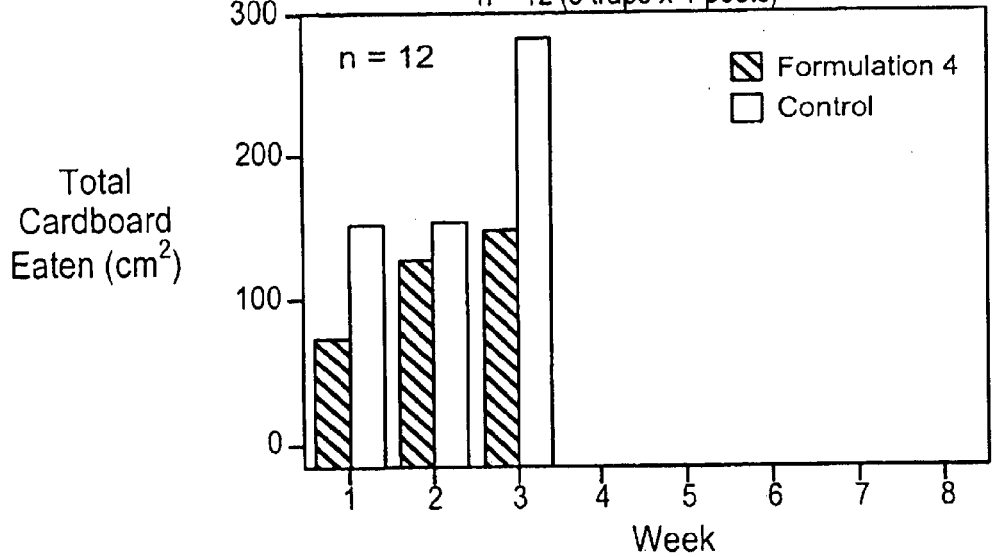
FIG. 11 illustrates total cardboard consumed by termites in baited traps in Example 4.

Results:
1. Traps baited with coated sucrose pellets (Formulation 4) were not discovered sooner by termites than unbaited traps (FIG. 10). Within 3 weeks, 10 baited and 10 unbaited traps had been discovered by termites.
2. Termites did not consume more cardboard from baited traps than from unbaited traps (FIG 11).
3. Termites were not found more often in the baited traps than the unbaited traps (data collected, but not shown here).

Conclusion:
This experiment demonstrated that not all carbohydrate sources are effective as baits for termites. In the specific context tested here, coated sucrose pellets did not attract termites or enhance feeding.

EXAMPLE 5

Formulation 1 in Jar Traps at 2 Meters

Composition of Formulation 1 (also denoted "F-1", and "Dried Spent Brewer's Grain"): Spent brewer's grain obtained from a local brewery was spread out on trays and allowed to air dry overnight. The dried spent brewer's grain was then added to soil that contained 20% moisture (12 grams dried spent brewer's grain per 100 grams moist soil).

Trap Design: Jar traps were constructed from 16 ounce polyethylene jars with plastic screw caps. Each jar was drilled with 36 evenly-spaced holes (3 mm diameter) to allow volatiles to diffuse out of the trap and to allow termites to enter. A cylindrical basket was constructed for each cup trap from plastic fencing to facilitate removing the trap from the soil. Baited traps were prepared by placing 300 grams of Formulation 1 in a jar trap. Unbaited traps were filled with 300 grams of soil (20% moisture). A pre-weighed square of Ponderosa pine (4×4×0.5 cm) was soaked in water for 15 minutes and was placed in the top of each trap (baited and unbaited), covered with a thin layer of soil, and the lid was then screwed onto the trap.

Field sites: Fence posts infested with termites (*Reticulitermes tibialis*) were used for field trapping experiments at three different ranches in Colorado (Fort Collins, Nunn, and Akron). Each infested fence post was used as a point source for an experiment. Six traps, three baited and three unbaited, were placed in the ground evenly around the fence post at a distance of 2 meters. The traps were placed in the ground at a depth of 20 to 25 cm and covered completely with soil. Traps were checked weekly for the presence of termites. Traps were checked for feeding damage on the wood squares. Wood squares were taken back to the laboratory, washed with water, and spread out to dry. The dried wood squares were weighed to determine the amount that had been eaten. The experiment was continued for six weeks at each location.

Figure 12:
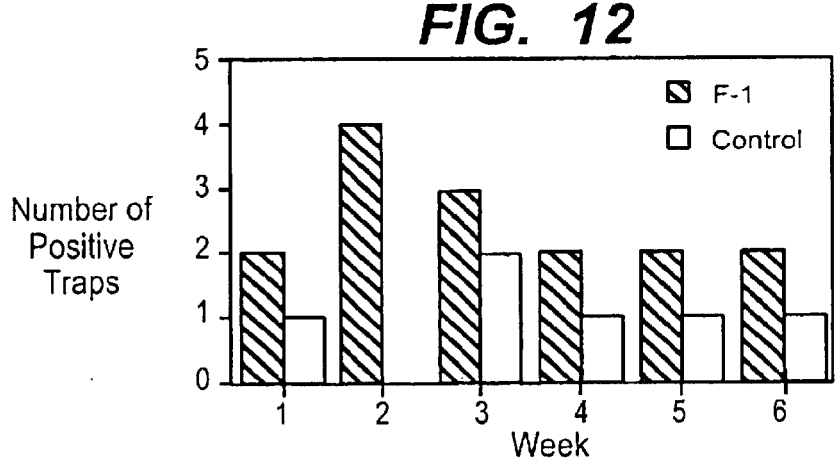
FIG. 12 illustrates number of positive traps in Example 5.
Figure 13:
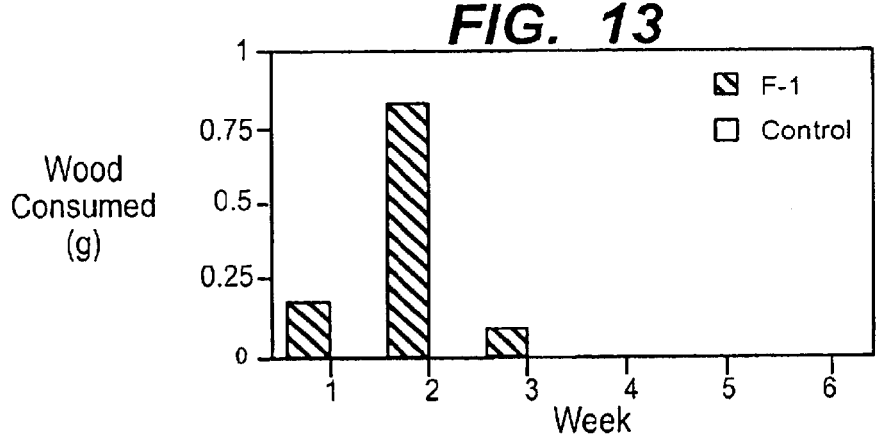
FIG. 13 illustrates wood consumed in Example 5.
Figure 14:
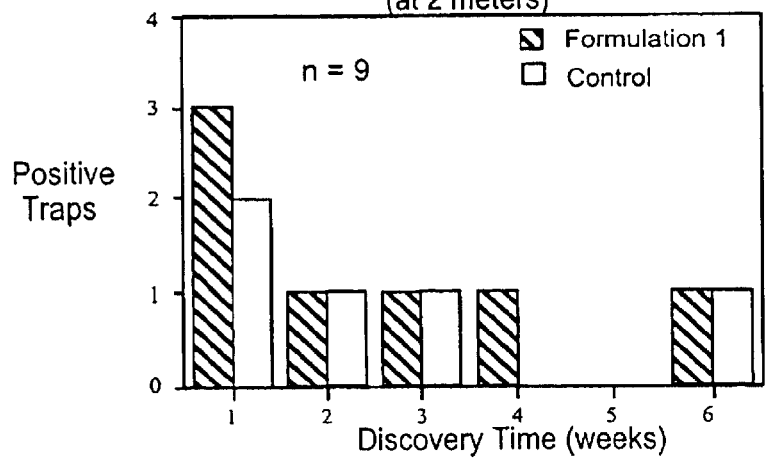
FIG. 14 illustrates baited trap discovery time in Example 5.

Results:
1. Traps baited with dried spent brewer's grain (Formulation 1) were discovered sooner by termites than unbaited traps (FIG. 12).
2. Termites consumed more wood from baited traps than from unbaited traps (FIG. 13).
3. Termites were found more often in the baited traps than the unbaited traps (FIG. 14).

Conclusion:
This example demonstrated that dried spent brewer's grain mixed with moist soil is effective as a bait for termites, not only at 1 meter from the infested wood structure as in Example 1, but also at 2 meters from the infested wood structure. In addition, this example showed that thin squares of Ponderosa pine could be used to evaluate feeding, as an alternative to the cardboard disks used in Example 1.

EXAMPLE 6

Formulation 2 in Jar Traps at 2 Meter

Composition of Formulation 2 (also denoted "F-2" and "Dried Ground Germinated Corn Seeds"): Corn seeds were soaked in soapy water overnight, rinsed well and germinated in a covered plastic tub containing moist germination paper. After 3 days of germination, the germinating corn was ground to meal using a kitchen food processor, than spread out on trays and allowed to air dry overnight. Dried, ground, germinated corn seed (12 grams per 100 grams soil) was added to soil that contained 20% moisture.

Trap Design: Jar traps were constructed from 16 ounce polyethylene jars with plastic screw caps. Each jar was drilled with 36 evenly-spaced holes (3 mm diameter) to allow volatiles to diffuse out of the trap and to allow termites to enter. A cylindrical basket was constructed for each cup trap from plastic fencing to facilitate removing the trap from the soil. Baited traps were prepared by placing 300 grams of Formulation 2 in a jar trap. Unbaited traps were filled with 300 grams soil (20% moisture). A pre-weighed square of Ponderosa pine (4×4×0.5 cm) was soaked in water for 15 minutes and was placed in the top of each trap (baited and unbaited), covered with a thin layer of soil, and the lid was then screwed onto the trap.

Field sites: Fence posts infested with termites (*Reticulitermes tibialis*) were used for field trapping experiments at three different ranches in Colorado (Fort Collins, Nunn, and Akron). Each infested fence post was used as a point source for an experiment. Six traps, three baited and three unbaited, were placed in the ground evenly around the fence post at a distance of 2 meters. The traps were placed in the ground at a depth of 20 to 25 cm and covered completely with soil. Traps were checked weekly for the presence of termites. Traps were checked for feeding damage on the wood squares. Wood squares were taken back to the laboratory, washed with water, and spread out to dry. The dried wood squares were weighed to determine the amount that had been eaten. The experiment was continued for six weeks at each location.

Figure 15:
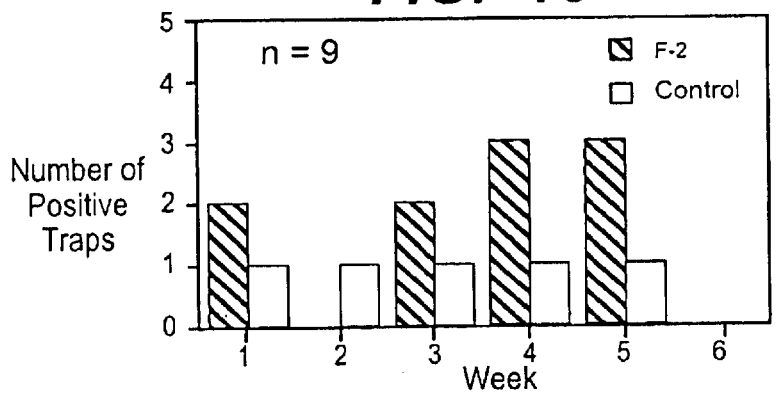
FIG. 15 illustrates number of positive traps in Example 6.
Figure 16:
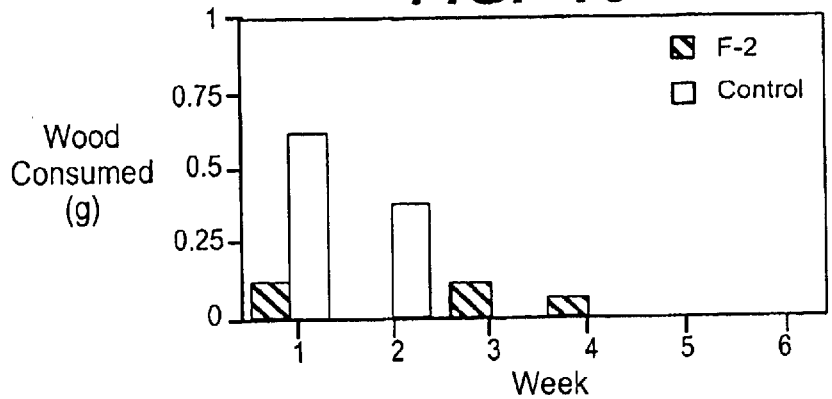
FIG. 16 illustrates wood consumed in Example 6.
Figure 17:
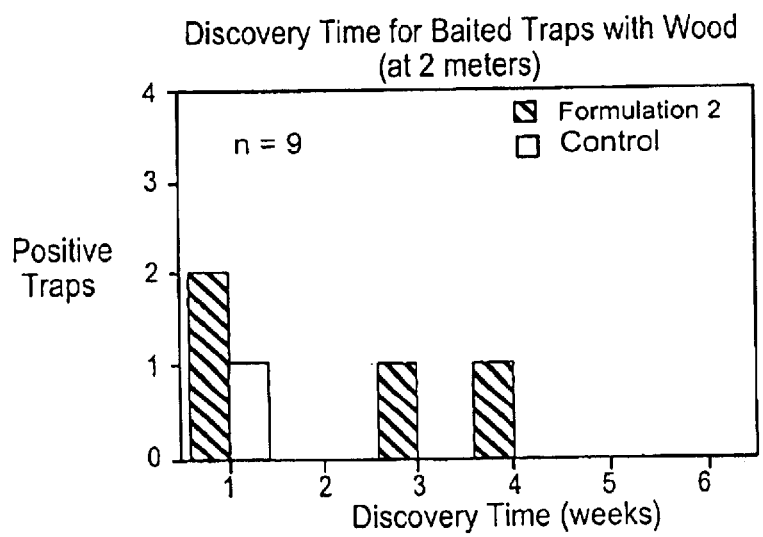
FIG. 17 illustrates baited trap discovery time in Example 6.

Results:
1. The discovery time was shorter for the baited traps than for the unbaited traps (FIG. 15).
2. More wood was consumed by termites in the unbaited traps than from the baited traps for weeks 1 and 2, but more was consumed from the baited traps in weeks 3 and 4 (FIG. 16).
3. Termites were found more often in the baited traps than the unbaited traps (FIG. 17).

Conclusion:
This example demonstrated that dried ground germinated corn seeds mixed with moist soil is effective as a bait for termites, not only at 1 meter from the infested wood structure as in Example 2, but also at 2 meters from the infested wood structure. In addition, this example showed that thin squares of Ponderosa pine could be used to evaluate feeding, as an alternative to the cardboard disks used in Example 2.

EXAMPLE 7

Formulation 5 in Jar Traps at 2 Meters

Composition of Formulation 5 (also denoted "F-5" and "Fizzles Instant Sparkling Drink Tablets"): Effervescent tablets comprised of 50:50 citric acid:sodium bicarbonate were obtained from a local grocery store (Fizzies brand drink tablets, Premiere Innovations, Pacific Palisades, Calif. 90272). Two tablets (3 grams each) were added to soil (300 grams) that contained 20% moisture.

Trap Design: Jar traps were constructed from 16 ounce polyethylene jars with plastic screw caps. Each jar was drilled with 36 evenly-spaced holes (3 mm diameter) to allow volatiles to diffuse out of the trap and to allow termites to enter. A cylindrical basket was constructed for each cup trap from plastic fencing to facilitate removing the trap from the soil. Baited traps were prepared by placing 300 grams of Formulation 5 in a jar trap. Control traps were filled only with 300 grams soil (20% moisture). A square of Ponderosa pine (4 cm by 4 cm by 0.5 cm width) that had been pre-weighed was moistened by soaking it in water for 15 minutes, then placed in the top of each trap (baited and unbaited) just below the surface of the soil.

Field sites: Fence posts infested with termites (*Reticulitermes tibialis*) were used for field trapping experiments at three different ranches in Colorado (Fort Collins, Nunn, and Akron). Each infested fence post was used as a point source for an experiment. Six traps, three baited and three unbaited, were placed in the ground evenly around the fence post at a distance of 2 meters. The traps were placed in the ground at a depth of 20 to 25 cm and covered completely with soil. Traps were checked weekly for the presence of termites. Traps were checked for feeding damage on the wood squares. Wood squares were taken back to the laboratory, washed with water, and spread out to dry. The dried wood squares were weighed to determine the amount that had been eaten. The experiment was continued for six weeks at each location.

Figure 18:
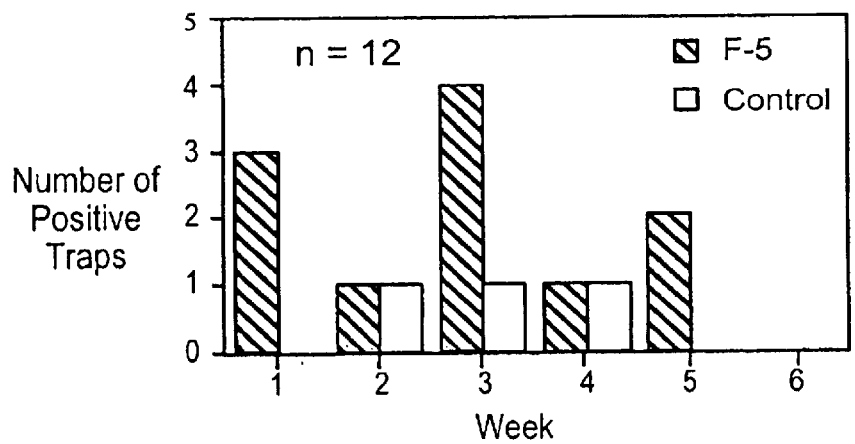
FIG. 18 illustrates number of positive traps in Example 7.
Figure 19:
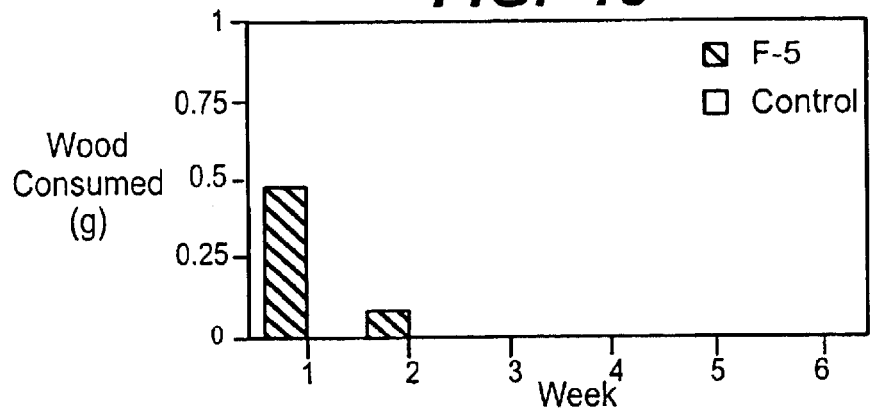
FIG. 19 illustrates wood consumed in Example 7.
Figure 20:
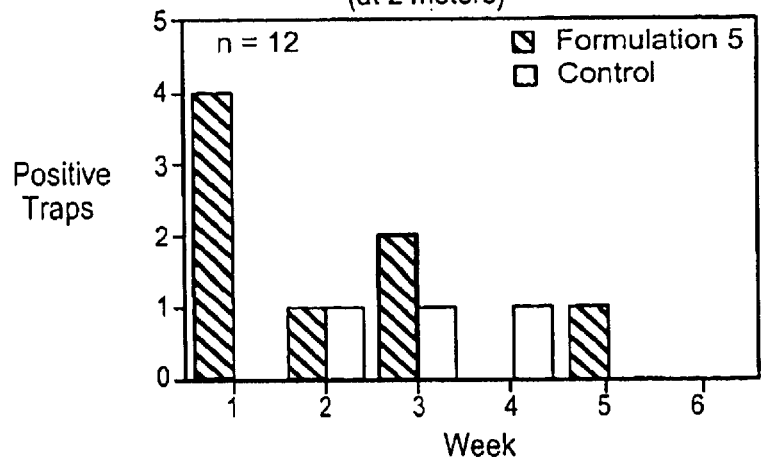
FIG. 20 illustrates baited trap discovery time in Example 7.

Results:
1. The discovery time was shorter for the baited traps than for the unbaited traps (FIG. 20).
2. More wood was consumed by termites in the baited traps than from the unbaited traps (FIG. 19).
3. Termites were found more often in the baited traps than the unbaited traps (FIG. 18).

Conclusion:
This example demonstrated that sodium bicarbonate/citric acid tablets mixed with moist soil is effective as a bait for termites.

EXAMPLE 8

$CO_2$-generating Formulations tested in Laboratory Behavioral Bioassays

Bioassay apparatus: The choice-test bioassay apparatus consisted of two traps, one filled with a $CO_2$-generating formulation mixed in soil and the other filled with soil alone. Traps were constructed from 1 ounce plastic nut cups with a 1 mm hole drilled in the top and three pin holes drilled at equal intervals around the cup (placed midway from top to bottom) to allow $CO_2$ to diffuse out. A triangular hole (4 mm high and wide) was cut on the top edge of each cup and a similar triangle was cut from the edge of the lid. With the lid in place and the holes lined up, a small opening was created to allow termites to enter the apparatus from the bottom.

The two cups (1 treatment and 1 control) were placed at opposite ends of a plastic tub (Rubbermaid, 24 oz., 19 by 10.5 by 5.5 cm). Termites (15 workers) were collected from one of 20 recently field-collected colonies using a small paint brush and were placed in a plastic shell vial (4 ml) cap. The cap was inverted on a 1.5 cm circle of moist filter paper in the center of the plastic tub. The tub was placed on one shelf of a small wood shelf unit whose base is constructed of 10 cm thick foam rubber. After 15 minutes, the shell vial cap was gently tipped over, releasing the termites. A curtain was pulled in front of the shelves to provide dim lighting. After 24 hours, the tub was removed, each cup was gently disassembled and the termites counted. Termites were not reused in subsequent tests. All 12 formulations were tested using *Reticulitermes tibialis* (20 replicates) and 4 of the formulations were tested using *Reticulitermes virginicus* (10 replicates).

Preparation of Formulations: A $CO_2$-generating formulation was added to soil that contained 20% moisture. The amount of each formulation to be mixed with 100 grams soil is listed below. For each experiment, one cup was filled with 25 grams moist soil (20% water). The other cup was filled with formulation/soil mixture (25 grams total). A circle of corrugated cardboard (3 cm diameter) was moistened with water, blotted lightly and placed on top of soil. The lid was put on and the cups were inverted.

Analysis of $CO_2$: A capillary tube (5.5 cm long, 0.5 mm diameter) was inserted into the hole in the top of the inverted plastic cup. $CO_2$ was measured by taking a sample of the atmosphere within the soil using a 10 microliter syringe. The $CO_2$ concentration was determined using gas chromatography-mass spectrometry with selected ion monitoring (GC-MS-SIM) at m/e 44. The cup was used for a behavioral bioassay after the $CO_2$ concentration was determined to be adequate. Some formulations required 24–36 hours to generate enough $CO_2$.

Results:
Formulation 1: Dried Spent Grain (0.5 grams per 25 grams soil): Significantly more termites were recovered from the treated cups than the controls for both species of termites (FIGS. 21 and 22. Formulation 1). The average $CO_2$ concentration at the start of the bioassay was 6.48 mmol per mol (FIG. 23. Formulation 1). Formulation 2: Dried Ground Germinated Corn Seeds (0.5 grams per 25 grams soil): Significantly more termites were recovered from the treated cups than the controls for *Reticulitermes tibialis* (FIG. 21. Formulation 2). Slightly more termites were recovered from the treated cups than the controls in tests with *Reticulitermes virginicus* (FIG. 22. Formulation 2). The average $CO_2$ concentration at the start of the bioassay was 5.55 mmol per mol (FIG. 23. Formulation 2).

Figure 22:
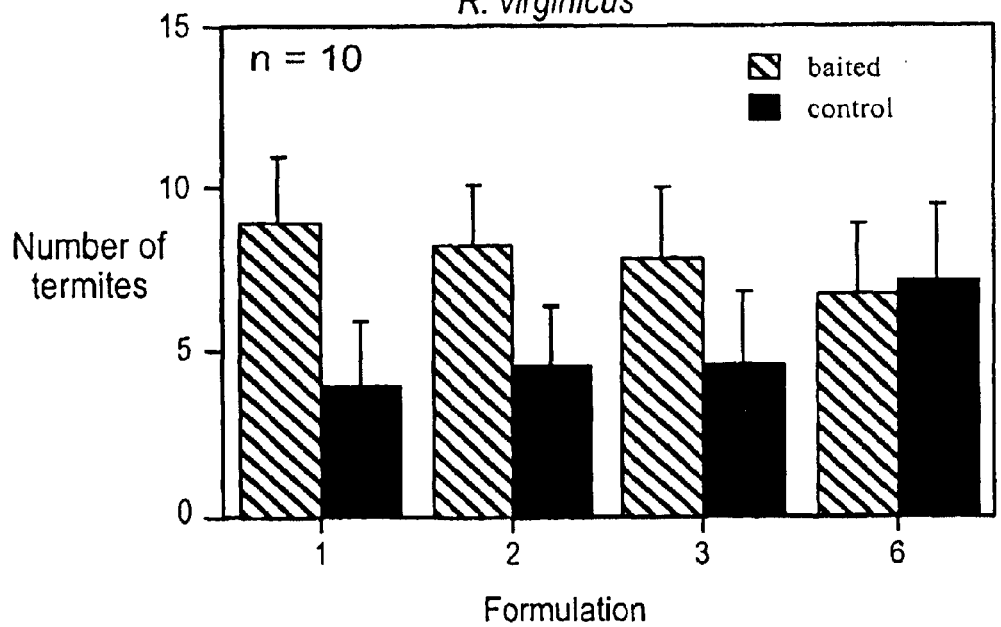
FIG. 22 illustrates number of R. virginicus recovered in bioassays of Example 8.
Figure 23:
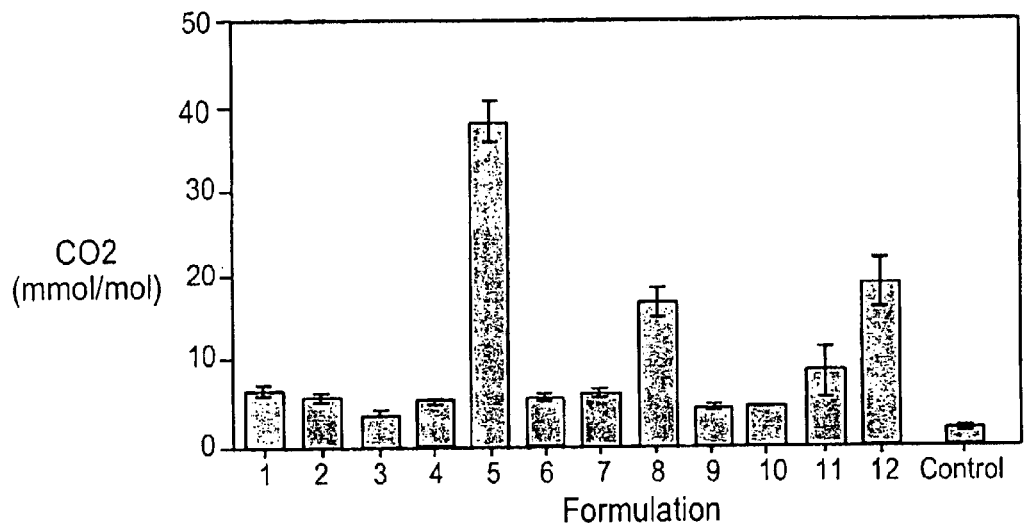
FIG. 23 illustrates $CO_2$ concentration in bioassays of Example 8.

Formulation 3: Whole, malted barley (0.5 grams per 25 grams soil): Significantly more termites were recovered from the treated cups than the controls for *Reticulitermes tibialis* (FIG. 21. Formulation 3). Slightly more termites were recovered from the treated cups than the controls in tests with *Reticulitermes virginicus* (FIG. 22. Formulation 3). The average $CO_2$ concentration at the start of the bioassay was 3.7 mmol per mol (FIG. 23. Formulation 3). Formulation 4: Sucrose pellets with a light wax coating (0.5 grams per 25 grams soil): Significantly more termites were recovered from the treated cups than the controls for *Reticulitermes tibialis* (FIG. 21. Formulation 4). The average $CO_2$ concentration at the start of the bioassay was 5.22 mmol per mol (FIG. 23, Formulation 4). Formulation 5: Effervescent tablets (Fizzies brand drink tablets, 0.25 grams per 25 grams soil): There was no significant difference in the number of termites recovered from the treatment and the control for *Reticulitermes tibialis* (FIG. 21. Formulation 5). The average $CO_2$ concentration at the start of the bioassay was 38.19 mmol per mol (FIG. 23. Formulation 5).

Figure 21:
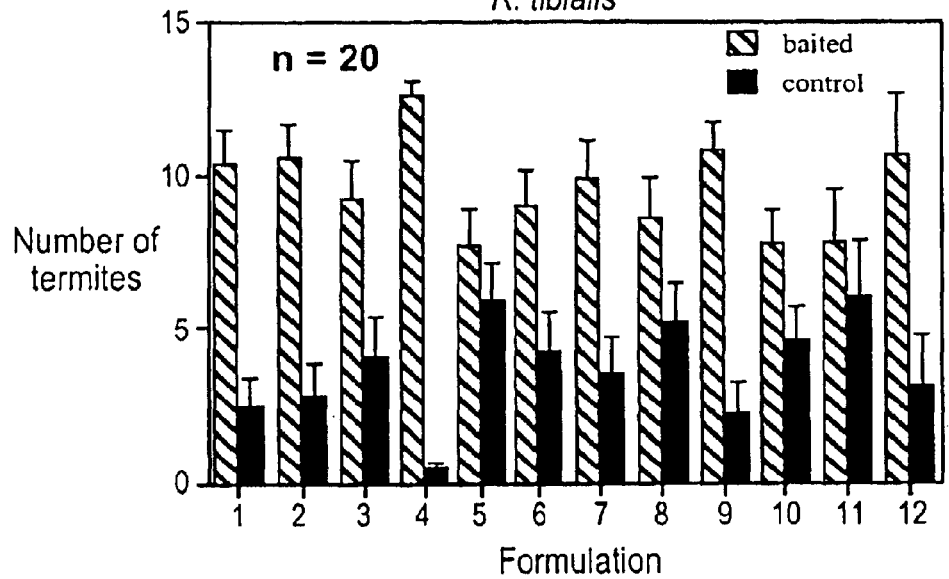
FIG. 21 illustrates number of *R. tibalis* recovered in bioassays of Example 8.

Formulation 6: Yeast Granules (made from corn flour, corn syrup, NYPD nutrient broth and baker's yeast, 0.5 grams granules per 25 grams soil): Significantly more termites were recovered from the treated cups than the controls for *Reticulitermes tibialis* (FIG. 21, Formulation 6). There was no significant difference in the number of termites recovered from the treatment and the control for *Reticulitermes virginicus* (FIG. 22, Formulation 6). The average $CO_2$ concentration at the start of the bioassay was 5.60 mmol per mol (FIG. 23, Formulation 6).

Formulation 7: Dry Baker's Yeast (0.25 grams granules per 25 grams soil): Significantly more termites were recovered from the treated cups than the controls for *Reticulitermes tibialis* (FIG. 21. Formulation 7). The average $CO_2$ concentration at the start of the bioassay was 5.93 mmol per mol (FIG. 23. Formulation 7).

Formulation 8: Potassium Bicarbonate, Fine Granules (0.25 grams granules per 25 grams soil): Significantly more termites were recovered from the treated cups than the controls for *Reticulitermes tibialis* (FIG. 21. Formulation 8). The average $CO_2$ concentration at the start of the bioassay was 16.71 mmol per mol (FIG. 23. Formulation 8).

Formulation 9: Clean Cracked Corn (sold as livestock feed) (0.5 grams granules per 25 grams soil): Significantly more termites were recovered from the treated cups than the controls for *Reticulitermes tibialis* (FIG. 21. Formulation 9). The average $CO_2$ concentration at the start of the bioassay was 4.21 mmol per mol (FIG. 23. Formulation 9).

Formulation 10: Ground Dry Corn Seed (0.5 grams granules per 25 grams soil): Significantly more termites were recovered from the treated cups than the controls for *Reticuliter-*

*mes tibialis* (FIG. 21. Formulation 10). The average $CO_2$ concentration at the start of the bioassay was 4.48 mmol per mol (FIG. 23. Formulation 11).

Formulation 11: Ground Malted Barley (0.5 grams granules per 25 grams soil): There was no significant difference in the number of termites recovered from the treatment and the control for *Reticulitermes tibialis* (FIG. 21. Formulation 11). The average $CO_2$ concentration at the start of the bioassay was 8.31 mmol per mol (FIG. 23. Formulation 11).

Formulation 12: Baking Powder/Corn Syrup Granules (0.5 grams granules per 25 grams soil): These granules were made from double-acting baking powder and corn syrup. Significantly more termites were recovered from the treated cups than the controls for *Reticulitermes tibialis* (FIG. 21. Formulation 12). The average $CO_2$ concentration at the start of the bioassay was 18.86 mmol per mol (FIG. 23, Formulation 12).

Conclusions:
1. In laboratory behavioral bioassays, *Reticulitermes tibialis* exhibited attraction to formulations 1, 2, 3, 4, 6, 7, 8, 9, 10 and 12 (FIG. 21). In this particular context, *Reticulitermes tibialis* were not attracted to formulation 5 or 11.
2. In laboratory bioassays, *Reticulitermes virginicus* exhibited attraction to formulations 1, and 2 (FIG. 22). In this particular context, *Reticulitermes virginicus* were not attracted to formulation 3 or 4.
3. All the formulations contained elevated $CO_2$ by comparison with controls (FIG. 23).

EXAMPLE 9

Formulation 1 in Dow Sentricon Bait Stations

Composition of Formulation 1: Dried spent brewer's grain was obtained from a local brewery, and was spread out and allowed to air dry overnight. Dried spent grain (12 grams per 100 grams soil) was added to soil that contained 20% moisture.

Trap Design: Dow Sentricon Termite Bait Stations were used for field experiments. A perforated plastic sleeve of our own design was inserted into each Dow Sentricon Termite Bait Stations to allow $CO_2$ generating formulations to be used in them. The insert consisted of a tube (21 cm long, 3.5 cm diameter) constructed of clear acetate film. Holes were punched 3 cm apart in the tube (0.5 cm) to allow $CO_2$ to diffuse out and to allow termites to enter the trap. Baited traps were prepared by placing a strip of Dow Sentricon Wood (18 cm by 2.5 cm by 0.5 cm) inside a perforated plastic sleeve, then adding 150 grams of Formulation 1. This thinner strip of Dow wood was necessary in order to allow Formulation 1 to fill the plastic sleeve properly. The filled sleeve was then inserted into a Dow Sentricon Termite Bait Station. Control traps contained perforated plastic sleeves filled with a strip of Dow Sentricon Wood and 150 grams soil (20% moisture).

Field sites: Fence posts infested with termites (*Reticulitermes tibialis*) were used for field trapping experiments at three different ranches in Colorado (Fort Collins, Nunn, and Akron). Each infested fence post was used as a point source for an experiment. Six traps were placed in the ground evenly around each infested fence post at a distance of 1 meter:
1. Two baited traps, containing bait plus soil, with 1 strip of Dow wood (18×2.5×0.5 cm)
2. Two unbaited traps, containing soil only, with 1 strip of Dow wood (18×2.5×0.5 cm)
3. Two standard Dow Sentricon Stations, with 2 strips of Dow wood (18×2.5×1 cm)

The traps were placed in the ground so that only the cover was exposed. Traps were checked weekly for the presence of termites by lifting the insert out of the trap for examination. The experiment was continued for 6 weeks. At the end of the experiment all wood strips were evaluated for feeding damage.

Figure 24:
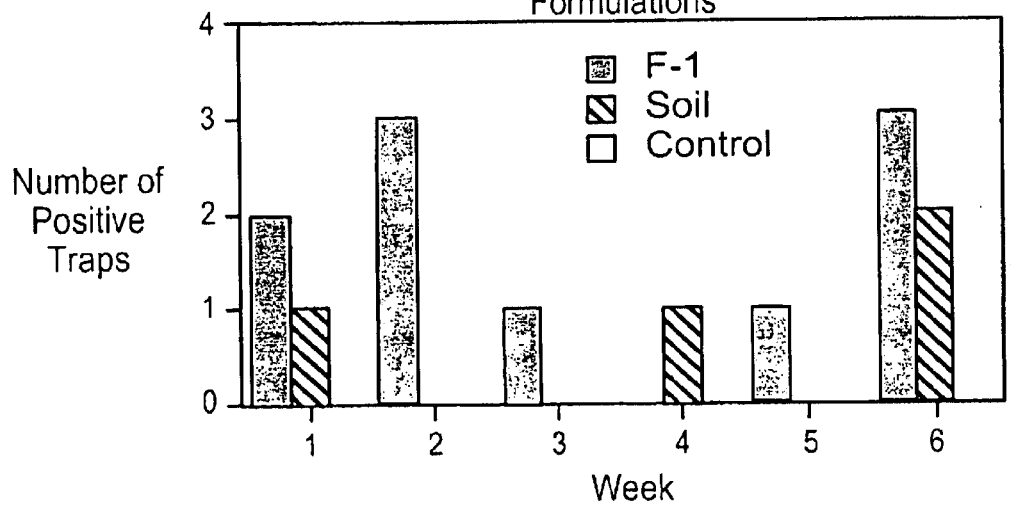
FIG. 24 illustrates number of positive traps in Example 9.

Results:
1. Termites were present in the baited traps for 5 out of 6 weeks of the experiment (FIG. 24).
2. Termites were present in the soil-only control traps during week 1, 4, and 6 (FIG. 24).
3. Termites were not present in any of the Dow control traps during the entire 6 weeks (FIG. 24).
4. Feeding on the wood strips was heavier in the baited traps and in the soil-only control traps than in the unmodified Dow Sentricon Bait Stations (data collected, but not shown).

Conclusion: This experiment demonstrated that the modified Dow Sentricon Bait Stations containing Formulation 1 (dried spent brewer's grain) were discovered sooner and frequented more often by termites than the unmodified Dow Sentricon Bait Stations.

EXAMPLE 10

Formulation 2 in Dow Sentricon Bait Stations

Composition of Formulation 2: Corn seeds were soaked in soapy water overnight, rinsed well and germinated in a covered plastic tub containing moist germination paper. After 3 days of germination, the germinating corn was ground to meal using a kitchen food processor, then spread out on trays and allowed to air dry overnight. Formulation 2 consists of a mixture of the dried ground germinated corn seed and soil containing 20% moisture, wherein 12 grams of the dried ground germinated corn seed was added for each 100 grams of the soil containing 20% moisture.

Trap Design: Dow Sentricon Termite Bait Stations were used for field experiments. A perforated plastic sleeve of our own design was inserted into each Dow Sentricon Termite Bait Stations to allow $CO_2$ generating formulations to be used in them. The sleeve consisted of a tube (21 cm long, 3.5 cm diameter) constructed of clear acetate film. Holes were punched 3 cm apart in the tube (0.5 cm) to allow $CO_2$ to diffuse out and to allow termites to enter the trap. Baited 70 traps were prepared by placing a strip of Dow Sentricon Wood (18 cm by 2.5 cm by 0.5 cm) inside a perforated plastic sleeve, then adding 150 grams of Formulation 2. This thinner strip of Dow Sentricon Wood was necessary in order to allow Formulation 2 to fill the plastic sleeve properly. The filled sleeve was then inserted into a Dow Sentricon Termite Bait Station. Control traps contained perforated plastic sleeves filled with a strip of Dow Sentricon Wood and 150 grams soil (20% moisture).

Field sites: Fence posts infested with termites (*Reticulitermes tibialis*) were used for field trapping experiments at three different ranches in Colorado (Fort Collins, Nunn, and Akron). Each infested fence post was used as a point source for an experiment. Six traps were placed in the ground evenly around each infested fence post at a distance of 1 meter:
1. Two baited traps, containing bait plus soil, with 1 strip of Dow wood (18×2.5×0.5 cm)
2. Two unbaited traps, containing soil only, with 1 strip of Dow wood (18×2.5×0.5 cm)
3. Two standard Dow Sentricon Stations, with 2 strips of Dow wood (18×2.5×1 cm)

The traps were placed in the ground so that only the cover was exposed. Traps were checked weekly for the presence of termites and for feeding damage by lifting the insert out of the trap for examination. The experiment was continued for 6 weeks.

Figure 25:
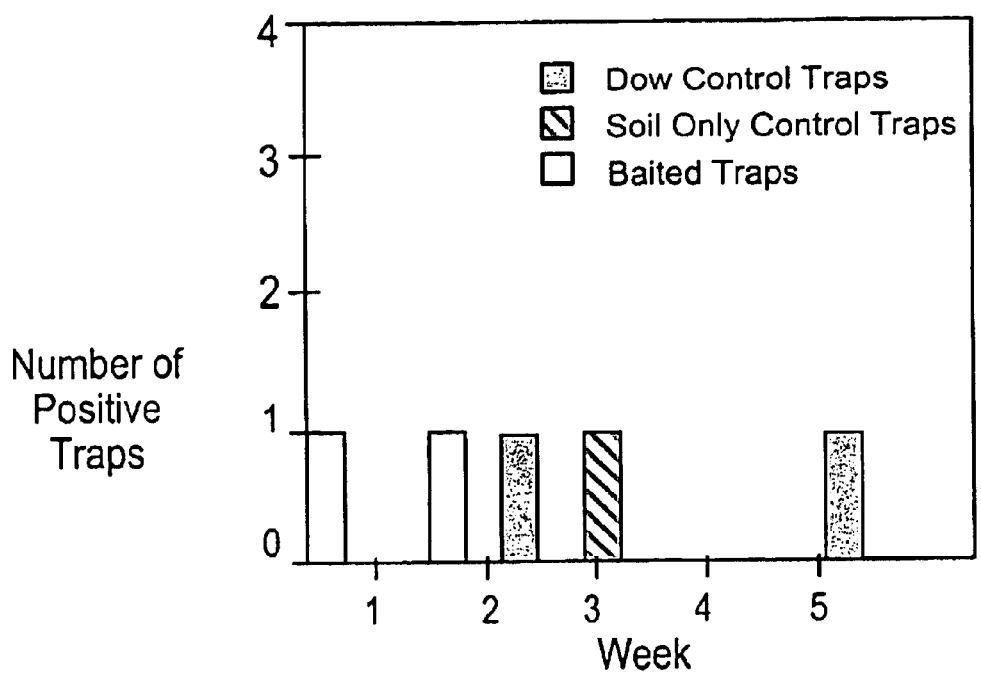
FIG. 25 illustrates number of positive traps in Example 10.

Results:
1. Termites were present in the baited traps (i.e. using Formulation 2) for week 3 (FIG. 25).
2. Termites were present in the soil-only control traps for weeks 1 and 2 (FIG. 25).
3. Termites were present in the Dow control traps during weeks 2 and 5 (FIG. 25).

Conclusion:
This experiment demonstrated that the modified Dow Sentricon Bait Stations containing Formulation 2 (dried ground germinated corn seed) did not attract more termites than the unmodified Dow Sentricon Bait Stations, implying that the trap design used in Example 2 may be necessary in order for Formulation 2 to increase attraction of termites.

EXAMPLE 11

Formulation 4 in Dow Sentricon Bait Stations

Composition of Formulation 4: Sucrose pellets with a light wax coating were obtained from a local supplier (Sprinkle Decorations, Wilton Enterprises, Woodridge, Ill.). The sucrose pellets with a light wax coating were then added to soil that contained 20% moisture (12 grams per 100 grams moist soil).

Trap Design: Dow Sentricon Termite Bait Stations were used for field experiments. A perforated plastic sleeve of our own design was inserted into each Dow Sentricon Termite Bait Stations to allow $CO_2$ generating formulations to be used in them. The sleeve consisted of a tube (21 cm long, 3.5 cm diameter) constructed of clear acetate film. Holes were punched 3 cm apart in the tube (0.5 cm) to allow $CO_2$ to diffuse out and to allow termites to enter the trap. Baited traps were prepared by placing a strip of Dow Sentricon Wood (18 cm by 2.5 cm by 0.5 cm) inside a perforated plastic sleeve, then adding 150 grams of Formulation 4. This thinner strip of Dow Sentricon Wood was necessary in order to allow Formulation 4 to fill the plastic sleeve properly. The filled sleeve was then inserted into a Dow Sentricon Termite Bait Station. Control traps contained perforated plastic sleeves filled with a strip of Dow Sentricon Wood and 150 grams soil (20% moisture).

Field sites: Fence posts infested with termites (Reticulitermes tibialis) were used for field trapping experiments at two ranches in Colorado (Fort Collins and Nunn). Each infested fence post was used as a point source for an experiment. Six traps were placed in the ground evenly around each infested fence post at a distance of 1 meter:
1. Two baited traps, containing bait plus soil, with 1 strip of Dow wood (18×2.5×0.5 cm)
2. Two unbaited traps, containing soil only, with 1 strip of Dow wood (18×2.5×0.5 cm)
3. Two standard Dow Sentricon Stations, with 2 strips of Dow wood (18×2.5×1 cm)

The traps were placed in the ground so that only the cover was exposed. Traps were checked weekly for the presence of termites and for feeding damage by lifting the insert out of the trap for examination. The experiment was continued for 6 weeks.

Figure 26:
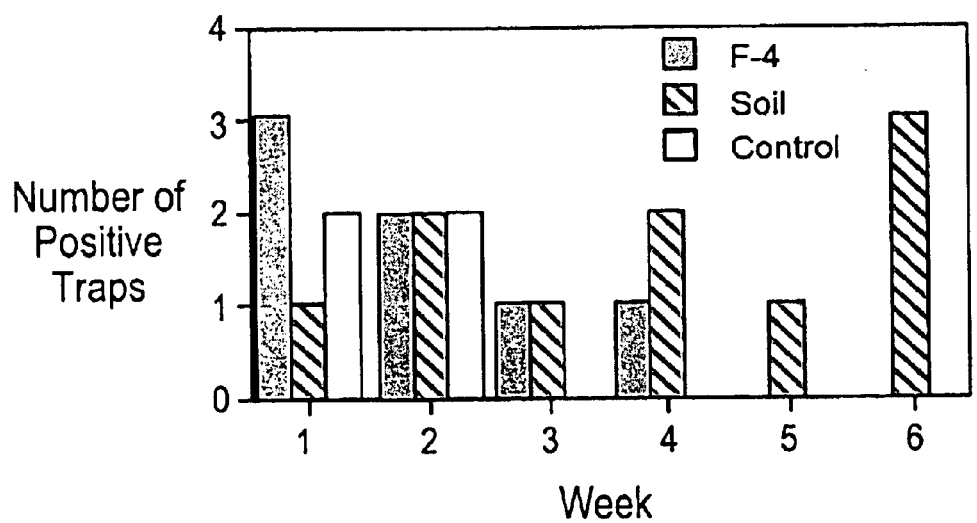
FIG. 26 illustrates number of positive traps in Example 11.

Results:
1. Termites were present in the baited traps for weeks 1 through 4 of the experiment (FIG. 26).
2. Termites were present in the soil-only control traps during all 6 weeks of the experiment (FIG. 26).
3. Termites were present in the Dow control traps during weeks 1 and 2 (FIG. 26).

Conclusion:
Traps containing Formulation 4 were initially more attractive than the soil-only control traps or the Dow control traps. However, soil-only control traps were the most attractive traps for the last weeks of the experiment.

EXAMPLE 12

$CO_2$-Dose Response in Behavioral Bioassays

Behavioral bioassay apparatus: The choice-test bioassay apparatus was constructed from a glass T-tube (5 mm inside diameter, 5 mm stem, with each branch 4.5 cm long). Each branch of the 'T' was bent downward (2.5 cm from the junction of the 'T') at a 45° angle to form a pitfall trap. A 5 mm NMR cap (cat. no. 100-0050, Drummond Scientific, Broomall, Pa.) with a 1 mm pinhole in it was firmly pushed over the end of each bent branch. A 25 cm length of Teflon tubing (0.8 mm inside diameter) was inserted 3 mm into the hole in each NMR cap and the other end of the tubing was connected to a 35 ml polyethylene syringe (cat. no. 106-0490, Sherwood Medical, St. Louis, Mo.). The two 35-ml syringes were connected to a syringe pump which was adjusted to provide an airflow of 1 ml per min into each choice arm of the bioassay apparatus.

Mixtures of $CO_2$ and ambient air were tested to determine the termite response to a range of $CO_2$ concentrations. A 35-ml syringe was rinsed with distilled water and partially filled (5 ml) with ambient air. Different amounts of 100% $CO_2$ were obtained with a smaller glass syringe from a tank and injected into the 35-ml syringe. Ambient air was then drawn into the 35-ml syringe to fill it and mix the gases by turbulence as the syringe was loaded. A 2nd 35-ml polyethylene syringe was filled with ambient air for a control. Measurements with GC-MS-SIM confirmed that the $CO_2$ concentrations reached equilibrium after 15 min. The $CO_2$ concentration of the syringes was determined by using GC-MS-SIM analysis (see below) before each bioassay. Bioassays were conducted with both Reticulitermes tibialis and Reticulitermes flavipes for 1, 2, 5, 10, 20, 50 and 500 mmol per mol concentrations of $CO_2$ and with Reticulitermes virginicus for 5, 10, 20, and 50 mmol per mol.

Procedure: For bioassays, termite workers were collected from plastic tubs by using a camel's hair brush and were placed into a holding container constructed from a 3 cm length of Teflon tubing (8 mm inside diameter). The container was plugged at one end with a NMR cap with two holes (1 mm) drilled in the bottom. A second NMR cap with a 4 mm hole was inserted backwards into the other end of the Teflon tube. The end of the NMR cap was sealed with a small square of cellophane held in place with a plastic tube (a piece of plastic soda straw) that fit snugly over the open end. Termites (5 workers) were placed in the container and the top was sealed. The container was placed horizontally and left undisturbed for 20 min. The T-tube apparatus was assembled and clamped horizontally on top of a block of foam rubber (12 by 12 cm) with a wire bent into a U-shape. The syringe pump was turned on, and after 3 min of pumping, the cellophane seal was removed from the holding container and the entrance to the holding container was gently connected to the central arm of the T-tube, allowing termites to crawl out and enter the apparatus. Bioassays were conducted for 15 min, after which the number of termites in each pitfall was recorded.

$CO_2$ measurements: Gas chromatography-mass spectrometry in selected ion monitoring mode (GC-MS-SIM) at m/e 44 was used to determine $CO_2$ concentrations. A Hewlett-Packard Series II 5890 gas chromatograph interfaced with a Hewlett-Packard 5971 mass selective detector was used with a methyl silicone capillary column (30 m×0.32 mm inside diameter, RSL-150, Alltech, Deerfield, Ill.). A 10-mmmol/mol mixture of $CO_2$ (a 300-ml glass bottle into which 3 ml of $CO_2$ was injected) was used as a standard to calculate the $CO_2$ concentrations of the unknown samples.

Figure 28:
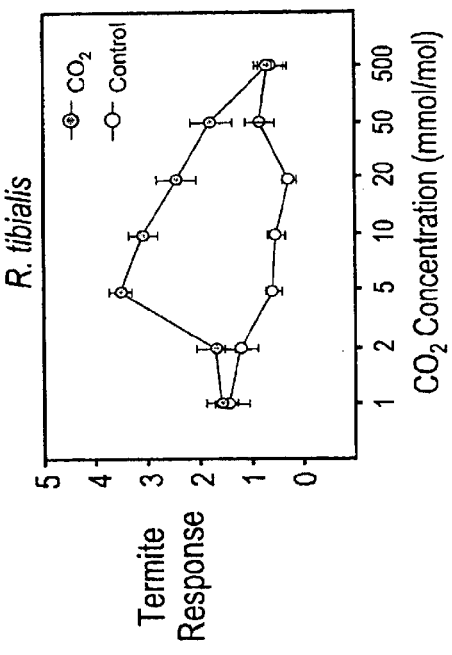
FIG. 28 illustrates termite response for R. tibalis in Example 12.

Results:
1. Reticulitermes tibialis was attracted to 10 and 20 mmol per mol $CO_2$.) FIG. 28). R. tibialis demonstrated the best attraction to 5 mmol per mol $CO_2$ (FIG. 28).

Figure 29:
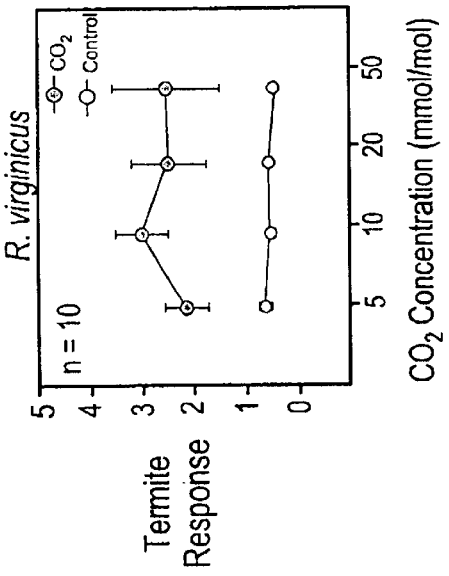
FIG. 29 illustrates termite response for R. virginicus in Example 12.
Figure 30:
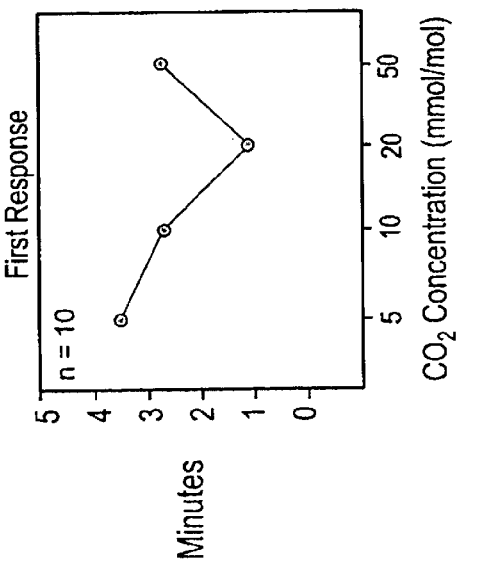
FIG. 30 illustrates a first response in Example 12.
Figure 27:
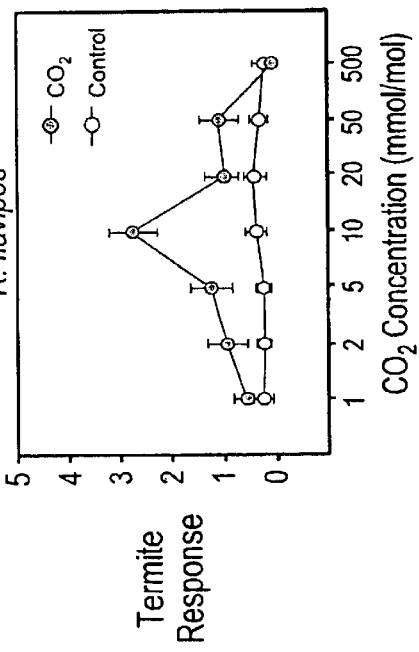
FIG. 27 illustrates termite response for R. flavines in Example 12.

2. *Reticulitermes flavipes* was attracted to 2, 5 and 10 mmol per mol $CO_2$. *R. flavipes* was most attracted to 10 mmol per mol (FIG. 27).
3. *Reticulitermes virginicus* was attracted to 5, 10, 20 and 50 mmol per mol $CO_2$. *R. virginicus* demonstrated best attraction to 10 mmol per mol $CO_2$ (FIG. 29).

Conclusions:

These laboratory bioassays demonstrated for the first time that termites are attracted to carbon dioxide. We have confirmed this attraction for 3 termite species, including *R. tibialis*, *R. flavipes* and *R. virginicus*.

EXAMPLE 13

Charred Wood in Dow Sentricon Bait Stations in Field Tests

Treated (Charred) Wood:

The wood strips (18×2.5×1 cm) were removed from new Dow Sentricon Bait Stations, and the surfaces were charred using a laboratory torch (propane and oxygen) with a three inch outer flame cone and one inch inner flame cone. The strips of wood were held in the flame and removed just prior to the point of ignition. All surfaces of the Dow Sentricon Wood strips were charred except for the top 3 cm of the wood strips. Prior to placing the strips in traps in the field, the strips were moistened by soaking in water for several minutes.

Trap design: We tested the attraction of termites to charred wood in field experiments during the summer of 1998. Standard Dow Sentricon Termite Bait Stations were used for field experiments.

Field sites: Fence posts infested with termites (*Reticulitermes tibialis*) were used for field trapping experiments at two ranches in Colorado (Fort Collins and Akron). Each infested fence post was used as a point source for an experiment. Six traps were placed in the soil evenly around a wood structure at a distance of 1 meter. For each experiment three of the traps contained 2 charred wood strips and three of the traps (controls) contained 2 uncharred wood strips. Traps were checked weekly for the presence of termites and feeding damage on the wood, for a period of 7 weeks.

Results:

1. Termites were present in baited traps for weeks 3 through 7 of the experiment.
2. No termites were found in any of the Dow control traps during the entire experiment.
3. Considerable termite feeding was observed on the charred Dow Sentricon Wood strips.

The feeding damage was restricted to the charred portions of the strips, and did not occur on the uncharred region at the tops of the strips (data collected, but not shown).

Conclusion:

This experiment demonstrates that charred Dow Sentricon Wood is more attractive to termites than the standard uncharred Dow Sentricon Wood, and that the charred wood acts as a feeding stimulant to termites.

EXAMPLE 14

Charred Wood in Laboratory Soil Tub Bioassays

Treated (Charred) Wood:

A strip of Dow Wood (18×2.5×1 cm) was removed from a new Dow Sentricon Bait Station and cut into two pieces (9×2.5×1 cm). The surfaces of one piece were charred using a laboratory torch (propane and oxygen) with a three inch outer flame cone and one inch inner flame cone. The strip of wood was held in the flame and removed just prior to the point of ignition. All surfaces of the charred Dow Sentricon Wood strip were charred except for the top 1 cm of the wood strips. Prior to placing the strips in the bioassay device, the strips were moistened in separate water baths for several minutes. Charred and uncharred pieces of Ponderosa pine (2×4×7.5 cm) were tested in the same way.

Side-by-Side Choice Test Bioassay

A plastic tub (15×10×30 cm) long was filled with 6 lbs. of soil (20% moisture by weight). This amount of soil allowed for a level of soil 2.5 cm from the top of the tub. Two pieces of wood, one charred and one uncharred, were placed at one end of the tub, 5 cm from the end of the tub and 3 cm apart. The wood pieces were set upright and inserted into the soil nearly touching the bottom of the tub, resulting in a thin layer of soil between each piece of wood and the bottom of the tub, and with the upper 4 cm of each wood piece extending above the surface of the soil. One hundred termites were held in a petri dish for one hour in the closed assay apparatus in order to become acclimated to their new environment. The lid was removed after one hour and the termites were released into the soil at the end of the tub opposite the wood bait. The lid was replaced on the tub, and the tub was placed in a dimly lighted area of the lab for one week. After one week the tub was inspected for termite activity near each piece of wood. After two weeks the tub was taken apart and the wood was cleaned and inspected for feeding damage.

Figure 31:
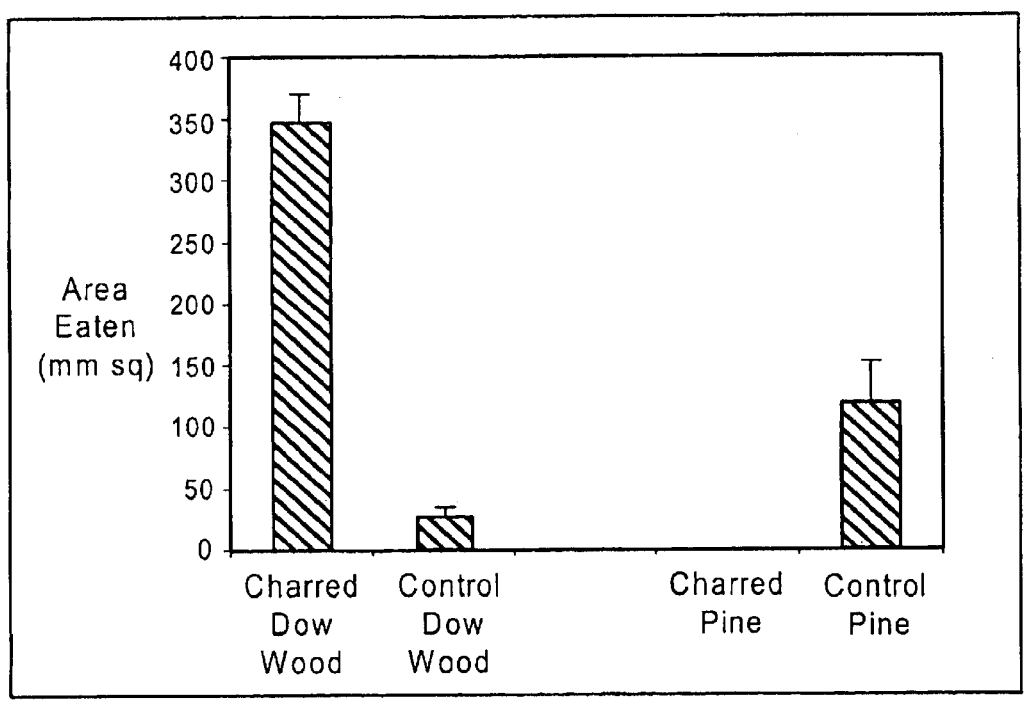
FIG. 31 illustrates area eaten for different types of wood in Example 14.

Results:

1. For the Dow wood, termites were observed feeding on the charred Dow Wood, and were not observed feeding on the uncharted Dow Wood.
2. Examination of the charred and uncharred Dow Wood at the end of the experiment indicated that most of the feeding had occurred on the charred Dow Wood (FIG. 31).
3. Insects that had fed on the charred Dow Wood had black material inside the hindgut clearly visible through the abdomen, confirming that they fed on the burnt wood.
4. For the Ponderosa pine, termites were never observed feeding on the charred Ponderosa pine, and fed only on the uncharted Ponderosa pine.
5. Examination of the charred and uncharred Ponderosa pine at the end of the experiment indicated that all of the feeding had occurred on the uncharred Ponderosa pine (FIG. 31).

Conclusion:

This experiment demonstrates that charred Dow Sentricon Wood is more attractive to termites than the standard uncharred Dow Sentricon Wood, and that the charred wood is acts as a feeding stimulant to termites. Charred Ponderosa pine is apparently repellent to termites, and does not elicit feeding by the termites.

EXAMPLE 15

Wood Impregnated with Spent Grain Extract in Lab Bioassays

Wood Impregnated with Aqueous Extract of Formulation 1:

A plastic bowl with a snap-fit lid (Rubbermaid, 6 cup size) was filled with 24 ounces of water and 24 ounces of Formulation 1 (dried spent brewer's grain). This was mixed well and several pieces of Dow Wood (9×2.5×1 cm) were added to the bowl. The bowl was covered with the snap-fit lid and heated in a microwave oven for 2 minutes, which brought the liquid to a boil. The bowl was removed from the microwave oven, the contents of the bowl were stirred, the snap-fit lid was replaced on the bowl (with 4 small pin holes in lid for breathing), and the covered bowl was allowed to stand for 3 days. After 3 days, the pieces of wood were removed, rinsed sparingly with water to remove physical debris, and placed on paper towels to dry for 2 days. The extract-impregnated pieces of wood were moistened before placement in the bioassay.

End-to-End Choice Test Bioassay

A rectangular plastic tub (15×10×30 cm) was evenly partitioned into three separate sections, with two partitions made from the cut ends of another tub hot melt glued into the main tub. The partitions were drilled with fourteen ⅛ inch holes such that the holes were all below the soil surface and evenly arranged top-to-bottom and side-to-side. The tub was filled with 6 lbs. of soil (20% moisture by weight), evenly in the three sections. This amount of soil allowed for a level of soil 2.5 cm from the top of the tub. Two pieces of wood, one treated and one untreated, were placed at opposite ends of the tub, 0.5 cm from the end of the tub and 10 cm from the partition. The treated and untreated wood pieces were set upright, one at each end of the tub, and inserted into the soil nearly touching the bottom of the tub, resulting in a thin layer of soil between each piece of wood and the bottom of the tub, and with the upper 4 cm of each wood piece extending above the surface of the soil. One hundred termites were held in a petri dish for one hour in the closed assay apparatus in order to become acclimated to their new environment. The lid was removed after one hour and the termites were released into the soil at the center of the tub. The lid was replaced on the tub, and the tub was placed in a dimly lighted area of the lab for one week. After one week the tub was inspected for termite activity near each piece of wood. After two weeks the tub was taken apart and the wood was cleaned and inspected for feeding damage.

Figure 32:
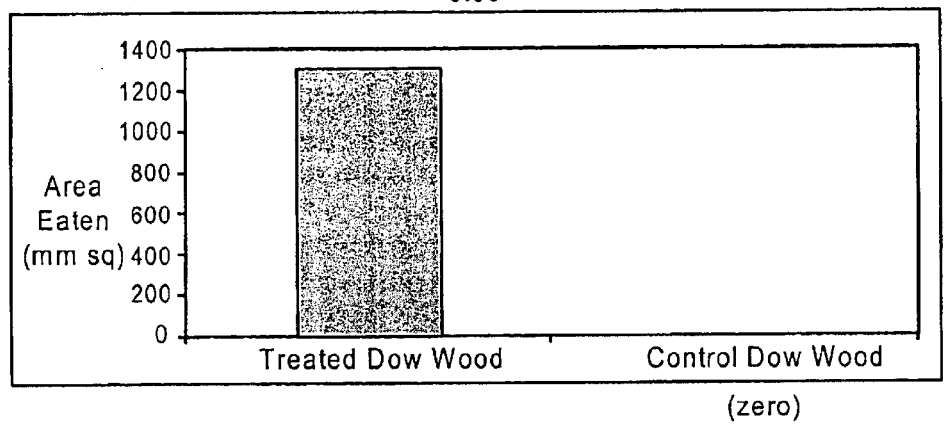
FIG. 32 shows a graph of the area eaten by termites in Example 15.
Figure 33:
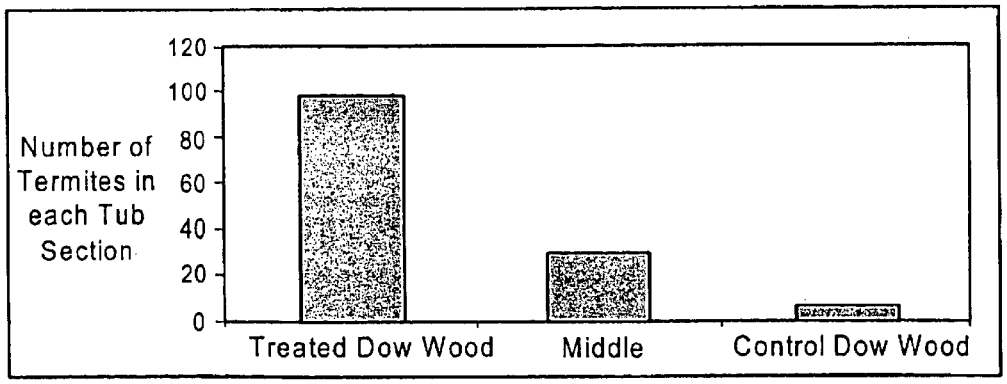
FIG. 33 shows a graph of the number of termites near treated Dow wood, near untreated Dow wood, and between the two pieces of wood (i.e. or middle area).

Results:
1. Termites were concentrated near the Dow wood impregnated with Formulation 1 (dried spent brewer's grain), and were not observed near the Dow wood piece that was untreated (FIG. 33).
2. Extensive feeding damage by termites was observed on the Dow wood impregnated with Formulation 1 (dried spent brewer's grain), but no feeding damage was observed on the Dow wood piece that was untreated (FIG. 32).

EXAMPLE 16

We showed in a laboratory behavioral bioassay that the termite *Reticulitermes tibialis* is attracted to $CO_2$, in which we used a test concentration of 5 mmol/mol, or 0.5% $CO_2$ in air. Our behavioral bioassay design involved a glass T-tube (5 mmID), modified with a laboratory torch so that the ends of the two choice arms projected down at 45 degrees angles from horizontal, to provide pitfalls after the termites made a choice. A syringe pump was used with two 35 ml polyethylene syringes, one filled with ambient air and the other filled with 5 mmol/mol $CO_2$ in air. Teflon tubing conveyed the odors to the two arms of the T-tube, at 1.0 ml/min into each arm. We used a bubble meter to verify that the outflow from the center arm was 2.0o ml/min, to assure that there were no leaks. We allowed the syringe pump to run for 3 min immediately before the bioassay began, to allow the flow rates and gas concentrations inside the T-tube to come to equilibrium. The body of the T-tube was mounted horizontally on a foam rubber block. A group of 5 termites was placed inside a small Teflon holding tube for 15 min. To allow them to acclimate to the bioassay environment (NMR caps with small holes in them to allow gas flow were used to plug the ends of the holding tube). The acclimation period and the bioassay itself were done under reduced lighting. After the 15 min acclimation period, an NMR cap was removed from one end of the holding tube, and the tube was connected to the center arm of the T-tube. Typical responses of the termites in the T-tube were consistent with our conclusion that the term "attraction is the correct interpretation of their behavior. When a termite cam to the choice point, it moved its antennae to one side and then the other, finally making a choice toward the $CO_2$ side. The side on which $CO_2$ was presented is randomized form replication to replication, to control for possible side-to-side bias in the bioassay. After making a choice, the termite moved along the arm about 2 cm to here the dropped off at 45 degrees, and slid down the chute into the pitfall. The number of termites that was attracted to the $CO_2$ side of the bioassay was significantly greater than the number that moved to the control side.

This experiment shows that $CO_2$ is useful in guiding termites to possible food sources. Second, the $CO_2$ concentration inside termite colonies is higher than that of ambient air, and termites use $CO_2$ as a guide in finding their way back to their colony.

EXAMPLE 17

A behavioral bioassay was used to demonstrate that termites are attracted to $CO_2$. When given a choice between a 5 mmol/mol concentration of $CO_2$ and a control containing ambient air (with a $CO_2$ concentration of 1 mmol/mol), the termites chose the mmol/mol $CO_2$ side significantly more often. The bioassay apparatus was constructed from a horizontal glass T-tube with the ends of the choice arms bent downward at 45 to provide pitfalls. A syringe pump was used to provide slow, consistent delivery of candidate compounds to the two sides of the choice-test.

Materials and Methods

Insects. Termites were obtained from colonies of *Reticulitermes tibialis* maintained at Colorado State University. Colonies were originally obtained in the summer of 1997 from 9 sites in Larimer County, Colorado.

Termite collections: Termites were collected at three different sites in Larimer County: Big Hill Overlook, Lone Pine Wildlife refuge, and Poudre Canyon in the early part of June 1997. The termites were captured in one of two ways. Big Hill termites were captured using traps consisting of a square wood frame (6×6') made of 1×1 untreated wood. In the center of the frame was a piece of doubly corrugated wood cut to fit the frame. The cardboard was held in by a wire mesh with ¼ inch holes. The traps were left for two weeks, in a spot where termites were seen. The termites were then removed from the traps and placed in petri dishes (see below). The second method (Lone Pine, and Poudre Canyon) was to look under logs and rocks. If a colony was located the individuals were collected using and aspirator and then transferred to a petri dish to be transported back to the lab.

Rearing: The termites were reared in petri dishes using moist paper towels and moist cardboard to provide cover and food. The termites were used in the bioassay usually within a week after collection but no less then 24 hours.

Bioassay Apparatus. The choice-test bioassay apparatus was constructed from a glass T-tube (5 mm inside diameter, 5 mm stem, with each branch 4.5 cm long). Each branch of the 'T' was bent downward (2 cm from junction of the T) at a 45 degree angle to form a 2.5 cm pitfall trap. A 5 mm NMR cap (cat. no. 100-0050, Drummond Scientific, Broomall, Pa.) with a 1 mm pinhole in it was firmly pushed over the end of each bent branch. A 25 cm length of Teflon tubing (0.8 mm ID) was inserted (3 mm) into the pinhole of each NMR cap and the other end of the tubing was connected to a 35 ml polyethylene syringe (cat no. 106-0490, Sherwood Medical, St. Louis, Mo.). The two 35-ml polyethylene syringes used for each bioassay were connected to a syringe pump (Sage Model 355, Fisher Scientific, Pittsburgh, Pa.) which was adjusted to provide an airflow of 1.0 ml/min into each choice arm of the bioassay apparatus.

Bioassay Procedure. For bioassays, termite workers were collected using a camel-hair brush from a petri dish containing moist paper towels and cardboard, and were placed in a holding container constructed from a 3 cm length of Teflon tubing (8 mm ID). The container was plugged at one end with a NMR cap with two holes (1 mm) drilled in the bottom. A second NMR cap with a 4 mm hole drilled through it was inserted backwards into the other end of the Teflon tube. The NMR cap was then sealed with a small square of cellophane held in place with a plastic tube (a piece of plastic soda straw) that fit snugly over the open end. Termites (5 workers) were placed in the container and the top was sealed. The container was placed on its side (horizontal) and left undisturbed for 30 minutes. The T-tube apparatus was assembled and clamped horizontally on top of a block of foam rubber (12 cm×12 cm) with a wire bent into a U-shape. The syringe pump was set to provide a flow of 1.0 mv min from each syringe, and each syringe was connected with Teflon tubing to one choice arm of the T-tube. A flow meter was used to verify that the flow exiting the central arm of the T-tube was 2.0 ml/min, confirming the flow of volatiles through the apparatus, and verifying that there were no leaks in the connections. If the flow was inadequate, all connections were inspected and/or secured, and the flow was rechecked. After 3 minutes of pumping, the cellophane and plastic tube blocking the top of the holding container were removed and the entrance of the holding container was gently connected to the central arm of the T-tube, allowing larvae to crawl out and enter the apparatus. Bioassays were conducted for 15 minutes, after which the number of termites in each pitfall were recorded. Termites were not reused in subsequent tests. Prior to each test, the glass T-tube and all Teflon pieces was washed with soap and water, rinsed with water and heated at 80 degrees C. in an oven for 30 min.

GC-MS Analysis Of $CO_2$. Mass spectrometry was used to determine $CO_2$ concentrations. A Hewlett-Packard Series H 5890 gas chromatograph interfaced with a Hewlett-Packard 5971 mass selective detector was operated in selected ion monitoring mode (SIM) for m/e 44 with a methyl silicone capillary column (30 m×0.32 mm ID, RSL-150, Alltech, Inc.). A 10 mmol/mol mixture of $CO_2$ (a 300 ml glass bottle into which 3 ml of $CO_2$ were injected) was used as a standard to calculate the $CO_2$ concentrations of the unknown samples.

$CO_2$ Bioassay. A 5 mmol/mol concentration of $CO_2$ was used to test termite attraction. A 35 ml polyethylene syringe was rinsed with distilled water to moisten the inside of the syringe, and partially filled (approximately 5 ml) with ambient air. $CO_2$ (100 microliters) was obtained with a glass syringe from a tank containing pure (100%) $CO_2$ and injected into the 35 ml polyethylene syringe. Ambient air was then drawn into the syringe to fill it to a total volume of 35 ml, mixing the air and $CO_2$ thoroughly by turbulence. The gas mixture in the syringe was allowed to equilibrate for 15 minutes, and GC-MS-SIM was used to verify the $CO_2$ concentration prior to each bioassay. A second 35 ml polyethylene syringe was filled with ambient air for a control, and the $CO_2$ concentration was measured using GC-MS-SIM.

Statistical Analysis. Analysis of variance was conducted with Minitab (Addison-Wesley Publishing Co. Inc., Reading, Mass.). Fishers LSD test was used for all a posteriori comparisons, with P=0.05.

Results $CO_2$ Bioassay. Significantly more termites (p<0.05) were attracted to the side containing 5 mmol/mol $CO_2$ than to the control side.

Discussion

We propose for the first time a specific behavioral role of $CO_2$ with regard to termites. Using a new behavioral bioassay, we have demonstrated that termites are attracted to low levels of $CO_2$. The workers exhibited a positive chemotactic response to $CO_2$ in the bioassay similar to that demonstrated by other soil-dwelling organisms.

EXAMPLE 18

A behavioral bioassay was developed to test responses of newly hatched (neonate) larvae of western corn root worm *Diabrotica virgifera virgifera* LeConte to volatile compounds from corn plants, a major host for this insect. A glass Y-tube filled with glass beads was used to allow choice tests in a vertical direction and to reproduce the thigmotactic cues available to larvae in their natural soil environment. A syringe pump was used to provide slow, consistent delivery of candidate compounds to the 2 sides of the apparatus. Significantly more larvae were attracted to the side containing a germinating corn seed than to the side containing ambient air. In addition, significantly more larvae were attracted to the side containing cut corn roots than to the side containing an ambient air control. Carbon dioxide ($CO_2$) from corn roots previously has been implicated as an attractant for the larvae, and dose—response curves for larval attraction to $CO_2$ were obtained using different sources (different dilutions of carbonated water, the headspace over a carbonated water dilution, and different concentrations of $CO_2$ in air). The $CO_2$ concentrations for all sources were measured by mass spectrometry with selected ion monitoring at m/e 44. Neonate larvae were significantly attracted to concentrations of $CO_2$ as low as (1.125±0.04 mmol/mol (concentration of $CO_2$ in ambient air on the control side was 0.99±0.02 mmol/mol). Larvae were optimally attracted to 2.51–4.20 mmol/mol $CO_2$, but they were attracted to concentrations as high as 100 mmol/mol. Larvae were not attracted to 300 or 900 mmol/mol $CO_2$, and they exhibited toxic symptoms at these high concentrations. The concentration of $CO_2$ in soil near growing corn roots was 4.36±0.31 mmol/mol, which was consistent with the behavioral optimum for the larvae. The concentration of $CO_2$ in soil that contained no corn was 1.38±0.03 mmol/mol and the concentration in ambient air was 0.94±0.01 mmol/mol.

WESTERN CORN ROOT WORM, *Diabrotica virgifera virgifera* LeConte, is a major pest of corn, *Zea mays L.*, in the United States (Krysan and Miller 1986). The larvae can survive only on corn and a few other species of Poaceae (Branson and Ortman 1967, 1970), and they have been reported to move as far as 1 meter through the soil to find roots of a suitable host (Short and Luedtke 1970). Overwintering eggs hatch in the spring, and larvae must crawl through the soil to locate the roots on which they feed. One of the most important cues used by these larvae to locate corn roots is carbon dioxide ($CO_2$), which is given off by corn roots in the soil (Harris and Van Bavel 1957, Massimino et al. 1980, Desjardins 1985, Labouriau and Jose 1987). Strnad et al. (1986) first reported that western corn root worm larvae are highly attracted to $CO_2$, and subsequent investigators have confirmed this attraction (Hibbard and Bjostad 1988, MacDonald and Ellis 1990, Strnad and Dunn 1990, Jewett and Bjostad 1996). In laboratory bioassays, Hibbard and Bjostad (1988) showed that a cryogenic collection of volatile compounds from germinating corn seeds was attractive to 2nd instars of western corn root worm, and that $CO_2$ was present in the cryogenic collections. Jewett and Bjostad (1996) showed that dichloromethane is attractive to *Diabrotica* larvae, apparently because the structure of dichloromethane mimics $CO_2$ in its interaction with larval chemoreceptors.

Carbon dioxide alone is attractive to a number of soil invertebrates, including insect larvae (Kingler 1957, 1958, 1959, 1961, 1965, 1966; Paim and Beckel 1963b; Stadler 1971, 1972; Meeking et al. 1974; Doane et al. 1975; Jones and Coaker 1977, 1979), insect adults (Paim and Beckel 1963a, b), mites (Moursi 1962, 1970), chilopods (Moursi 1970), nematodes (Johnson and Viglierchio 1961; Klingler 1961, 1963, 1965; Gaugler et al. 1980; Prot 1980; Dusenbery 1987; Pline and Dusenbery 1987; Robinson 1995), and bacteria (Scher et al. 1985).

The minimum concentration of $CO_2$ required for attraction of western corn root worm larvae and the concentration for optimal attraction have not previously been determined. The objectives of the current study were to determine threshold concentrations of $CO_2$ for attraction of western corn root worm larvae and to determine the range of concentrations attractive to the larvae. If western corn root worm larvae are given a choice between a high and a low concentration of $CO_2$, the difference in concentration required to elicit a significant difference in attraction would be expected to increase as both concentrations are increased, and we tested this hypothesis as well.

In strong contrast to previous reports from our laboratory, we have recently concluded that $CO_2$ is the only volatile compound that attracts western corn root worm larvae to corn roots (E.J.B., unpublished data), and that other volatile compounds from corn roots play no role in attraction. Previously in our laboratory, a blend of 6-methoxy-2-benzoxazolinone and stearic, oleic, and linoleic acids was reported to enhance the attractiveness of $CO_2$ to 2nd instars (Hibbard and Bjostad 1988, 1989, 1990; Bjostad and Hibbard 1992; Hibbard et al. 1994), but these compounds had little or no effect in field tests (Hibbard et al. 1995). We now believe that the apparent enhancement of larval attraction to $CO_2$ by a blend of 6-methoxy-2 benzoxazolinone and 3 fatty acids that we previously reported was caused by a series of experimental artifacts. Our new results indicate that it may be possible to use chemical or microbial sources of $CO_2$ in soil agroecosystems to interfere with orientation of western corn root worm larvae to corn roots, as a new tool in pest management (E.J.B., unpublished data).

Materials and Methods

Insects. Western corn root worms have been reared in our laboratory since 1986 (nondiapausing strain, originally obtained from J. Jackson, USDA-ARS, Brookings, S. Dak.). The insects were reared on corn plants grown in soil in an incubator by using methods described by Jackson (1985) and modified by Hibbard and Bjostad (1988). Corn. Untreated, dried corn seeds (*Zea mays L.*, cv 3055 provided courtesy of Gary D. Lawrance, Pioneer Hi-Bred International, Inc., Johnston, Iowa) were washed with liquid soap, soaked for 24 hours in soapy water (I drop of Ivory dishwashing liquid, Procter & Gamble, Cincinnati, Ohio, per liter of water), and rinsed thoroughly with water. For use in bioassays, the washed seeds were germinated 3 days on germination paper (Steel Blue, Anchor Paper, St. Paul, Minn.) in a closed polyethylene tub (30 cm by 15 cm). The plants typically reached a shoot length of 1 cm and a root length of 6 cm.

Bioassay Apparatus. The choice-test bioassay apparatus (FIG. 34) was constructed from a glass Y-tube filled with glass beads to simulate the thigmotactic cues of the soil environment that are ordinarily encountered by western corn root worm larvae. The glass Y-tube was fabricated by a local glassblower (9.5 mm inside diameter, 60° angles, with each branch 3 cm long), and clamped to a ring stand with 2 branches of the "Y" facing down. A glass connection tube (4 cm long, 0.5 cm diameter) with a piece of vinyl screen (2.5-mm mesh) held over 1 end by a 0.5-cm section of Teflon tubing (6 mm inside diameter) was inserted snugly into the end of each of the arms of the Y-tube to support the glass beads. Glass beads (3 mm, cat. no. 11-312A, Fisher Scientific, Pittsburgh, Pa.) were poured into the top of the Y-tube, filling the entire apparatus to within 0.5 cm of the top (250 beads). A 5-mm NMR tube cap (cat. no. 100-0050, Drummond Scientific, Broomall, Pa.) was fitted into the other end of each glass connection tube, with a hole to allow snug insertion of a 20-cm piece of slender Teflon tubing (0.8 mm inside diameter) for introduction of volatile chemical cues into each arm of the bioassay apparatus. Two techniques were used to introduce candidate chemical cues into the 2 arms of the apparatus: 1 used shell vials as chemical sources, and the other used syringes as chemical sources.

Shell Vial Sources. In this 1st approach (FIG. 34), two 35-ml polyethylene syringes (cat. no. 106-0490, Sherwood Medical, St. Louis, Mo.) were filled with ambient air, and the air was pumped through shell vials containing candidate chemical cues. Glass shell vials (4 ml) with polyethylene caps were used (cat. no. B7785-1, Baxter Healthcare, McGaw Park, Ill.). A 35-ml syringe was snugly connected with slender Teflon tubing (20 cm) to a hole in the cap of the shell vial. A 2nd piece of slender Teflon tubing was used to connect the shell vial to 1 arm of the bioassay apparatus. The 2 syringes used for each bioassay were connected to a syringe pump (Sage Model 355, Fisher Scientific, Pittsburgh, Pa.) that provided an airflow through each shell vial containing a candidate chemical treatment, and subsequently into a choice arm of the bioassay apparatus. For the shell vial sources of candidate chemical compounds, the shell vial containing either a carbonated water dilution or a corn seed or cut corn roots was left open for 5 min to allow the gas concentrations to reach equilibrium. The vial was capped, and the syringe pump was started, providing an airflow of 1.0 ml/min from each syringe.

Syringe Sources. In this 2nd approach (FIG. 39), 35-ml polyethylene syringes were filled directly with candidate chemical cues (such as the headspace from a container of germinating corn, a sample of $CO_2$ mixed with air, or the headspace from a bottle of carbonated water). Each of the 2 syringes was connected with slender Teflon tubing to 1 arm of the bioassay apparatus. The 2 syringes used for each bioassay were connected to a syringe pump that was adjusted to provide an airflow of 1 ml/min from each syringe.

Figure 34:
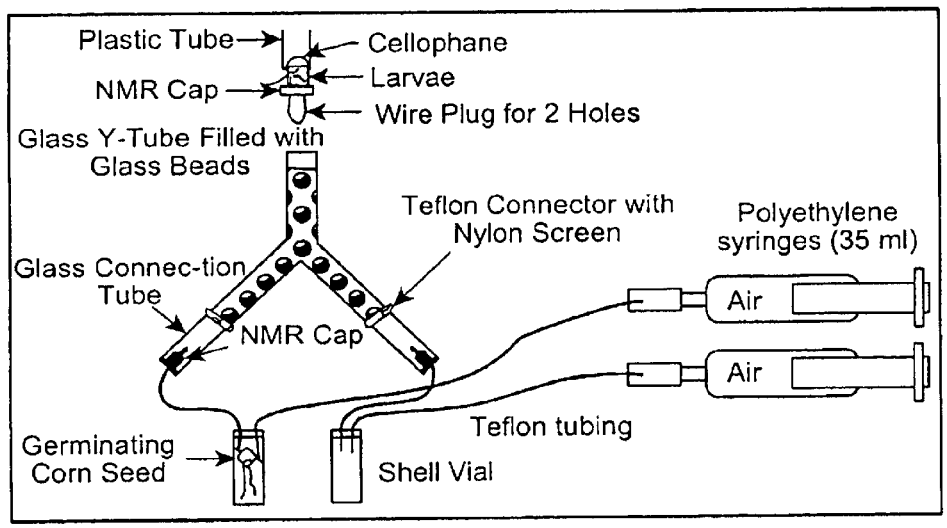
FIG. 34 illustrates a glass bead bioassay apparatus with candidate chemical cues in shell vials, and in particular, a bioassay apparatus using shell vials as chemical sources for Example 18 of the Detailed Description.
Figure 39:
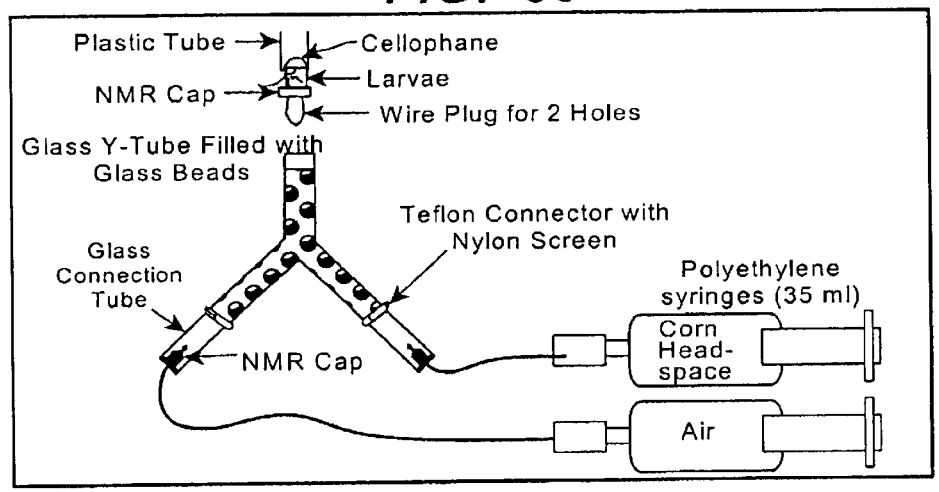
FIG. 39 illustrates a glass bead bioassay apparatus with candidate chemical cues in syringes, and in particular, the bioassay apparatus using syringes as chemical sources in Example 18 of the Detailed Description. Significant differences ($p<0.05$) are indicated by different lower case letters. Bars "I" represent standard errors.

Bioassay Procedure. For bioassays, 20 newly hatched 1st instars (0—12 hours old) were collected from tubs containing eggs in soil (by using a camel's hair brush) and placed in a covered 5-mm NMR cap with 2 holes (1 mm diameter) drilled in the bottom (FIGS. 34 and 39). These holes were temporarily plugged with a piece of wire bent into a U-shape. The open end of the NMR cap was sealed with a small square of cellophane held in place with a plastic tube (a piece of soda straw) that fit snugly over the open end. The Y-tube apparatus was assembled and filled with glass beads and the appropriate treatment and control sources (shell vials or syringes) were connected to the arms of the Y-tube. The syringe pump was set to provide a flow of 1 ml/min and turned on. A flow meter was used to verify that the flow exiting the top of the Y-tube was 2 ml/min, confirming the flow of volatiles through the apparatus and verifying that there were no leaks in the connections. If the flow was inadequate, all connections were inspected and secured, and the flow was rechecked. After 3 min of pumping, the wire piece blocking the 2 holes in the NMR cap was removed and the cap was placed in the is top of the Y-tube, allowing larvae to crawl out through the 2 holes and down into the glass beads. Bioassays were conducted for 30 min. The entire Y-apparatus was disassembled, and the positions of the larvae were recorded. Larvae were not reused in subsequent tests. Before each test, all glass parts of the apparatus were washed with soap and water, rinsed with water, and heated at 80° C. in an oven for 30 min.

GC-MS Analysis of $CO_2$. Mass spectrometry was used to determine $CO_2$ concentrations. A Hewlett-Packard Series II 5890 gas chromatograph interfaced with a Hewlett-Packard 5971 mass selective detector was operated in selected ion monitoring mode (SIM) for m/e 44 with a methyl silicone capillary column (30 m long, 0.32 mm inside diameter, RSL-150, Alltech, Deerfield, Ill.). A 10-mmol/mol mixture of $CO_2$ (a 300-ml glass bottle into which 3 ml of $CO_2$ was injected) was used as a standard to calculate the $CO_2$ concentrations of the unknown samples.

Germinating Corn Seed Versus Air. Using the shell vial source technique, germinating corn seeds were tested to determine whether larvae could detect volatile compounds produced by the growing seeds and follow them through a glass bead medium to the source. Individual washed corn seeds were placed in glass shell vials (4 ml) with a moistened piece of filter paper inside. The vials were placed on moistened germination paper inside a covered plastic container (30 cm by 15 cm) and germinated for 3 days. A vial containing a single 3-day-old germinating seed was removed from the covered plastic container just before testing and connected to the bioassay apparatus. An empty shell vial was connected to the other side as a control. The $CO_2$ concentrations of the germinating corn seeds and the control were determined by using GC-MS-SIM.

Cut Corn Roots Versus Air. In a companion experiment, cut corn roots were tested to determine whether larvae were attracted to volatile compounds produced by the roots alone. Corn roots (14.5 cm, 3 day old) were cut into 2—3 cm lengths and placed into 1 shell vial. The other shell vial (control side) contained ambient air. The $CO_2$ concentrations of the cut corn roots and the control were determined by using GC-MS-SIM.

Corn Headspace Bioassay. Using the syringe source technique, the headspace over germinating corn seedlings was tested to determine the larval response to corn volatiles in the glass bead apparatus. Washed corn seeds were spread on moistened germination paper inside a covered plastic container (30 cm by 15 cm) and germinated for 3 days to allow volatile corn compounds to be produced. A 35-ml polyethylene syringe was filled with the headspace containing these volatile compounds by means of a 25 cm length of slender Teflon tubing inserted into a hole drilled into the cover. The control syringe was filled from an identical plastic container containing only moistened germination paper. The $CO_2$ concentrations of the syringes were determined by using GC-MS-SIM before each bioassay.

Consistency of $CO_2$ Delivery. The consistency of the $CO_2$ concentration delivered into the bioassay apparatus was measured using GC-MS-SIM. For syringe sources, a 35-ml polyethylene syringe was partially filled with ambient air (5 ml) and 80 $\mu$l of $CO_2$ (obtained with a glass syringe from a tank containing pure (100%) $CO_2$) was injected into the syringe. Ambient air was then drawn into the syringe to fill it, mixing the air and $CO_2$ thoroughly by turbulence at the same time. A syringe containing 800 $\mu$l of $CO_2$, and another containing only ambient air, also were prepared. The syringes were allowed to equilibrate for 30 minutes before they were connected to the syringe pump (set at a flow of 1 ml/min). After 3 minutes of pumping, a 2-$\mu$l sample was taken from 5 cm inside a 20-cm length of Teflon tubing exiting from each syringe, by using a 10-$\mu$l (Hamilton) syringe. To test consistency of $CO_2$ release from the syringes, samples were taken at 0, 10, 20, and 30 minutes (following the initial 3-min pumping interval) and analyzed using GC-MS-SIM. For behavioral bioassays, samples were taken 5 minutes before the start of the bioassay from 5 cm inside the syringe.

For shell vial sources, $CO_2$ concentrations were measured from the 0, 1, 3, 10, 30, and 100% dilutions of carbonated water. A dilution of carbonated water (1 ml) (see preparation below) was slowly dispensed into a shell vial (4 ml capacity) with a 1-ml Pasteur pipette. The vial was left open for 5 minutes to allow the $CO_2$ gas concentration to reach equilibrium. A 35-ml polyethylene syringe on the syringe pump was used to pump air through the shell vial at 1 ml/min. After 3 minutes of pumping, a 2-$\mu$l sample of the headspace was taken from 5 cm inside a 20-cm length of Teflon tubing exiting from the shell vial, using a 10-$\mu$l (Hamilton) syringe. To test consistency of $CO_2$ release from the shell vials, samples were taken at 0, 10, 20, and 30 minutes and analyzed using GC-MS-SIM.

$CO_2$ Bioassay. In a preliminary experiment, a 10-mmol/mol concentration of $CO_2$ was used to test larval attraction. A 35-ml polyethylene syringe was rinsed with distilled water to moisten the inside of the syringe, and partially filled (5 ml) with ambient air. The $CO_2$ (350 ill) was obtained with a glass syringe from a tank containing pure (100%) $CO_2$ and injected into the 35 ml polyethylene syringe. Ambient air was then drawn into the syringe to fill it to a total volume of 35 ml, mixing the air and $CO_2$ thoroughly by turbulence. The gas mixture in the syringe was allowed to equilibrate for 15 minutes, and GC-MS-SIM was used to verify the $CO_2$ concentration before each bioassay. A 2nd 35 ml polyethylene syringe was filled with ambient air for a control, and the $CO_2$ concentration was measured using GC-MS-SIM.

$CO_2$ (Dose-Response). In subsequent experiments, mixtures of $CO_2$ and ambient air were tested to determine the larval response to a range of $CO_2$ concentrations. A 35-ml syringe was rinsed with distilled water and partially filled (5 ml) with ambient air. Different amounts of 100% $CO_2$ were obtained with a smaller glass syringe from a tank and injected into the 35-ml syringe. Ambient air was then drawn into the 35-ml syringe to fill it and mix the gases by turbulence as the syringe was loaded. A 2nd 35-ml polyethylene syringe was filled with ambient air for a control. Measurements with GC-MS-SIM confirmed that the $CO_2$ concentrations reached equilibrium after 15 minutes. The $CO_2$ concentration of the syringes was determined by using GC-MS-SIM analysis before each bioassay.

$CO_2$ Selective Response. Pairs of $CO_2$ mixtures were tested to determine if the larvae could detect small differences in $CO_2$ concentration. In a typical test, a syringe containing 1 mmol/mol $CO_2$ was connected to 1 arm of the Y-tube, and a syringe containing 1.5 mmol/mol $CO_2$ was connected to the opposite arm of the Y-tube. In subsequent tests, comparisons were made for 2 versus 2.5 mmol/mol, 5 versus 5.5 mmol/mol, 10 versus 10.5 mmol/mol, and 20 versus 20.5 mmol/mol $CO_2$. The $CO_2$ concentration of the syringes was determined by using GC-MS-SIM analysis before each bioassay. Using this same procedure, comparisons also were made to determine if larvae could detect even smaller differences (0.25, 0.125, and 0.00 mmol/mol) in $CO_2$ concentration. Comparisons were made for 1 versus 1.25, 2 versus 2.25, 5 versus 5.25, 10 versus 10.25, and 20 versus 20.25 mmol/mol $CO_2$, for 1 versus 1.125, 2 versus 2.125, 5 versus 5.125, 10 versus 10.125, and 20 versus 20.125 mmol/mol $CO_2$, and also for 1 versus 1, 2 versus 2, 5 versus 5, 10 versus 10, and 20 versus 20 mmol/mol of $CO_2$.

Diluted Carbonated Water (Dose-Response). It has previously been shown that carbonated water can be used as a source of $CO_2$ to attract 2nd-instar western corn root worms (Jewett and Bjostad 1996). Dilutions of carbonated water (Canada Dry Club Soda, Cadbury Beverages, Stamford, Conn.) in distilled water were evaluated for attraction of western corn root worm larvae. With this approach, handling of carbonated water was conducted with slow pouring of large volumes of liquid, and all transfers into shell vials were made with large-diameter pipettes to minimize outgassing. Six concentrations of carbonated water (0, 1, 3, 10, 30, and 100%) were tested. A new, unopened bottle of carbonated water was used each day to prepare the dilutions. To prepare the 10 and 30% dilutions, the appropriate amount of distilled water was measured in a glass graduated cylinder and poured into a 300-ml glass bottle. The right amount of carbonated water was then measured in a graduated glass cylinder and poured slowly into the same bottle to minimize outgassing of $CO_2$. The diluted mixture (150 ml total volume) was stirred gently with a glass rod. The 10 and 30% dilutions were used to prepare the 1 and 3% dilutions, respectively. For bioassays, each dilution of carbonated water (1 ml) was slowly dispensed into a shell vial (4 ml capacity) with a 1-ml Pasteur pipette. Distilled water (1 ml) was placed into a 2nd vial (control). The vials were left open for 5 minutes to allow the $CO_2$ gas concentration to reach equilibrium, then were connected to the bioassay apparatus. The $CO_2$ concentration in the headspace above the carbonated water dilutions in the shell vials was determined by using GC-MS-SIM.

Shell Vial Control Bioassays. Control tests with air on both sides of the Y-tube and with carbonated water on both sides of the Y-tube were conducted to determine if there was an intrinsic tendency for the larvae to move to 1 side or the other when chemical cues were absent, or when $CO_2$ was present. For the 1st test, shell vials containing ambient air were connected to both arms of the Y-tube. For the 2nd test, a 3.5-ml plastic syringe with a 2-cm needle was used to inject 0.5 ml of carbonated water (100% concentration) into 2 shell vials. The vials were allowed to stand open for 5 min before testing to allow the $CO_2$ gas concentration to reach equilibrium.

Syringe-Source Control Bioassays. Control tests with air on both sides of the Y-tube and with $CO_2$ on both sides were conducted to determine if there was an intrinsic tendency for the larvae to move to 1 side or the other when chemical cues were absent, or when $CO_2$ was present. For the 1st test, two 35 ml polyethylene syringes were rinsed with distilled water, filled with ambient air, and connected to both arms of the Y-tube. For the 2nd test, two 35-ml syringes were rinsed with distilled water and partially filled (5 ml) with ambient air. The $CO_2$ (100 $\mu$l, obtained with a glass syringe from a tank) was injected into each syringe, and room air was drawn into the syringes to fill them to a total volume of 35 ml. The mixtures were allowed to equilibrate for 15 min, and GC-MS-SIM analysis was used to verify that the $CO_2$ concentrations were the same in both syringes before each bioassay.

$CO_2$ Analysis of Corn Plants in Soil. The bottom of a round, plastic tub (11 cm high, 17 cm diameter) was covered with 3 cm of soil, and 40 ml of water were added. Washed corn seeds (40—50) were distributed on top of the soil and the seeds were covered with an additional 3 cm of soil. The tubs were tightly covered. The lids were removed after 3 d, and the soil was kept slightly moist by adding water daily. Measurements of $CO_2$ were taken from the soil when the plants were 6—8 day old. A piece of metal wire (5.3 cm) was inserted into a glass tube (5 cm long, 1 mm inside diameter) so that the wire projected 3 mm from the end of the glass tube. The tube was inserted, wire first, 4 cm into the soil. The wire plug was removed from the glass tube, leaving a 3-mm gap in the soil just below the end of the glass tube. The needle of a 10-pl Hamilton syringe was inserted into the glass tube so that it projected 1 mm into the gap, and a 5-el sample of soil headspace was removed. Samples were taken from different locations in the tub to minimize disturbance of the soil $CO_2$ concentrations. The $CO_2$ concentration of the soil headspace was determined by using GC-MS-SIM. Using the same method, samples were taken from control tubs containing soil alone.

Statistical Analysis. Analysis of variance (ANOVA) was conducted with Minitab (Addison—Wesley, Reading, Mass.). The Fisher LSD test was used for all a posteriori comparisons, with P=0.05.

Results

Figure 35:
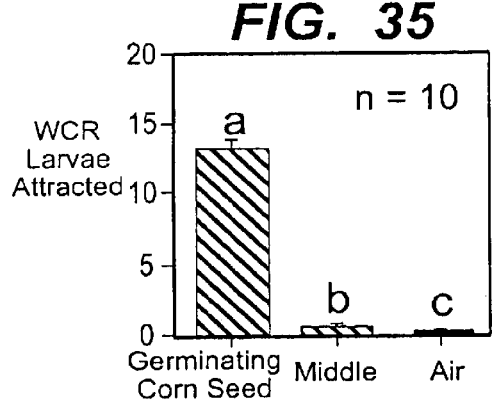
FIG. 35 illustrates a choice-test bioassay with a germinating corn seed versus air, and in particular, the number of western corn root worm (WCR) larvae attracted to a germinating corn seed versus air as described in Example 18 of the Detailed Description. Significant differences ($D<0.05$) are indicated by different lower case letters. Bars "r" represent standard errors.
Figure 37:
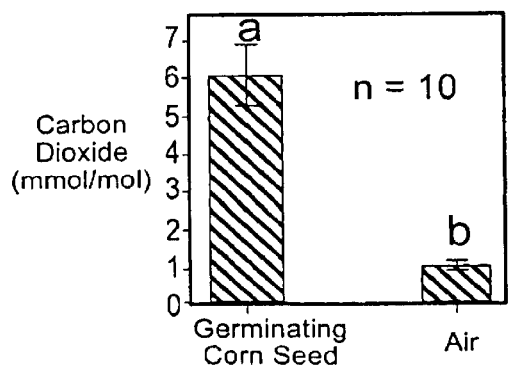
FIG. 37 illustrates $CO_2$ concentrations (measured with GC-MS-SIM) of germinating corn seed and air in shell vials for Example 18 of the Detailed Description. Significant differences ($p<0.05$) are indicated by different lower case letters. Bars "I" represent standard errors.

Germinating Corn Seed Versus Air Choice Test. In experiments using shell vial sources, significantly more western corn root worm larvae (P<0.05) were attracted to the side containing the germinating corn seed than to the control side (FIG. 35). Note that the column of FIG. 35 identified by the term "middle" denotes the number of corn root worm larvae that did not advance more than 2 cm into either branch of the Y-tube (FIG. 34) after 30 minutes. The $CO_2$ concentration of the headspace above the germinating corn seed was 6.04±0.83 (mean±SEM) mmol/mol, and the $CO_2$ concentration of the headspace on the control side was 0.99±0.08 mmol/mol FIG. 37).

Figure 36:
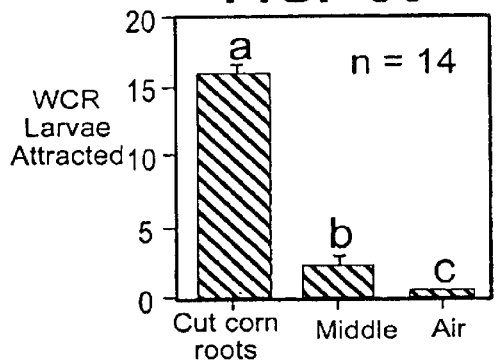
FIG. 36 illustrates a choice-test bioassay with cut corn roots (0.34 grams) versus air, and in particular, the number of western corn root worm larvae attracted to cut corn roots versus air in Example 18. Significant differences ($p<0.05$) are indicated by different lower case letters. Bars "I" represent standard errors.
Figure 38:
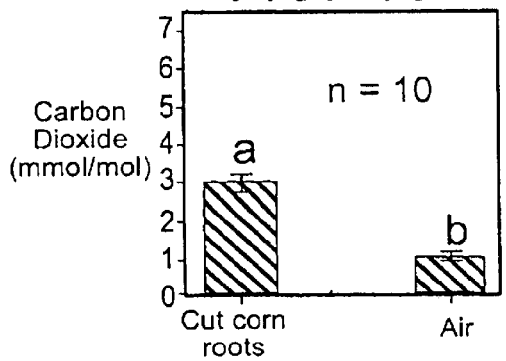
FIG. 38 illustrates concentrations of $C_2$, (measured with gas chromatography-mass spectrometry in selected ion monitoring mode (GC-MS-SIM)) of corn roots and air in shell vials for Example 18 of the Detailed Description. Significant differences ($p<0.05$) are indicated by different lower case letters. Bars "I" represent standard errors.

Cut Corn Roots Versus Air Choice Test. Significantly more western corn root worm larvae (P<0.05) were attracted to the side containing cut corn roots than to the control side (FIG. 36). Note that the column of FIG. 36 identified by the term "middle" denotes the number of corn root worm larvae that did not advance more than 2 cm into either branch of the Y-tube (FIG. 34) after 30 minutes. The $CO_2$ concentration of the headspace above germinating corn roots was 2.97±0.15 mmol/mol, and the $CO_2$ concentration of the headspace on the control side was 0.99±0.08 mmol/mol (FIG. 38).

Figure 40:
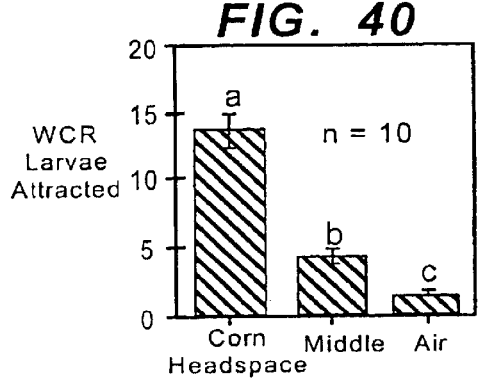
FIG. 40 illustrates a choice-test bioassay with headspace over germinating corn seeds versus air, and in particular, the number of western corn root worm (WCR) larvae attracted to a headspace over germinating corn seeds versus air in Example 18 of the Detailed Description. Significant differences ($P<0.05$) are indicated by different lower case letters. Bars "I" represent standard errors.
Figure 42:
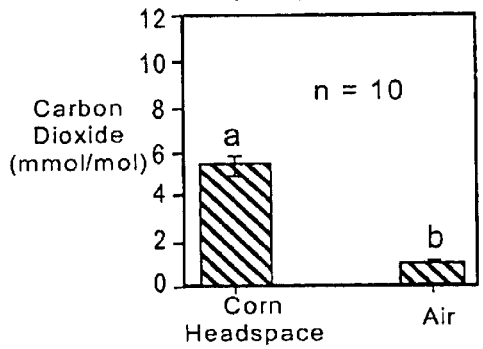
FIG. 42 illustrates concentrations of $CO_2$, (measured with GC-MS-SIM) of headspace over germinating corn seeds and air in syringes in Example 18 of the Detailed Description. Significant differences ($n<0.05$) are indicated by different lower case letters. Bars "I" represent standard errors.

Corn Headspace Bioassay. In bioassays with syringe sources, significantly more western corn root worm larvae (P<0.05) were attracted to the side containing the headspace over germinating corn seeds than to the control side (FIG. 40). Note that the column of FIG. 40 identified by the term "middle" denotes the number of corn root worm larvae that did not advance more than 2 cm into either branch of the Y-tube (FIG. 39) after 30 minutes. The $CO_2$ concentration of the headspace above the germinating corn seeds was 5.38±0.45 mmol/mol, and the $CO_2$ concentration of the headspace on the control side was 1.14±0.13 mmol/mol (FIG. 42).

Figure 41:
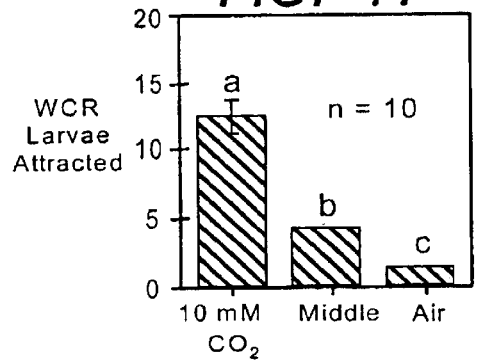
FIG. 41 illustrates a choice-test bioassay with $CO_2$, (10 mmol/mol) versus air, and in particular, the number of western corn root worm larvae attracted to a $CO_2$, concentration of 10 mmol/mol versus air in Example 18 of the Detailed Description. Significant differences ($p<0.05$) are indicated by different lower case letters. Bars "I" represent standard errors.
Figure 43:
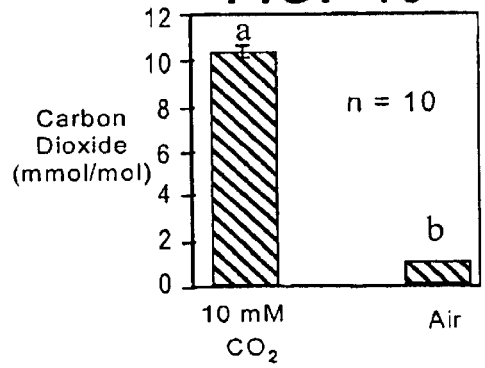
FIG. 43 illustrates concentrations of $CO_2$, (measured with GC-MS-SIM) of $CO_2$, (10 mmol/mol) and ambient air in syringes as described in Example 18. Significant differences ($p<0.05$) are indicated by different lower case letters. Bars "I" represent standard errors.

$CO_2$ Bioassay. In a preliminary experiment to verify attraction of the larvae to syringe sources containing $CO_2$, significantly more western corn root worm larvae (P<0.05) were attracted to the side containing 10 mmol/mol $CO_2$ (10.43±0.18 mmol/mol) than to the control side (FIG. 41). Note that the column of FIG. 41 identified by the term "middle" denotes the number of corn root worm larvae that did not advance more than 2 cm into either branch of the Y-tube (FIG. 39) after 30 minutes. The $CO_2$ concentration of the control side was 0.93±0.04 mmol/mol (FIG. 43).

Figure 44:
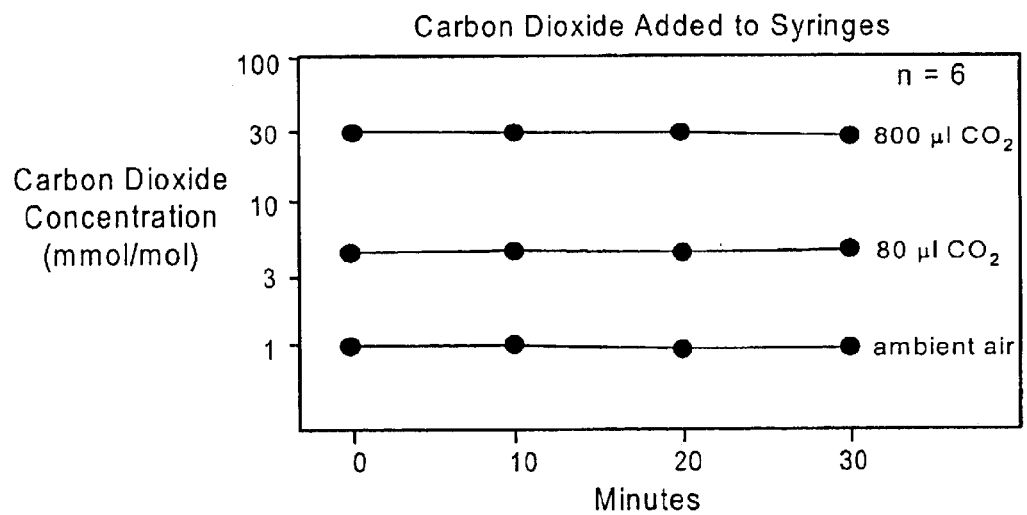
FIG. 44 illustrates concentrations of $CO_2$ (measured with GC-MS-SIM) from syringes measured every 10 minutes with syringe pump turned on for Example 18.
Figure 45:
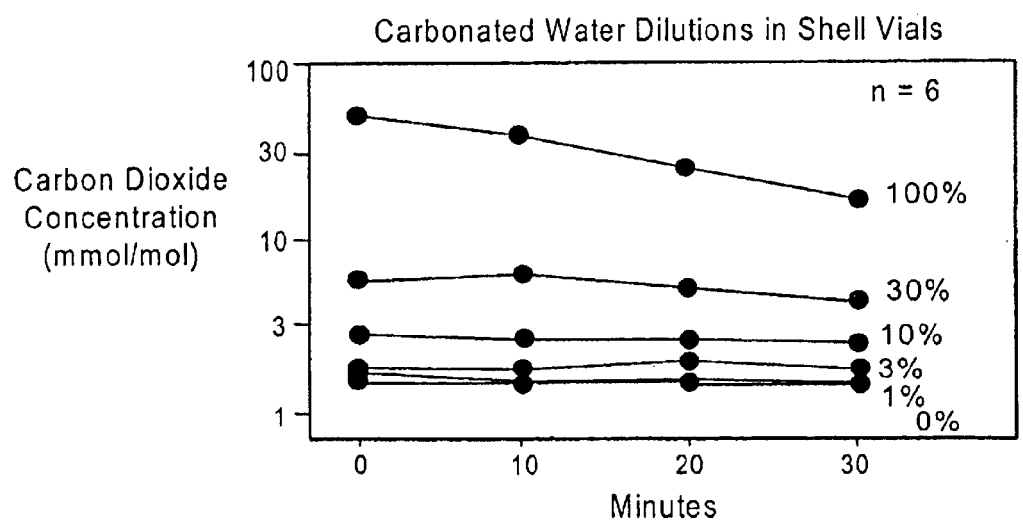
FIG. 45 illustrates concentrations of $CO_2$ from shell vials measured every 10 minutes with syringe pump turned on for Example 18.

Consistency of $CO_2$ Delivery. The release of $CO_2$ from syringe sources was highly consistent over the course of a 30-min bioassay interval (FIG. 44). The release of $CO_2$ from shell vial sources was consistent over the course of a 30 min bioassay interval for the lower doses tested (0, 1, 3, and 10%), but not for the higher doses (30 and 100%)(FIG. 45).

Figure 46:
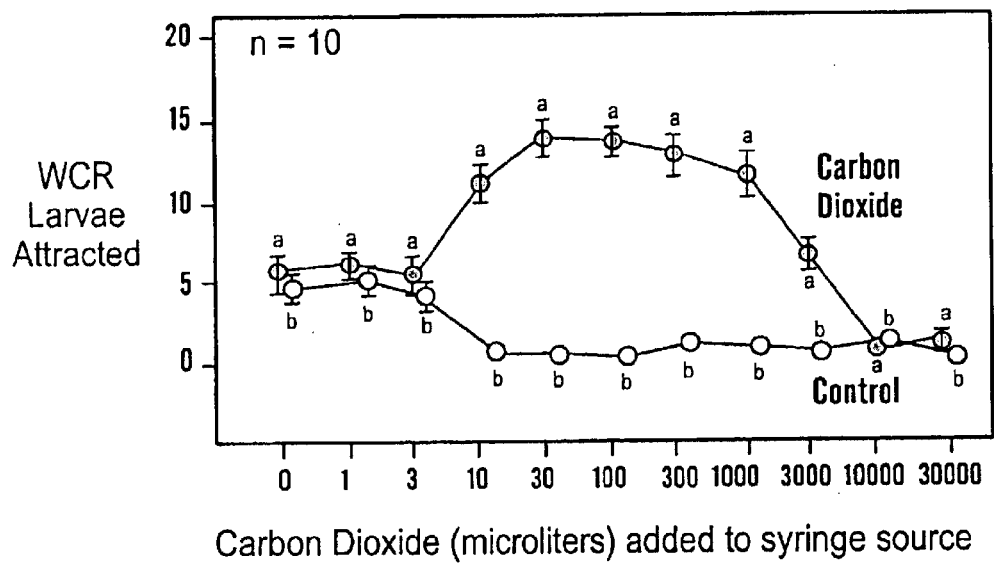
FIG. 46 illustrates a choice-test bioassay with $CO_2$, in syringe sources to attract western corn root worm larvae in Example 18. Significant differences ($p<0.05$) are indicated by different lower case letters. Bars "I" represent standard errors.
Figure 47:
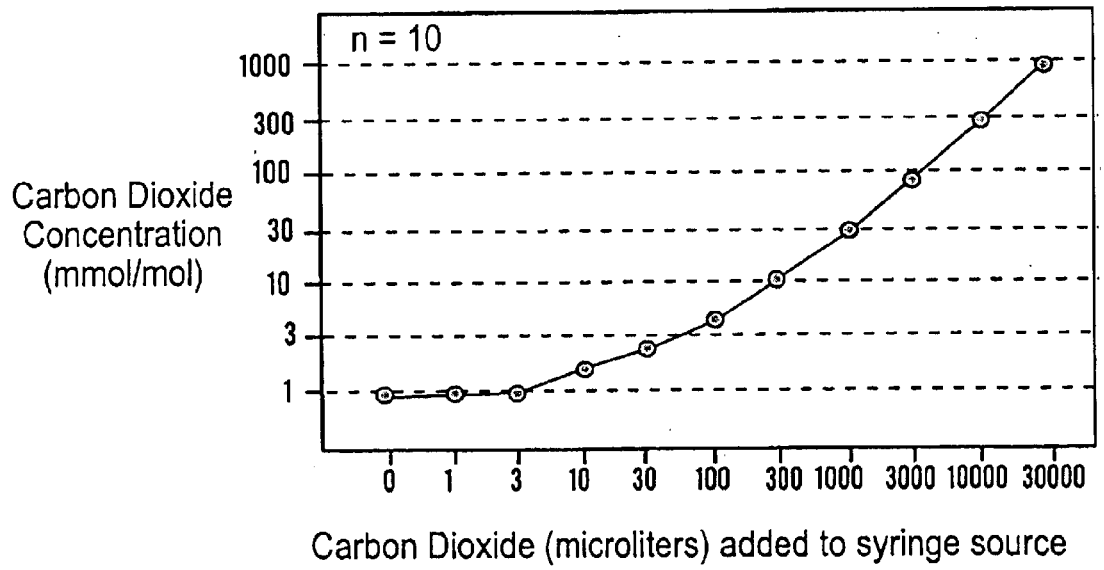
FIG. 47 illustrates $CO_2$ concentrations (measured with GC-MS-SIM) of mixtures in syringes as discussed in Example 18.

$CO_2$ (Dose-Response). The larvae were attracted to a wide range of $CO_2$ concentrations. The lowest concentration of $CO_2$ that was attractive to the larvae (FIGS. 46 and 47) was 1.34±0.05 mmol/mol (10 μl of $CO_2$ added to syringe at the fourth point labeled "a" from the left on the graph corresponding to solid dots of FIG. 46) (P<0.05), where the control $CO_2$ concentration was 0.91±0.03. The highest dose to which the larvae were attracted was 85.60±1.20 mmol/mol (3 ml of $CO_2$ added to syringe at the ninth point labeled "a" from the left on the graph corresponding to solid dots of FIG. 46). They were not attracted to 300 mmol/mol (10 ml of $CO_2$ added to syringe) or 900 mmol/mol (30 ml of $CO_2$ added to syringe) concentrations FIG. 46).

Figure 48:
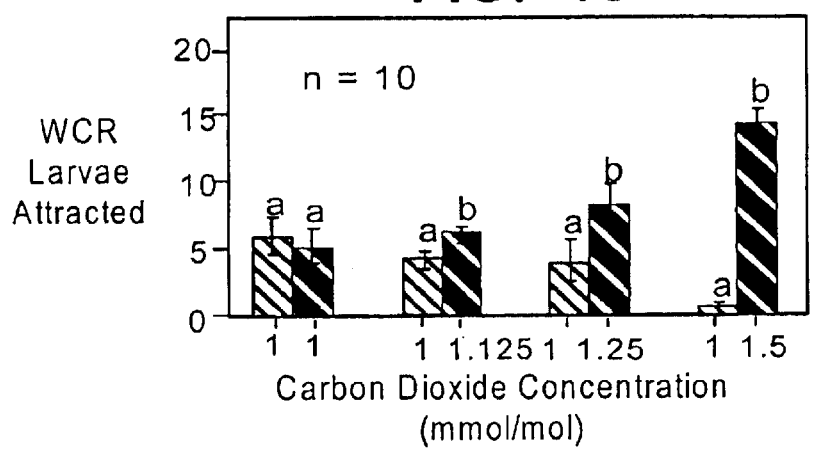
FIGS. 48–52 illustrate various choice-test bioassays with syringe sources containing 1 mmol/mol minimum $CO_2$ (FIG. 48), 2 mmol/mol minimum $CO_2$ concentration (FIG. 49), 5 mmol/mol minimum $CO_2$ concentration (FIG. 50), 10 mmol/mol minimum $CO_2$ concentration (FIG. 51), and 20 mmol/mol minimum $CO_2$ concentration (FIG. 52). In particular.
Figure 49:
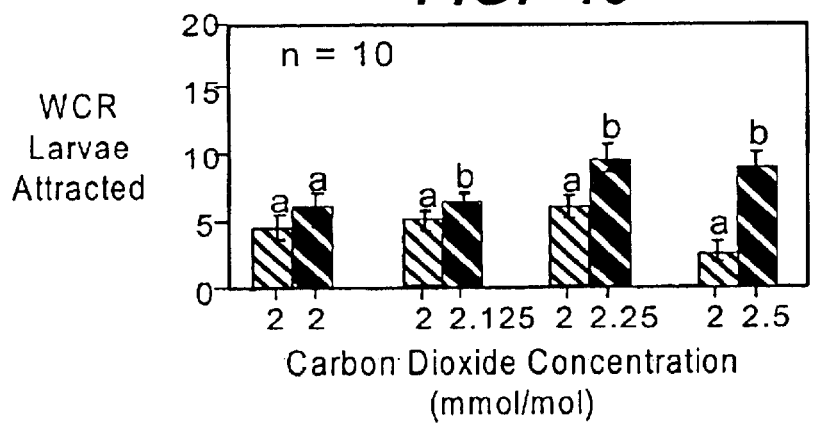
Figure 50:
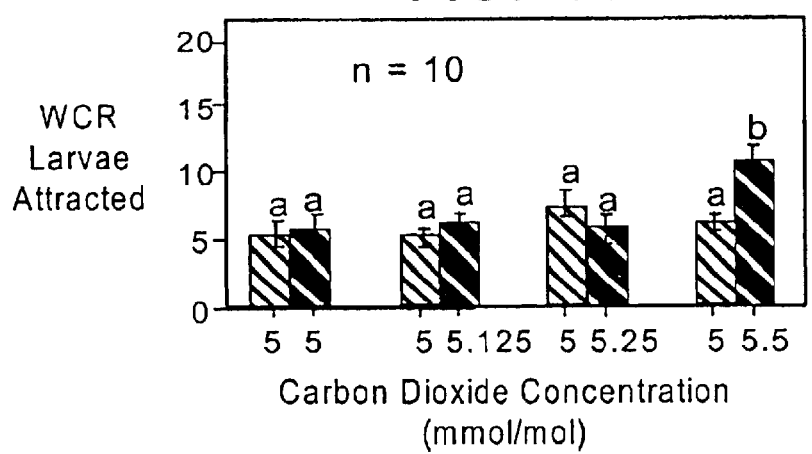
Figure 51:
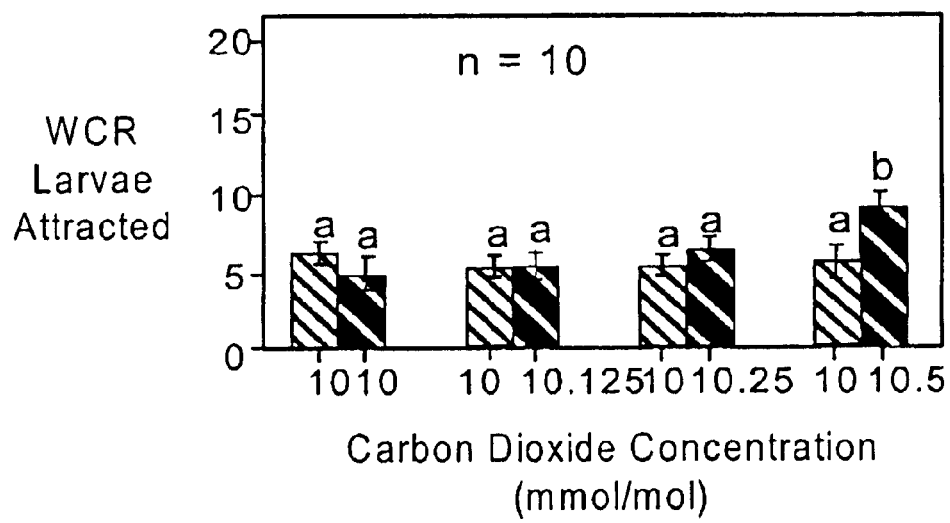
Figure 52:
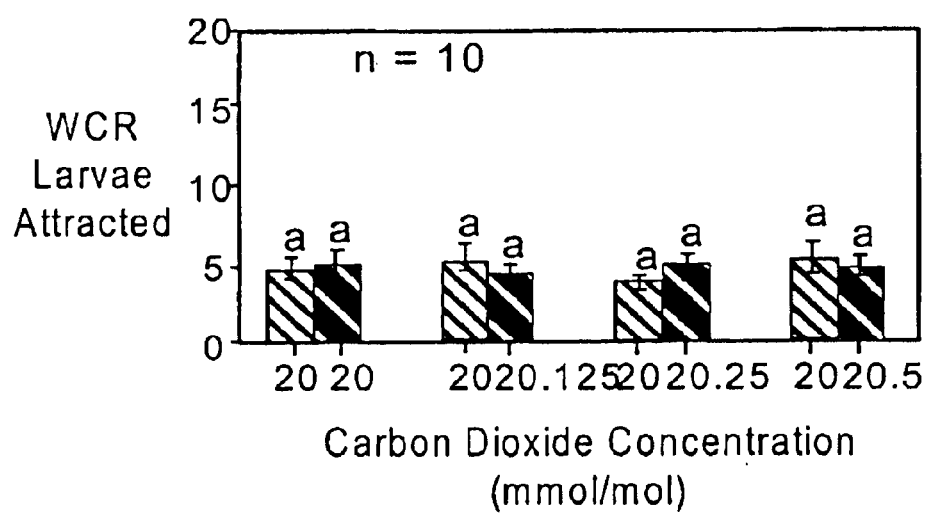

$CO_2$ Selective Response. Significantly more larvae were attracted (FIG. 48) to the higher $CO_2$ concentration for 1 versus 1.50 mmol/mol, for 2 versus 2.50 mmol/mol (FIG. 49), for 5 versus 5.50 mmol/mol (FIG. 50), and for 10 versus 10.50 mmol/mol (FIG. 51), but no difference in attraction was observed for 20 versus 20.50 mmol/mol of $CO_2$ (FIG. 52). When smaller $CO_2$ differences were tested (0.25 mmol/mol), fewer significant differences were observed. Larvae were more attracted to the higher $CO_2$ concentration for 1 versus 1.25 mmol/mol (FIG. 48), and for 2 versus 2.25 mmol/mol (FIG. 49), but no difference in attraction was observed for 5 versus 5.25 mmol/mol (FIG. 50), for 10 versus 10.25 (FIG. 51) mmol/mol, or for 20 versus 20.25 mmol/mol (FIG. 52). At the smallest $CO_2$ difference tested, significantly greater attraction was observed to 1.125 mmol/mol than to 1 mmol/mol (the actual $CO_2$ concentration of the treatment side was 1.18±0.05 mmol/mol, and the actual control concentration was 1.06±0.05 mmol/mol), but no difference in attraction was observed in any of the tests at higher concentrations. In control tests with equal amounts of $CO_2$ on both sides (1, 2, 5, 10, or 20 mmol/mol), no significant differences in attraction were observed.

Figure 53:
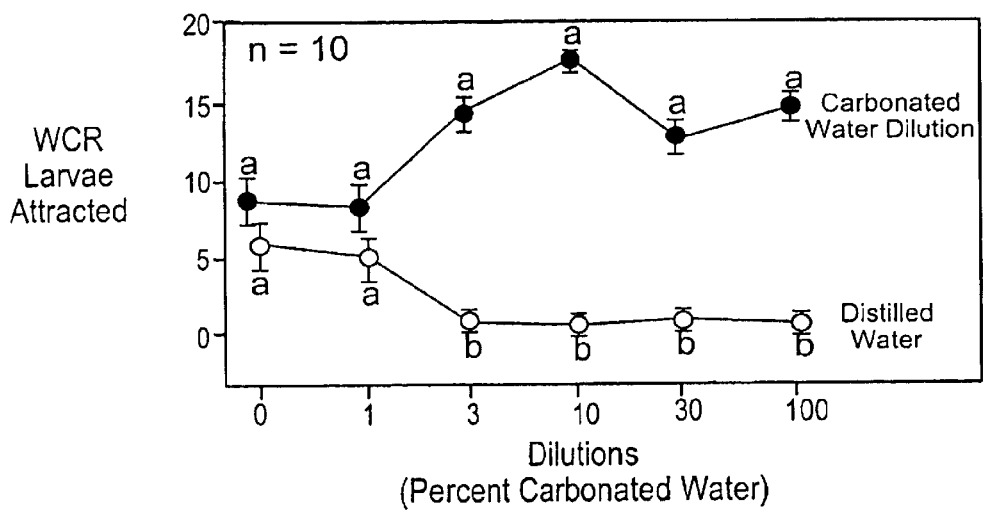
FIG. 53 illustrates a choice-test bioassay with shell vials containing different dilutions of carbonated water for attracting western corn root worm larvae as described in Example 18. Significant differences ($D<0.05$) are indicated by different lower case letters. Bars "I" represent standard errors.
Figure 54:
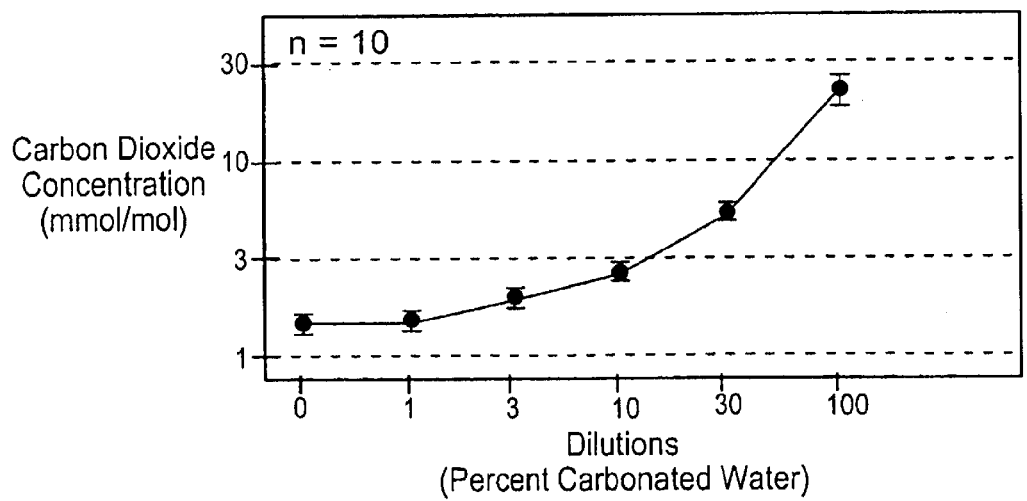
FIG. 54 illustrates concentrations (measured with GC-MS-SIM) of carbonated water dilutions in Example 18. Significant differences ($p<0.05$) are indicated by different lower case letters. Bars "I" represent standard errors.
Figure 55:
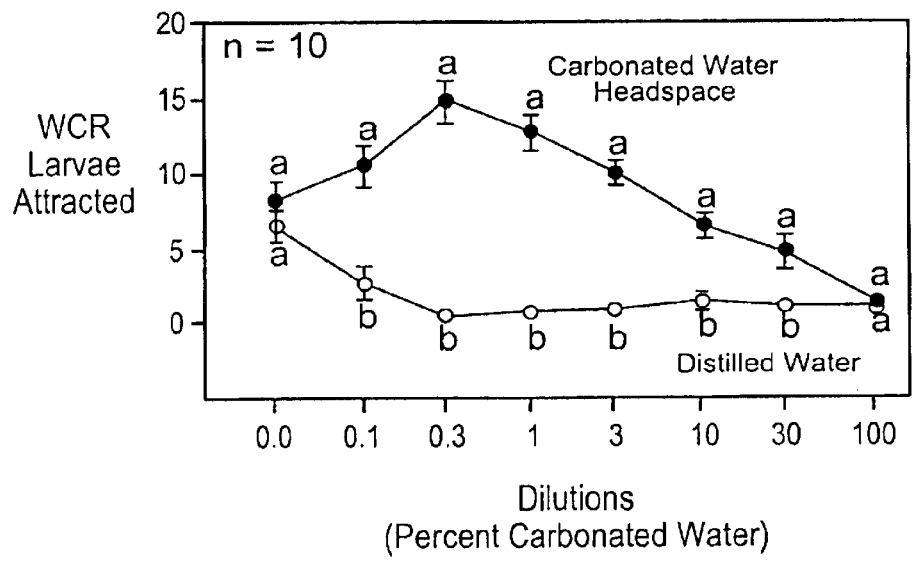
FIG. 55 illustrates a choice-test bioassay with syringe sources containing the headspace from different dilutions of carbonated water for Example 18 of the Detailed Description. Significant differences (p<0.05) in attraction to a particular dose of $CO_2$, and its corresponding control are indicated by different lower case letters. Bars "I" represent standard errors (many are too small to be visible).
Figure 56:
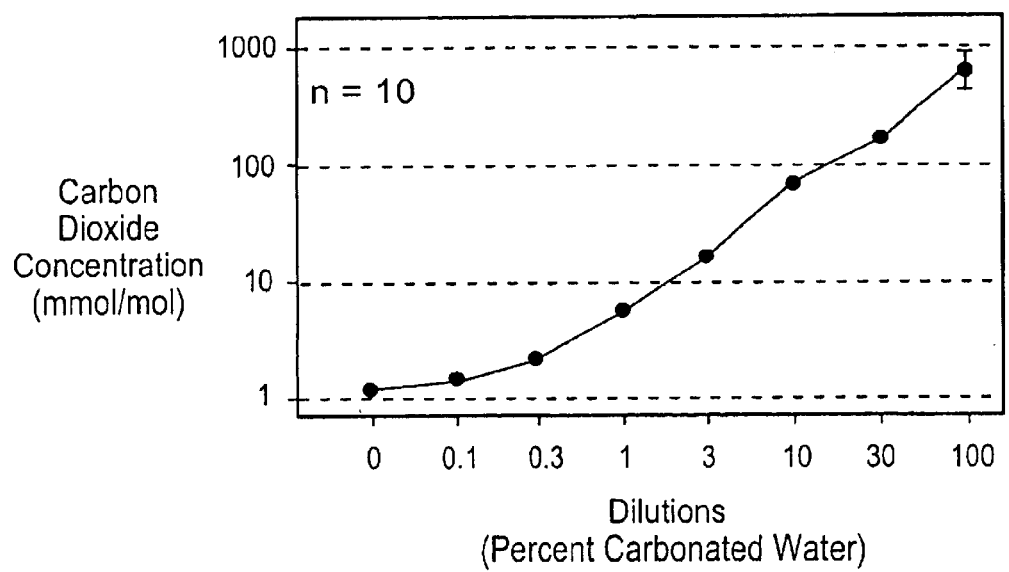
FIG. 56 illustrates $CO_2$ concentrations (measured with GC-MS-SIM) from the headspace over each dilution carbonated water. Significant differences (D<0.05) in attraction to a particular dose of $CO_2$ and its corresponding control are indicated by different lower case letters. Bars "I" represent standard errors (many are too small to be visible).
Figure 57:
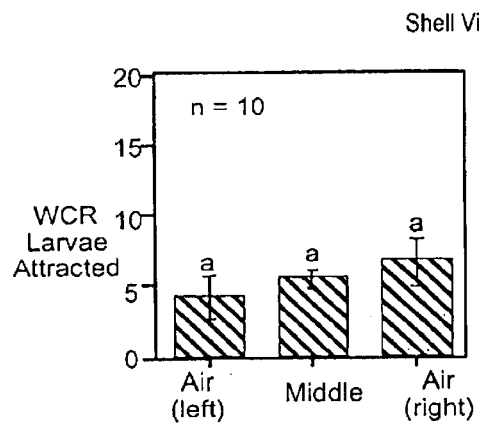
FIG. 57 illustrates a controlled choice-test bioassay with shell vials containing air on both sides for determining the attraction of western corn root worm larvae as described in Example 18. Significant differences (p<0.05) are indicated by different lower case letters. Bars "I" represent standard error.
Figure 58:
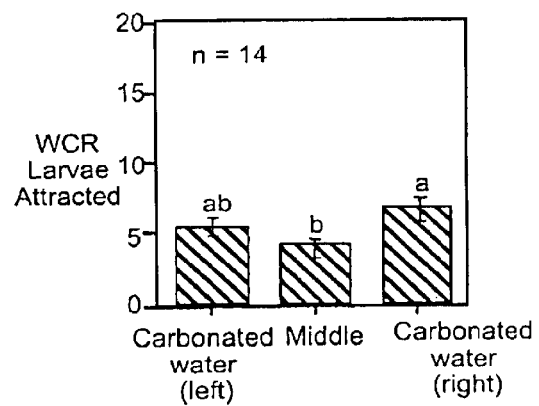
FIG. 58 illustrates a controlled choice-test bioassay with shell vials containing carbonated water on both sides for thereby determining attraction of western corn root worm larvae to carbonated water as described in Example 18. Significant differences (p <0.05) are indicated by different lower case letters. Bars "I" represent standard error.
Figure 59:
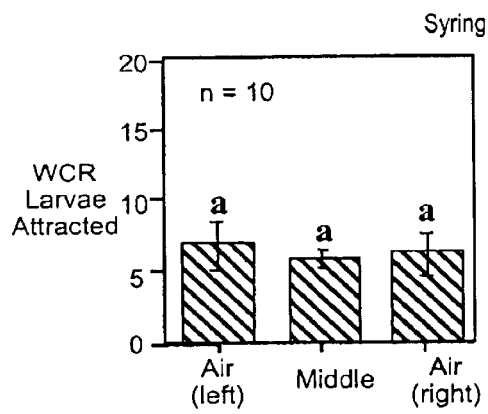
FIG. 59 illustrates a controlled choice-test bioassay with syringes containing air on both sides for determining the attraction of western corn root worm larvae as described in Example 18. Significant differences (p<0.05) are indicated by different lower case letters. Bars "I" represent standard error.
Figure 60:
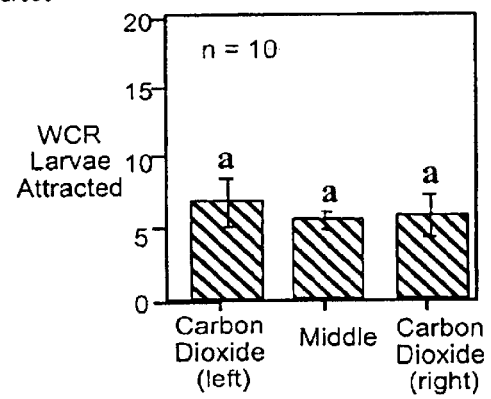
FIG. 60 illustrates a controlled choice-test bioassay with syringes containing $CO_2$ on both sides for determining the attraction of western corn root worm larvae to carbon dioxide as described in Example 18. Significant differences (p<0.05) are indicated by different lower case letters. Bars "I" represent standard error.
Figure 61:
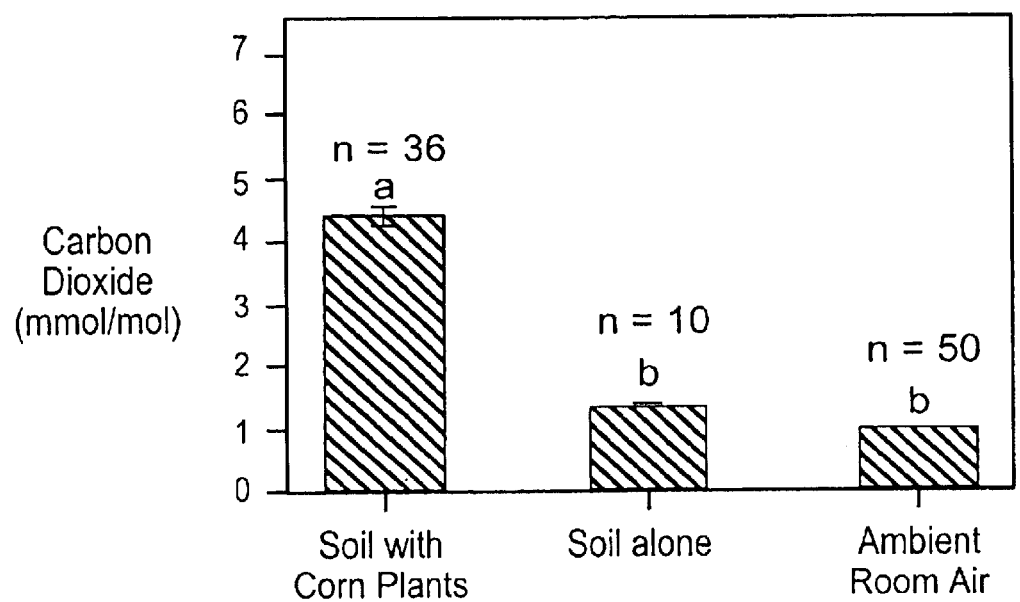
FIG. 61 shows a graph of concentrations of $CO_2$, (measured with SIM-CG-MS) from soil near growing corner root worms, soil alone and ambient air. Significant differences (p<0.05) are indicated by different lower case letters. Bars "I" represent standard errors.

Diluted Carbonated Water (Dose-Response). In bioassays with shell vial sources, the 3% dilution of carbonated water was the lowest attractive dose (FIG. 53)(P<0.05). The larvae responded optimally to the 10% dilution of carbonated water, and all concentrations (3, 10, 30, and 100%) greater than the 1% dilution were significantly more attractive (P<0.05) than the control (distilled water). The $CO_2$ concentration of the control (distilled water) was 1.42±0.08 mmol/mol, and the concentration of the 1% dilution was 1.48±0.10 mmol/mol (FIG. 54). The $CO_2$ concentration of the 3% dilution was 1.91±0.09 mmol/mol, and the 10% dilution produced 2.55±0.12 mmol/mol of $CO_2$. The 30% dilution produced 6.06±0.36 mmol/mol of $CO_2$, and the 100% carbonated water produced 24.49±0.22 mmol/mol of $CO_2$.

Shell Vial Control Bioassays. There was no significant difference (P>0.05) between the numbers of larvae moving to the right and to the left when no chemical treatment was present on either side of the choice test. Western corn root worm larvae moved slowly through the glass beads, and after 30 minutes, equal numbers of larvae were found in the right and left arms of the Y-tube. The $CO_2$ concentration in the shell vials containing ambient air was 0.99±0.08 mmol/mol. Larvae also chose equally between the right and left sides of the choice test when carbonated water was present on both sides in shell vial sources (P>0.05). Each shell vial of carbonated water produced 24.49±1.31 mmol/mol of $CO_2$.

Syringe Source Control Bioassays. There was no significant difference (P>0.05) between the numbers of larvae moving to the night and to the left when ambient air was present on both sides of the choice test from syringe sources. Larvae also chose equally between the right and left sides of the choice test when $CO_2$ was present on both sides (P >0.05). The $CO_2$ concentration from the syringes was 4.37±0.04 mmol/mol (right) and 4.36±0.04 mmol/mol (left).

$CO_2$ Analysis of Corn Plants in Soil. The $CO_2$ concentration in the soil atmosphere in tubs containing 8-day-old growing corn plants was 4.36±0.31 mmol/mol (measured by GC-MS-SIM). The concentration of $CO_2$ in tubs containing soil alone was 1.38±0.03 mmol/mol, and the concentration in the ambient air was 0.94±0.01 mmol/mol.

Discussion

A key component of the current study was the design of an improved behavioral bioassay specifically to test attraction of 1st-instar western corn root worm to volatile compounds from corn plants. Previous studies of western corn root worm behavior have involved either the use of petri dish or arena bioassay designs (Branson and Ortman 1967, 1970; Strnad et al. 1986; Hibbard and Bjostad 1988; Jewett and Bjostad 1996), or a soil-containing chamber (Strnad and Bergman 1987, Gustin and Schumacker 1989, Hibbard and Bjostad 1989, MacDonald and Ellis 1990). Studies of western corn root worm responses to chemical cues from corn previously have been carried out in our laboratory with 2nd instars using a petri dish bioassay (Hibbard and Bjostad 1988). Second instars were used in these previous studies because they were more robust and easier to handle, and because the delicate 1st instars responded poorly in the petri dish bioassays. However, the burden of host location lies with the neonate larvae, who must locate suitable host plant roots in a limited amount of time to ensure survival to adulthood (Strnad and Bergman 1987, Branson 1989, MacDonald and Ellis 1990).

During initial observations, some important behaviors of the newly hatched larvae were noted and provided guidance in the development of the new bioassay. First, the larvae exhibited a tendency to move downward. They moved in a downslope direction when placed on a flat, slightly tilted surface (petri dish), and also moved downward when they were allowed to move through a porous, soil-like medium such as glass beads. Second, the larvae appeared to use thigmotactic cues to maneuver. When placed in the center of a small (5 cm) petri dish, the larvae quickly moved to the outside of the dish and continued to crawl around the circumference of the dish, keeping their bodies in contact with the outside edge at all times. If a piece of filter paper was placed in the petri dish, the larvae either positioned themselves between the edge of the paper and the edge of the dish and continued to crawl around the outside circumference, or they crawled beneath the paper before coming to rest. From these observations, we concluded that geotropic tendency and use of thigmotactic cues are apparently important elements of neonate western corn root worm larval behavior, and these were given special consideration when designing this new behavioral bioassay.

The new bioassay design accommodates the small size of the neonate larvae, provides a choice in the vertical direction, and uses glass beads to simulate the thigmotactic cues that are ordinarily encountered by western corn root worm larvae in their natural soil environment. The glass bead apparatus also can be adapted to facilitate the testing of a variety of chemical sources. We have verified in choice tests that corn roots and germinating corn seeds are attractive to western corn root worm larvae. In addition, gaseous mixtures of $CO_2$ were shown to attract newly hatched western corn root worm larvae in this behavioral bioassay, and the headspace above diluted carbonated water also was found to be attractive.

Neonate larvae exhibited a positive chemotactic response to $CO_2$ in the glass bead bioassay similar to that demonstrated previously using other bioassay designs (Strnad et al. 1986, Hibbard and Bjostad 1988, MacDonald and Ellis 1990, Jewett and Bjostad 1996). In the $CO_2$ dose-response experiment, the larvae were able to detect and were attracted to levels of $CO_2$ as small as 1.34±0.05 mmol/mol when the control (ambient air) contained 0.91±0.03 mmol/mol.

In syringe source bioassays, the larval response to $CO_2$ increased with each increase in the amount of $CO_2$ added to the syringe mixtures (1, 3, 10, ... μl of $CO_2$) (FIG. 47) when the control side contained 1.00±0.09 mmol/mol of $CO_2$. In the dose-response test, the attractive range of concentrations was from 1.34±0.05 to 85.6±1.20 mmol/mol. The most attractive concentrations of $CO_2$ were 2.51±0.13 mmol/mol (30 μl Of $CO_2$ added to the syringe), and 4.20±0.21 mmol/mol (100 μl added to the syringe). This range of attractive concentrations of $CO_2$ is consistent with the level of $CO_2$ produced by a germinating corn seed in a shell vial (6.04±0.83 mmol/mol), cut corn roots in a shell vial (2.97±0.15 mmol/mol), and also with the concentration found in the headspace above 50 grams (dry wt) of germinating corn seeds (5.38±0.45 mmol/mol). The concentration of $CO_2$ measured in soil near the roots of growing corn plants (4.36±0.31 mmol/mol) was consistent with the optimally attractive range of concentrations (2.51±0.13 to 4.20±0.21 mmol/mol), indicating that the bioassay technique produced gradients of $CO_2$ similar to those that are behaviorally active in the soil.

The ability of the larvae to detect small differences in concentration at low base levels also was detected in the selective response experiment, in which the larvae were consistently attracted to the higher concentration of $CO_2$ when the treatment side was 1 mmol/mol, even when the difference between the 2 choices was as low as 0.125 mmol/mol. In this series of experiments, the larvae were 1st attracted to a $CO_2$ concentration that was 12.5% higher than the control when the control contained 1, 2, 5, 10, and 20 mmol/mol $CO_2$. This degree of sensitivity to $CO_2$ has been demonstrated previously for other insects. Doane et al. (1975) demonstrated that wireworm larvae respond to $CO_2$ differences as small as 0.02% (0.20 mmol/mol). Pline and Dusenbery (1987) made the same observations for plant-parasitic nematodes. They found that the $CO_2$ threshold for nematode response was 0.01% (0.10 mmol/mol) at low baseline levels of $CO_2$ (0.1%) but was 0.05% (0.50 mmol/mol) when the baseline concentration was higher (1.0%) (10 mmol/mol).

In the current study, western corn root worm larvae were not attracted to 300 or 900 mmol/mol of $CO_2$, and they exhibited toxic symptoms at these high concentrations. Larvae remained in the cap, or in the top 0.5 cm of glass beads, throughout the bioassay period. They were lethargic when removed from the apparatus, but recovered normal movement after 5–10 minutes. Doane et al. (1975) reported a similar lack of response to high concentrations of $CO_2$ by plant-parasitic nematodes.

Although small amounts of $CO_2$ have a stimulatory effect on many insects, high levels of the gas act as an anesthetic by inhibiting bioelectrical responses of the insect nervous system (Nicolas and Sillans 1989).

The ability to detect and respond to small differences in $CO_2$ concentration may be important in host location by neonate western corn root worm larvae. Strnad et al. (1986) demonstrated that 1st instars follow a gradient of $CO_2$ to its source, and that they respond to increases in the gradient by exhibiting a reduction in the number of turns and direction changes. Our results indicate that the larvae not only detect these changes but also when given a choice of 2 different concentrations of $CO_2$, are attracted to the higher concentration and follow it toward the source. As shown by Branson (1989) and Strnad and Bergman (1987), neonate western corn root worm larvae die if they do not locate food within 3 days after hatching, and their survival to adulthood is significantly reduced if it takes them more than 24 hours to find the roots of a suitable host plant. In more recent studies (MacDonald and Ellis 1990), western corn root worm larvae survived after 24 hours of starvation, and some were able to survive for as long as 13 days with adequate temperatures and soil moisture. In the soil surrounding a growing corn plant, a $CO_2$ gradient may form around the entire root mass. Western corn root worm larvae may use their ability to detect differences in concentration to orient directly to the root of the corn plant and avoid losing valuable time searching the entire area in which the roots are growing.

We propose using $CO_2$ to attract soil organisms (insects, nematodes, mites) away from their host plants or to confuse them so that they are unable to locate host plants. Sources of $CO_2$ include carbonated water. Sufficient $CO_2$ gradients can be produced by granules of potassium bicarbonate coformulated with an acid and a pesticide that are broadcast or incorporated into the soil. We are the first to appreciate the use of organic sources to achieve a slow release of $CO_2$ for control of soil organisms. Calcium alginate co-encapsulated with yeast and a nutrient substrate, starch granules and k-carrageenan encapsulation can also be used as formulations for microbial pesticides and chemical or biological sources of $CO_2$ can be incorporated into these granules to attract and kill soil pests.

EXAMPLE 19

In strong contrast to earlier published results, we now conclude that the attraction of western corn root worm, *Diabrotica virgifera virgifera* LeConte, larvae to corn roots is due to $CO_2$ alone, and that no other volatile chemical cues are involved in attracting the larvae. Choice test behavioral bioassays were conducted in the laboratory, with volatile corn compounds on 1 side of the bioassay apparatus and with different concentrations of $CO_2$ on the other side (mass spectrometry was used to measure $CO_2$ concentrations on both sides of the apparatus). Larvae were strongly attracted to volatile compounds from corn when ambient air was present on the other side of the bioassay. However, larvae chose equally between the 2 sides of the bioassay when volatile compounds from corn were present on 1 side and an equivalent concentration of $CO_2$ was present on the other side. When given a choice between corn volatiles and a higher concentration of $CO_2$, the larvae chose the $CO_2$ side significantly more often. In an experiment conducted both with diapausing and non-diapausing strains, the headspace from germinating corn seeds was collected and continuously injected into 1 side of the bioassay apparatus, and a defined concentration of $CO_2$ was continuously injected into the other side. We tested the possibility that compounds of limited volatility may be involved in larval attraction by preparing glass beads coated directly with volatiles produced by germinating corn seeds, and also by testing soil that was removed from corn roots. All these experiments indicated that compounds other than $CO_2$ were not involved in larval attraction. In other experiments, the soil atmosphere surrounding the roots of growing corn plants was not as attractive as an equivalent concentration of $CO_2$ alone, and the headspace from feeding-damaged corn roots was not as attractive as an equivalent concentration of $CO_2$ alone, indicating that weak repellents were present in these treatments together with the strong attractant $CO_2$. Tests with solvent extracts and cryogenic extracts of germinating corn seeds in conjunction with $CO_2$ also indicated the presence of weak repellents in corn for the larvae.

WESTERN CORN ROOT WORM, *Diabrotica virgifera virgifera* LeConte, a major pest of corn, *Zea mays* L., in the United States (Krysan and Miller 1986), is an oligophagous, soil-dwelling insect, which as larvae, feeds upon the roots of its host plants. Branson (1982) reported that western corn root worm larvae are attracted to the roots of both host and non-host plants, and he concluded that western corn root worm larvae respond to non-specific primary metabolites (such as $CO_2$) produced by host plants, rather than host-specific secondary compounds. Strnad et al. (1986) reported that western corn root worm larvae are highly attracted to $CO_2$, which is given off by corn roots in the soil (Harris and Van Bavel 1957, Massimino et al. 1980, Desjardins 1985, Labouriau and Jose 1987). Other investigators have also demonstrated this attraction (Hibbard and Bjostad 1988, MacDonald and Ellis 1990, Strnad and Dunn 1990, Jewett and Bjostad 1996, Bemklau and Bjostad 1998).

Subsequent to this early work, a series of publications from our laboratory (Hibbard and Bjostad 1988, 1989, 1990; Bjostad and Hibbard 1992; Hibbard et al. 1994) reported that corn roots emitted a blend of $CO_2$, MBOA (6-methoxy-2-benzoxazolinone), and 3 long-chain fatty acids (stearic acid, oleic acid and linoleic acid), and that this blend of compounds was more attractive than equivalent amounts of $CO_2$ alone. However, later field tests showed these compounds to have little or no effect as attractants for insecticides (Hibbard et al. 1995).

We recently completed an extensive set of experiments indicating that most of our own previous results were incorrect. We have now concluded that MBOA, stearic acid, oleic acid, and linoleic acid are not involved in attraction of western corn root worm larvae, and that $CO_2$ is the only attractive volatile compound that attracts western corn root worm larvae to corn roots.

Our revised conclusions are based on work conducted with a new behavioral bioassay designed specifically to test the responses of 1 st-instar western corn root worm larvae, the life stage that is of greatest ecological interest as far as host plant selection is concerned (our earlier publications were all based on work with 2nd instars). The new bioassay apparatus consists of a vertical glass Y-tube filled with glass beads. The Y-tube accommodates the geotropic tendency of the larvae by allowing them to make a choice between the downward arms, and the glass beads reproduce the thigmotactic cues available to larvae in their natural soil environment. A syringe pump is used to provide slow, consistent delivery of candidate compounds to the 2 sides of the apparatus. In addition, the glass bead apparatus can be adapted to facilitate the testing of a variety of chemical sources.

In initial experiments with our new bioassay apparatus, we found that larvae were equally attracted to the corn source and to the control when the $CO_2$ concentrations were equally matched on both sides. These results directly contradicted our earlier work, and compelled us to reinvestigate the role of $CO_2$ and other volatile compounds in the attraction of western corn root worm larvae.

Materials and Methods

Insects. Western corn root worms (originally obtained from J. Jackson, USDA-ARS Laboratory, Brookings, S. Dak.) (non-diapausing strain) were reared on corn plants grown in soil in an incubator using methods described by Jackson (1985) and modified by Hibbard and Bjostad (1988). Periodic additions were made to the colony with eggs obtained from French Agricultural Research (Lamberton, Minn.). Eggs from a diapausing strain of western corn root worm were obtained from French Agricultural Research. The eggs (in soil) were kept moist and larvae were used in bioassays within 12 hours of hatching.

Corn. Untreated, dried corn seeds (*Zea mays*, cv 3055 provided courtesy of Gary D. Lawrance, Pioneer Hi-Bred International, Inc., Johnston, Iowa) were washed with soapy water, soaked for 24 hours in soapy water (I drop of Ivory Dishwashing Liquid, Procter & Gamble, Cincinnati, Ohio, per liter of water), and rinsed thoroughly with water. For use in bioassays, the washed seeds were germinated 3 days on germination paper (Steel Blue, Anchor Paper Company, St. Paul, Minn.) in a closed polyethylene tub (30 by 15 cm), and the plants typically reached a shoot length of 1 cm and a root length of 6 cm.

Soil. Soil was obtained from a local agricultural research farm whose history was known, and where no corn had been grown for 5 years.

Figure 62:
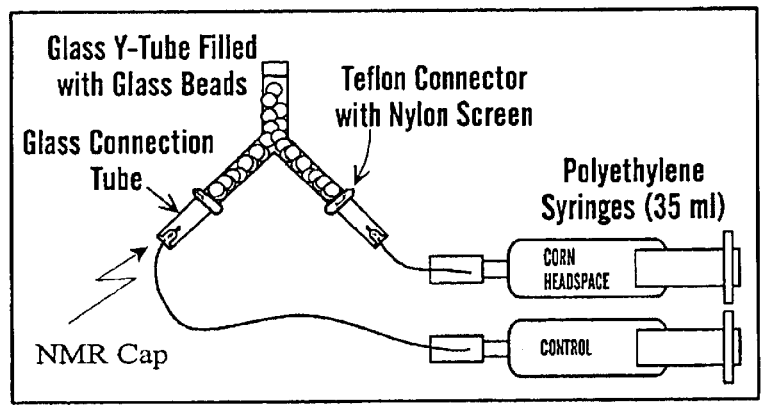
FIG. 62 shows a glass bead bioassay apparatus with candidate chemical cues in syringes for Example 19. Significant differences (p<0.05) are indicated by different lower case letters. Bars "I" represent standard errors.

Bioassay Procedure. All bioassays were choice tests conducted using a vertical glass "Y" tube apparatus filled with 3-mm glass beads (Bemklau and Bjostad 1998) FIG. 62). Volatile compounds were prepared in 35-ml polyethylene syringes (cat no. 106-0490, Sherwood Medical, St. Louis, Mo.) and a syringe pump (Sage Model 355, Fisher Scientific, Pittsburgh, Pa.) was used to provide, slow (1 ml per min) consistent delivery of the compounds into each choice arm of the bioassay apparatus. Twenty newly-hatched larvae (less than 12-hours-old) were used for each bioassay. Non-diapausing larvae were used for all experiments unless otherwise indicated below. For each choice test a minimum of 10 replicates were conducted.

GC-MS Analysis of $CO_2$. Mass spectrometry was used to determine $CO_2$ concentrations. A Hewlett-Packard Series II 5890 gas chromatograph interfaced with a Hewlett-Packard 5971 mass selective detector was operated in selected ion monitoring mode (SIM) for m/e 44 with a methyl silicone capillary column (30 m by 0.32 mm inside diameter, RSL-150, Alltech, Deerfield, Mich.). A 2-microliter sample of the headspace was taken from 2 cm inside the polyethylene syringes.

Corn Headspace Versus $CO_2$. Using the glass bead bioassay (Bemklau and Bjostad 1998) the headspace over germinating corn seeds was tested in a choice test against a series of $CO_2$ concentrations to determine if corn volatiles (including $CO_2$) were more attractive to the larvae than $CO_2$ alone. A 35-ml syringe was filled with the headspace over 3-day-old germinating corn seedlings by means of a 25-cm length of slender Teflon tubing inserted into a hole drilled into the cover of the tub containing the corn seedlings.

Three different concentrations of $CO_2$ were tested on the control side of the choice test. In the 1st test, we used ambient room air on the control side, which contains a lower concentration of $CO_2$ than the corn headspace (approximately 1.0 mmol/mol). In the 2nd test, we used GC-MS-SIM to match the $CO_2$ concentration in the syringe on the control side to be equal to that measured in the syringe containing corn headspace. In the 3rd test, the syringe on the control side of the choice test contained a $CO_2$ concentration twice that measured in the corn headspace. To prepare each of these control concentrations, a 2nd 35-ml polyethylene syringe was partially filled (approximately 5 ml) from a tank containing pure (100%) $CO_2$ using a glass syringe. Headspace from a plastic tub containing only moist germination paper was drawn into the syringe to fill it, mixing the air and $CO_2$ thoroughly at the same time. The gas mixtures in the polyethylene syringes were allowed to equilibrate for 15 minutes, and GC-MS-SIM was used to verify the $CO_2$ concentrations in both syringes prior to each bioassay.

Corn Headspace Versus $CO_2$ with Diapausing Larvae. The larvae used in our studies were from a colony of nondiapausing western corn root worm that has been maintained in our laboratory since 1986. We wished to determine if diapausing western corn root worm larvae would respond differently to corn volatiles than the colony larvae. Using the same method described above, the headspace over germinating corn seeds was tested in a choice test against a series of $CO_2$ concentrations with western corn root worm larvae from a diapausing strain.

Corn Headspace-Coated Glass Beads versus $CO_2$. In the previous experiments, corn volatiles were introduced into the bottom of the Y-tube and carried through the glass beads by the airstream from the syringe pump. We also tested the possibility that some volatile compounds may have been removed from the airstream by coating out on the glass beads on the bottom of the Y-tube where they would not be available for the larvae to detect at the choice point near the middle of the Y-tube. For these tests, 2 glass tubes (4 cm long, 8 mm inside diameter, restricted at the bottom to support the glass beads) were wrapped with Teflon tape and fitted snugly inside each branch of the Y-tube. A Teflon connector was fitted over the bottom end of each tube, a NMR cap was then inserted tightly inside the connector, and both tubes were filled with glass beads. One filled glass tube was inserted 2 cm into the bottom of a plastic tub containing 3-d-old germinating corn seeds. A 25-cm length of Teflon tubing was inserted into the hole in the NMR cap and the other end was connected to a 35-ml polyethylene syringe. The plunger was slowly drawn out, pulling the corn headspace through the glass beads and filling the syringe. The glass tube was then removed from the corn tub, the top was capped with a rubber stopper, and the bottom was sealed with a metal plug inserted into the hole in the NMR cap. For the control side of the bioassay, a 35-ml polyethylene syringe was filled with 1 of 3 concentrations of $CO_2$, as described previously (ambient $CO_2$, $CO_2$ matching the concentration in the headspace over the germinating corn seeds, or twice the concentration of $CO_2$ in the corn headspace). The gas mixture from 1 of the syringes was pushed through a glass test tube filled with glass beads through a 25-cm length of Teflon tubing inserted into a hole in the rubber stopper capping the top. The hole in the NMR cap was sealed with a wire plug. The glass tubes containing corn headspace or 1 of the $CO_2$ controls were uncapped and inserted into the ends of the Y-tube so that the tops were even with the junction of the 'Y'. With this arrangement, corn compounds of limited volatility were available to the larvae at the choice point. The rest of the Y-tube was filled to within 0.5 cm of the top with untreated glass beads. The syringe containing corn headspace and the 2nd syringe containing a $CO_2$ mixture were connected to the ends of the Y-tube with 25-cm lengths of Teflon tubing inserted into the hole in the NMR cap. The $CO_2$ concentrations in both test tubes and in the 2 remaining polyethylene syringes were verified using GS-MS-SIM prior to each bioassay.

Headspace from Corn in Soil Versus $CO_2$. We considered the possibility that microorganisms and other components of the soil environment may interact with growing corn roots to produce volatile compounds that attract western corn root worm larvae, and that they may not be present in corn that is germinated outside of soil. Using the method described above, the headspace obtained from soil that contained growing corn plants was tested against different concentrations of $CO_2$ to determine if such volatiles attract western corn root worm larvae. The bottom of a glass dessicator (Cat No. 25031-026, VWR Scientific, Denver, Colo.) (20 cm high, 25 cm diameter) was filled with water (3 cm deep). A perforated ceramic plate (suspended 6 cm from the bottom) was lined with filter paper (Whatman No. 4, 15 cm diameter, Cat No. 1004-090, Springfield Mill, Maidstone, Kent, England). Two 35-cm pieces of slender Teflon tubing were secured on top of the filter paper with sewing thread tied through the holes in the plate. The filter paper and tubing were covered with 2 cm of a 4:1 soil/peat moss mixture, and the soil was then moistened with 40 ml of water. Untreated, dried corn seeds (50) that had been washed with soapy water, soaked for 24 hours, and rinsed thoroughly, were evenly spread over the soil and covered to a depth of 1 cm. The cover of the dessicator was replaced. The Teflon tubes were secured with cellophane tape to the sides of the chamber so that they projected out the hole (4 cm diameter) in the cover. When the plants were 8 days old, 35 ml of the soil headspace was drawn into a 35-ml polyethylene syringe through the 35-cm Teflon tubes. A 2nd 35-ml polyethylene syringe was filled (as described above) with 1 of 3 concentrations of $CO_2$ (ambient $CO_2$, $CO_2$ matching the concentration in the headspace over the damaged corn seeds, or twice the concentration of $CO_2$ in the soil headspace). The gas mixtures in the polyethylene syringes were allowed to equilibrate for 15 minutes, and GC-MS-SIM was used to verify the $CO_2$ concentration in both syringes prior to each bioassay.

Soil Bioassay. A variation of the bioassay apparatus containing soil was used to test larval attraction to corn compounds of limited volatility that might be present in soil in which corn is grown. Washed, soaked corn seeds (9) were planted in a plastic tub (11 cm high, 7 cm diameter) in soil that had been sifted through a 0.32 mm mesh and through a 5 mm mesh screen (W. S. Tyler Inc., Mentor, Ohio 44060). An equal amount of soil was added to a 2nd tub as a control. Both tubs were uncovered after 3 days and the soil was used for bioassays when the corn plants were 8 days old. The corn plants were removed from the soil and the soil was examined under a microscope to remove any pieces of corn roots that might remain. The bottom of a glass test tube (4 cm long, 8 mm diameter, with a 1.5 mm hole in the bottom) was lined with a square (1 by 1 cm) of organza cloth and the tube was filled with the soil. A Teflon connector was snugly fitted over the bottom end of the tube and a NMR cap (with a 1-mm diameter hole) was inserted tightly inside the connector. A 2nd glass test tube was prepared, using soil from the control tub. The 2 glass tubes were inserted snugly inside the glass Y-tube so that the tops were even with the junction of the 'Y', and the rest of the Y-tube was filled to within 1 cm of the top with soil from the corn tub. A 60-ml polyethylene syringe containing a 5 mmol/mol mixture of $CO_2$ (prepared as described above) was connected to the side of the Y-tube containing corn soil via a 25-cm length of Teflon tubing inserted into the hole in the NMR cap. A 2nd 60-ml polyethylene syringe was filled (as described above) with 1 of 3 concentrations of $CO_2$ (1, 5 or 10 mmol/mol $CO_2$) and connected to the control side of the Y-tube. GC-MS-SIM was used to verify the $CO_2$ concentration in both syringes prior to each bioassay. Bioassays were run for 60 minutes.

Corn Headspace From Western Corn Root Worm-Damaged Corn Versus $CO_2$. Using the same method described in the 1st experiment, the headspace over germinating corn seeds that had been fed upon by western corn root worm larvae was tested against $CO_2$ to determine if larval feeding causes corn roots to produce volatile compounds that are more attractive to western corn root worm larvae than those from undamaged roots. Corn seeds were germinated in covered plastic tubs as described above. After 3 days, 80 2nd-instar western corn root worm larvae were transferred onto the roots of the germinating corn seeds, the container was closed and the larvae were allowed to feed for 24 hours. A 35-ml polyethylene syringe was filled with the headspace containing the corn volatiles from the damaged corn, and a 2nd 35-ml polyethylene syringe was filled with 1 of 3 concentrations of $CO_2$ (ambient $CO_2$, $CO_2$ matching the concentration in the headspace over the damaged corn seeds, or twice the concentration of $CO_2$ in the corn headspace). The gas mixtures in the polyethylene syringes were allowed to equilibrate for 15 minutes, and GC-MS-SIM was used to verify the $CO_2$ concentration in both syringes prior to each bioassay.

Corn Surface Extracts. Surface extracts of germinating corn seeds were tested for larval attraction. Germinating corn seeds (3-day-old, 50 grams dry wt as determined at the end of the experiment) were firmly packed into a glass tube (30 cm long, 30 mm diameter, tapering to 12 mm diameter) and diethyl ether (glass-distilled) was dribbled through the seedlings until 8 ml of extract had been collected. The extract was concentrated to 2 ml by evaporation with a gentle stream of nitrogen. Different aliquots of the extract (0.003, 0.03, 0.1, 0.3, 3.0, and 30 gram equivalents corn) were applied to a strip of filter paper (Whatman no. 5, 0.5 by 2 cm) and an equal volume of control solvent, concentrated similarly, was applied to another strip of filter paper. After the solvent had evaporated, the strips were placed in the glass connection tube on the end of either branch of the Y-tube and the NMR cap was replaced. The bioassay was conducted as described above with equal concentrations of $CO_2$ (3 mmol/mol) in the syringes on both sides.

Cryogenic Collections of Corn Volatiles. Germinating corn seeds (3-day-old, 50 grams dry wt as determined at the end of the experiment) were packed into a glass tube (30 cm by 30 mml, tapering to 12 mm). A strip of filter paper (0.5 by 2 cm) and a boiling chip were placed in the bottom of a glass sample tube (12 mm by 35 cm, closed at the bottom) and the sample tube was attached to the bottom of the seed-holding tube with a Teflon connector. For a control, a strip of filter paper and a boiling chip were placed in an empty sample tube. Both sample tubes were immersed in a liquid nitrogen bath (3.5 liters). As the air in the treatment tube condensed, a vacuum was created, which pulled air through the corn seedlings and down into the sample tube. When 2 ml of liquid air had collected in the treatment and control tubes, they were removed from the nitrogen bath, the treatment tube was disconnected from the corn seedling tube, and both tubes were placed into precooled (in liquid nitrogen) styrofoam blocks until the condensed air had boiled away. The filter paper strips were removed from the tubes and immediately inserted into the glass connection tubes on either side of the bioassay apparatus. Bioassays were conducted using the shell vial method (described above) with equivalent concentrations of $CO_2$ on both sides of the choice test.

Figure 75:
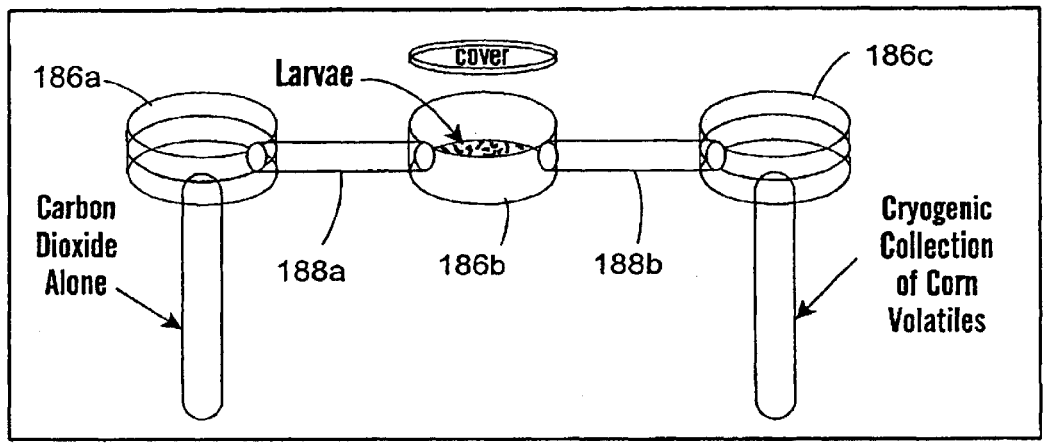
FIG. 75 shows a three petri dish test bioassay apparatus.

Petri Dish Bioassay. The attraction of western corn root worm larvae to volatile compounds other than $CO_2$ was previously reported by our laboratory on the basis of experiments conducted using a petri dish bioassay apparatus (Hibbard and Bjostad 1988, 1989; Bjostad and Hibbard 1992). The results we have now obtained using the Y-tube apparatus conflict with these reports, and we conducted experiments using the petri dish bioassay apparatus to re-investigate the results reported previously (Hibbard and Bjostad 1988). Three plastic petri dishes 186a, 186b, 186c (each 5 cm in diameter) were connected with 2-cm lengths of Teflon tubing 188a and 188b (each 10 mm in diameter) inserted into holes in the sides of the Petri dishes (FIG. 75). Holes were cut with a brass tube attached to a soldering iron. The bottoms of the 2 end dishes had 12 mm holes melted through their centers. The apparatus was supported on a ring stand. Cryogenic collections of corn seedlings were prepared as described above, except that no filter paper strip was placed in the bottom of the collection tube. When the tube had warmed to room temperature, it was flushed for 10 sec with 100% $CO_2$ from a tank at 4 psi, then inverted for 30 sec. For the control side, an empty sample tube was similarly flushed with $CO_2$ for 10 sec and inverted for 30 sec. Immediately after inversion for 30 sec, each tube was capped and allowed to sit for 15 minutes to allow the $CO_2$ to equilibrate. The petri dish apparatus was assembled and a bubble level was used to insure that the apparatus was not tilted to 1 side or the other. When GC-MS-SIM measurements indicated that the $CO_2$ concentrations in the tubes were equal (measured through pinholes in the caps from within 5 cm of the top of the tubes) both tubes were connected with a Teflon connector to the holes in the bottom of the end dishes of the bioassay apparatus. The covers were placed on all 3 dishes and the apparatus was allowed to sit for 5 min to allow volatile compounds to begin diffusing. After 5 minutes, 10 2nd-instar western corn root worm larvae were placed in the center of the middle Petri dish and the cover was replaced. The number of larvae in each of the chambers and in the sample tubes was recorded every 5 minutes for a total of 30 minutes. All bioassays were conducted in dim lighting. $CO_2$ concentrations within the 3-petri-dish apparatus were measured by removing samples through a pinhole in each Teflon connector. A 5-$\mu l$ sample was taken from each side every 60 sec throughout the 30 minute period and analyzed using GC-MS-SIM. Twenty replicates of the behavioral bioassay were conducted, and $CO_2$ measurements were taken for 8 replicates.

Statistical Analysis. Analysis of variance was conducted for each experiment using orthogonal comparisons (Winer, 1971). In most of the experiments, corn volatiles were present on one side of the bioassay apparatus, and on the other side there was a defined $CO_2$ concentration that was equal to, greater than, or less than that on the corn volatile side. For each orthogonal comparison, a treatment was compared with its corresponding mean (P=0.05), for both the $CO_2$ data and the behavioral data. There were thus 3 orthogonal comparisons for the $CO_2$ data and also for the behavioral data from each of these experiments, with an experiment-wise error rate of P=0.05. The petri dish bioassay was analyzed similarly, except that 7 orthogonal comparisons were made, comprising the 7 bioassay intervals, for both the $CO_2$ data and the behavioral data. Means and standard errors are expressed as mean±standard error in the text that follows.

Results

Figure 63:
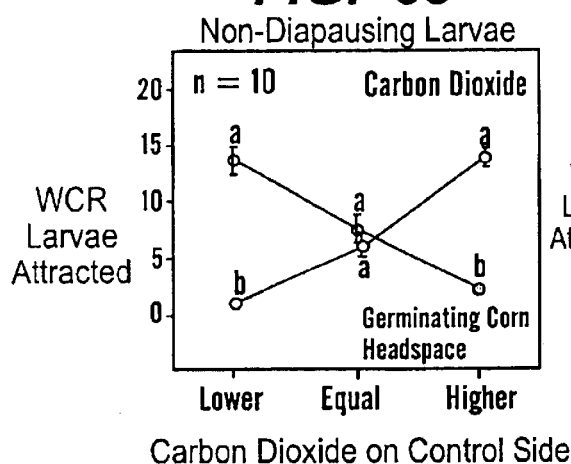
FIG. 63 illustrates a choice-test bioassay with syringe sources containing the headspace from germinating corn seedlings versus three different concentrations of $CO_2$, alone with larvae from a non-diapausing strain of western corn root worm for Example 19. Significant differences (p<0.05) are indicated by different lower case letters. Bars "I" represent standard errors.
Figure 65:
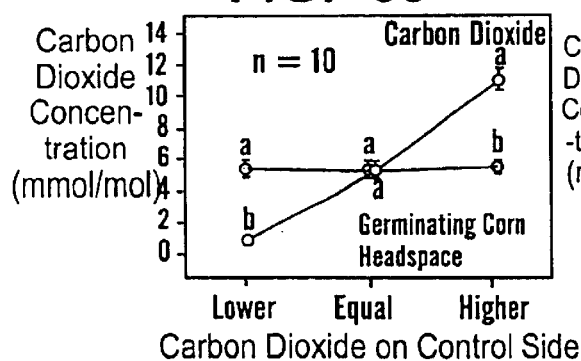
FIG. 65 illustrates a graph of $CO_2$ concentrations (measured with GC-MS-SIM) of headspace over germinating corn seeds and $CO_2$? mixtures and syringes for the choice-test with larvae from a non-diapausing strain of western corn root worm in Example 19 corresponding to FIG. 63. Significant differences (p<0.05) are indicated by different lower case letters. Bars "I" represent standard errors.

Corn Headspace Versus $CO_2$. For the non-diapausing strain of western corn root worm, significantly more larvae (P<0.05) chose the corn headspace side (FIG. 63) when the control syringe contained ambient room air. There was no significant difference between the number of larvae that chose the corn headspace and larvae that chose the control when the $CO_2$ concentrations were the same (FIG. 65). Larvae chose the control side significantly more often when the control contained twice the concentration of $CO_2$ as the corn headspace.

Figure 64:
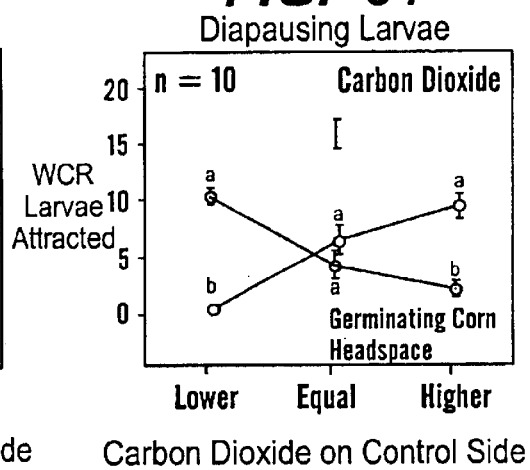
FIG. 64 illustrates a graph of a choice-test bioassay with syringe sources containing the headspace from germinating corn seedlings versus three different concentrations of $CO_2$, alone with larvae from a diapausing strain of corn root worm in Example 19. Significant differences (R<0.05) are indicated by different lower case letters. Bars "I" represent standard errors.
Figure 66:
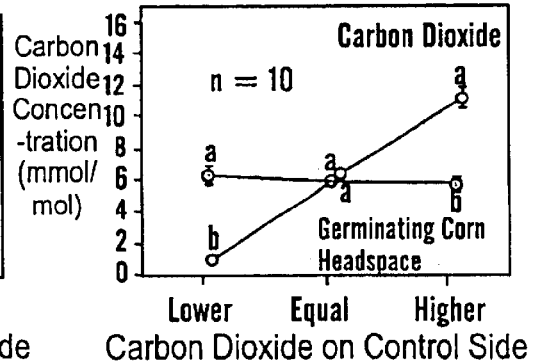
FIG. 66 illustrates a graph of the concentrations of the $CO_2$ (measured with GC-MS-SIM) of headspace over germinating corn seeds and $CO_2$ mixtures in syringes for the choice-test with larvae from a diapausing strain of western corn root worm in Example 19 corresponding to FIG. 64. Significant differences (p<0.05) are indicated by different lower case letters. Bars "I" represent standard errors.

Corn Headspace Versus $CO_2$ with Diapausing Larvae. Similar results were obtained with the diapausing strain of western corn root worm. Significantly more of the larvae (P<0.05) chose the corn headspace side when the control syringe contained ambient room air (FIG. 64). There was no significant difference between the number of larvae that chose the corn headspace and larvae that chose the control when the $CO_2$ concentrations were the same (FIG. 66). Larvae chose the control side significantly more often when the control contained twice the concentration of $CO_2$ as the corn headspace.

Figure 67:
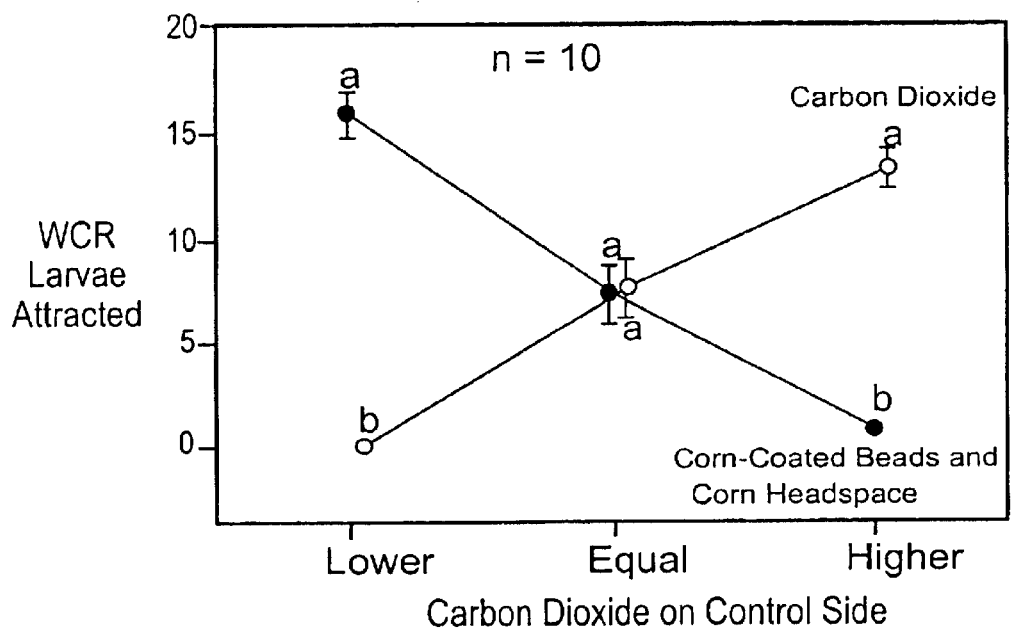
FIG. 67 illustrates the graph of a choice-test bioassay with syringe sources containing the headspace from germinating corn seedlings versus three concentrations of $CO_2$, alone and the glass beads in the treatment side coated with the volatiles from the corn headspace for Example 19 described in the Detailed Description. Significant differences (p<0.05) are indicated by different lower case letters. Bars "I" represent standard errors.
Figure 68:
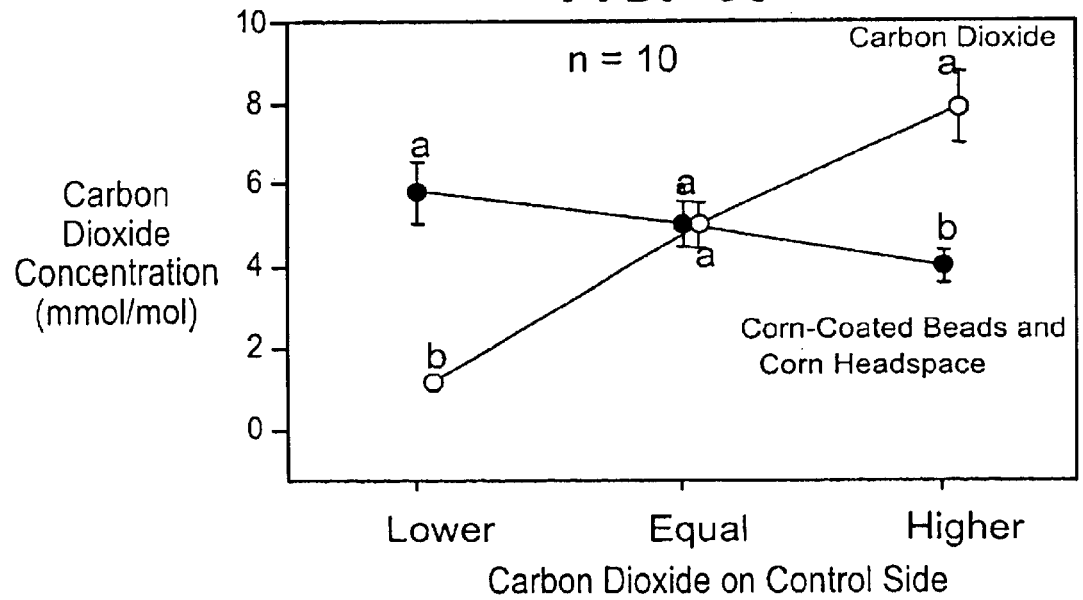
FIG. 68 illustrates a graph of the $CO_2$, concentrations (measured with GC-MS-SIM) of the headspace over germinating corn seeds and the $CO_2$ mixture in syringes for Example 19. Significant differences (p<0.05) are indicated by different lower case letters. Bars "I" represent standard errors.

Corn Headspace-Coated Glass Beads Versus $CO_2$. Significantly more larvae (P<0.05) chose the corn-coated beads and corn headspace side of the bioassay when the control side contained ambient room air (FIG. 67). There was no significant difference between the number of larvae that chose the corn headspace and larvae that chose the control when the $CO_2$ concentrations were the same (FIG. 68). Larvae chose the control side significantly more often when the control contained twice the concentration of $CO_2$ as the corn headspace.

Figure 69:
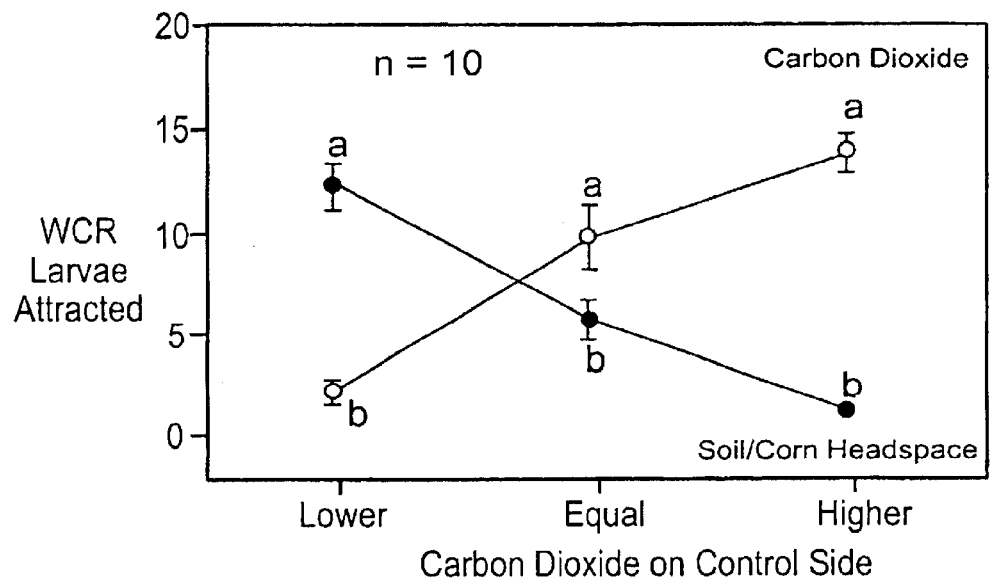
FIG. 69 shows a graph of a choice-test bioassay with syringe sources containing the atmosphere from soil containing growing corn plants versus three different concentrations of $CO_2$ alone, and in particular, illustrates corn root worm larvae attracted to syringe sources containing the atmosphere from soil having growing corn plants versus the three different concentrations of $CO_2$ in Example 19. Standard differences (p<0.05) are indicated by different lower case letters. Bars "I" represent standard errors (for some treatments, the standard errors are too small to be visible on the graph).
Figure 70:
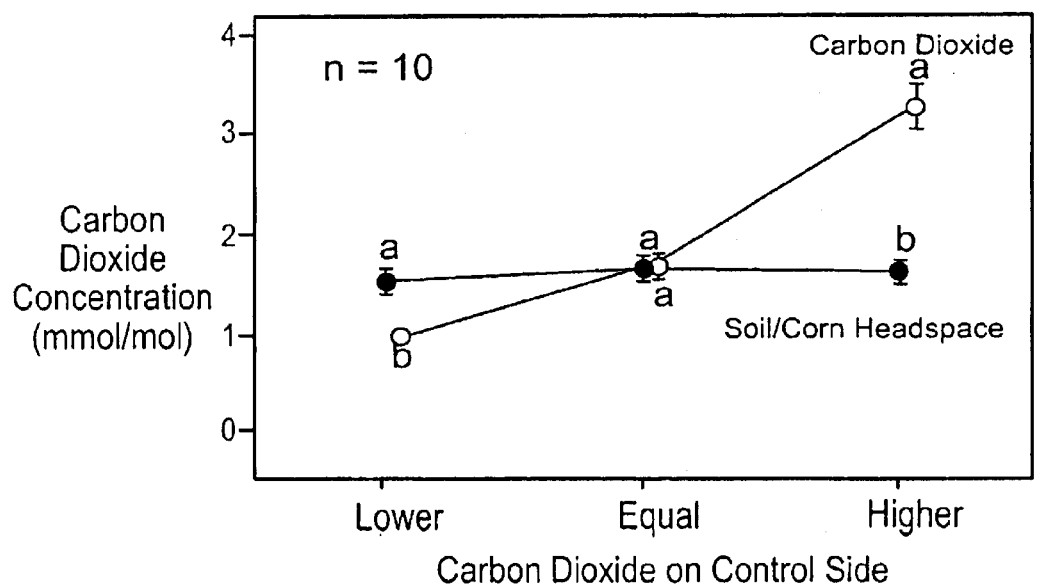
FIG. 70 illustrates a graph of $CO_2$ concentrations (measured with GC-MS-SIM) of the corn/soil headspace and the $CO_2$, mixtures in syringes for Example 19. Standard differences (p<0.05) are indicated by different lower case letters. Bars "I" represent standard errors (for some treatments, the standard errors are too small to be visible on the graph).

Headspace from Corn in Soil Versus $CO_2$. The larvae chose the corn-coated beads and corn headspace significantly more often (P<0.05) when the control syringe contained ambient room air (FIG. 69). Significantly more larvae chose the $CO_2$ control over the corn headspace when the $CO_2$ concentrations were the same (FIG. 70). Larvae chose the control side significantly more often when the control contained twice the concentration of $CO_2$ as the corn headspace.

Figure 71:
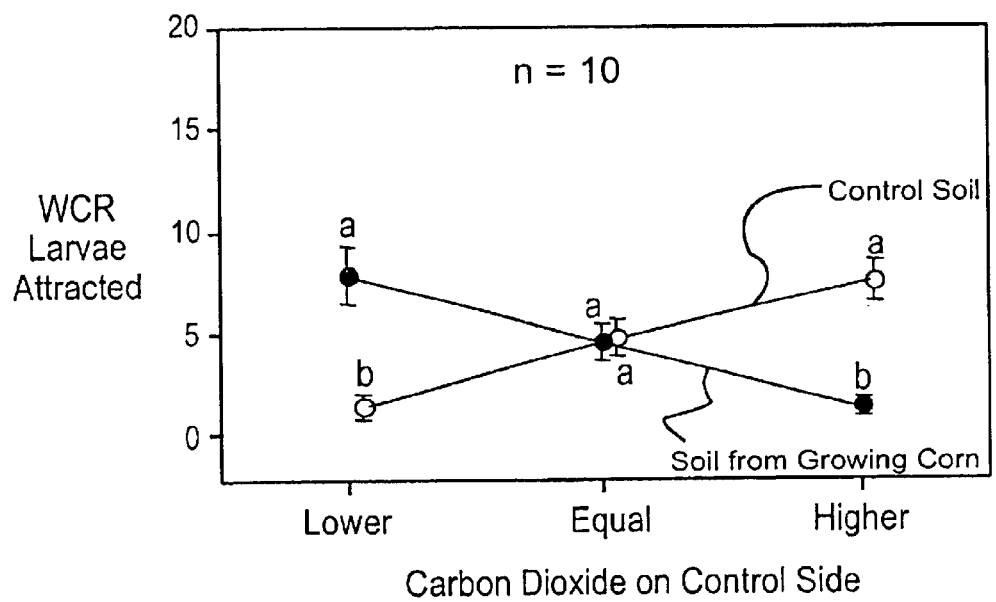
FIG. 71 illustrates a western corn root worm larvae choice-test bioassay with soil removed from the roots of growing corn plants versus control soil for Example 19. Syringe sources on the treatment side contain 5 mmol $CO_2$ and the syringe sources on the control side contain three different concentrations of $CO_2$ alone. Significant differences (p<0.05) are indicated by different lower case letters. Bars "I" represent standard errors (some of which are too small to be visible).
Figure 72:
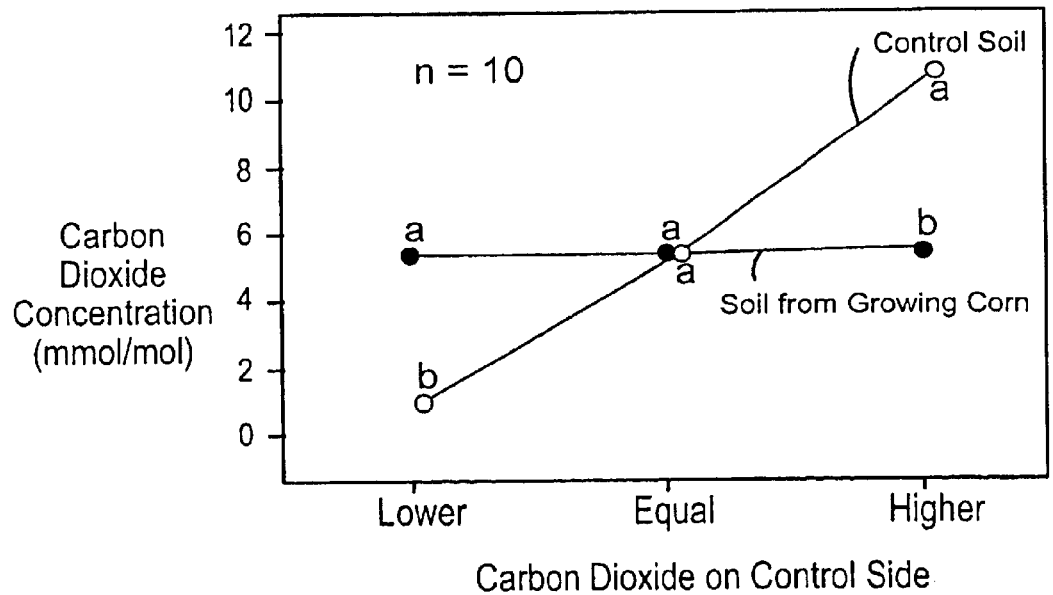
FIG. 72 illustrates $CO_2$ concentrations (measured with GC-MS-STM) of the $CO_2$ mixtures in the syringes for Example 19. Significant differences (p<0.05) are indicated by different lower case letters. Bars "I" represent standard errors (some of which are too small to be visible).

Soil Bioassay. The larvae chose the soil from growing corn roots significantly more often (P<0.05)(FIG. 71) when the syringe on the corn side contained a higher concentration of $CO_2$ than the control side (FIG. 72). There was no significant difference between the number of larvae that chose the corn headspace and larvae that chose the control when the $CO_2$ concentrations were the same. Larvae chose the control side more often when the control contained twice the concentration of $CO_2$ as the treatment side.

Figure 73:
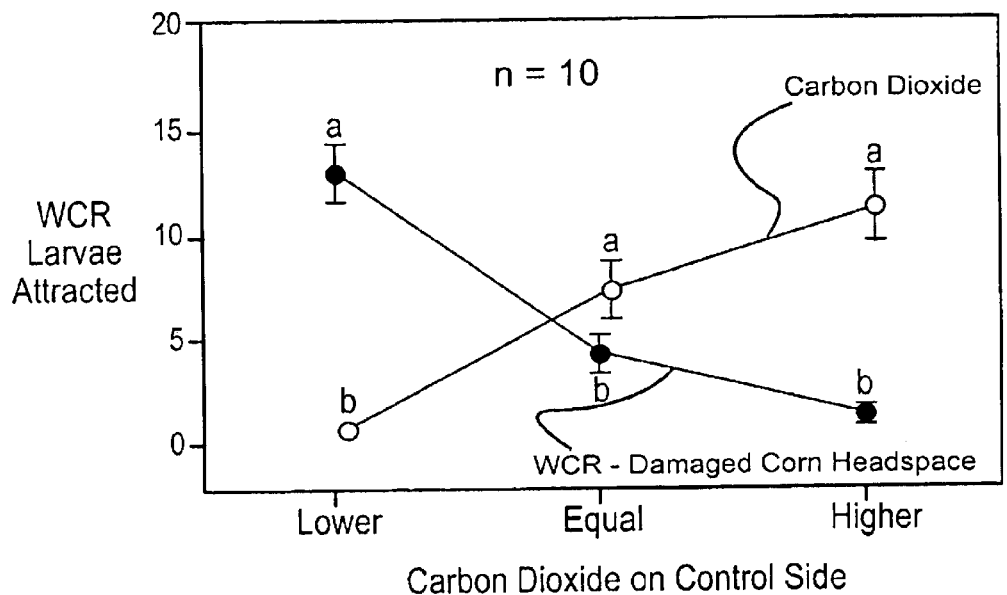
FIG. 73 illustrates a graph of a western corn root worm larvae choice-test bioassay with syringe sources containing the headspace from germinating corn seedlings that have been fed upon by western corn root worm larvae versus three different concentrations of $CO_2$ alone for Example 19. Significant differences (p<0.05) are indicated by different lower case letters. Bars "I" represent standard errors.
Figure 74:
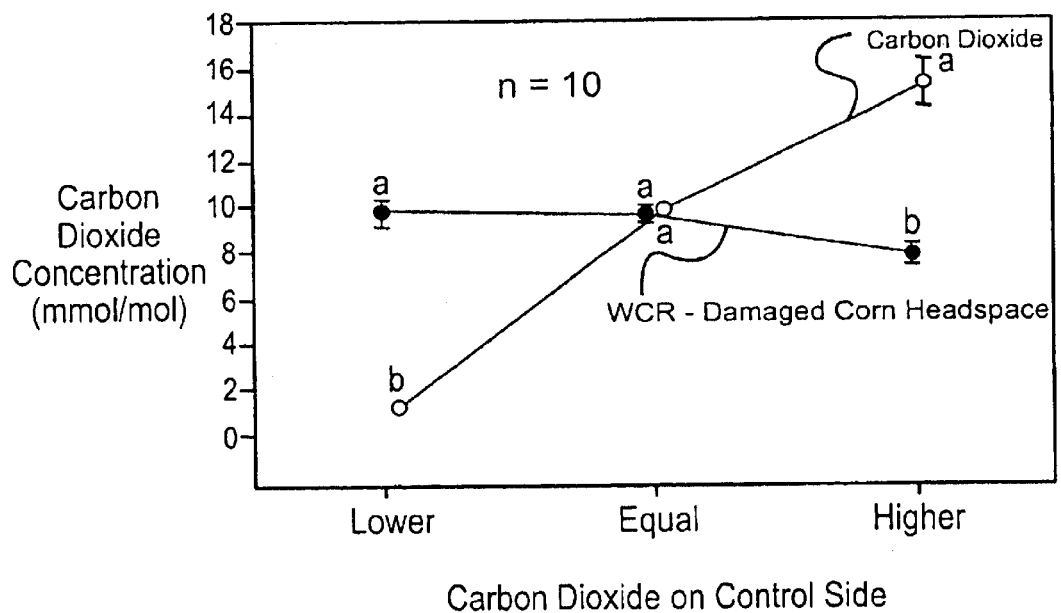
FIG. 74 shows a graph of $CO_2$ concentrations (measured with GC-MS-SIM) of headspace over western corn root worm damaged corn seedlings and $CO_2$, mixtures in the syringes for Example 19. Significant differences (p<0.05) are indicated by different lower case letters. Bars "I" represent standard errors.

Corn Headspace From Western Corn Root Worm-Damaged Corn Versus $CO_2$. The larvae chose the headspace from damaged corn seedlings significantly more often (P<0.05) when the control syringe contained ambient room air (FIG. 73). Significantly more larvae chose the $CO_2$ control over the corn headspace when the $CO_2$ concentrations were the same (FIG. 74). Larvae chose the control side significantly more often when the control contained twice the concentration of $CO_2$ as the corn headspace.

Corn Surface Extracts. There was no significant difference between the number of larvae choosing the corn extract and larvae choosing the control when 0.00, 0.003, 0.03, 0.1, 0.3 and 3.0 gram equivalents were tested (P>0.05). When the treatment side contained 30 gram equivalents, the larvae chose the control side significantly more often (P<0.05) than the corn.

Cryogenic Collections of Corn Volatiles. There was no significant difference between the number of larvae choosing the corn extract and larvae choosing the control when 0, 1, 3, 10 and 100 germinating corn seedlings were cryogenically collected (P<0.05), but the larvae chose the control side significantly more often (P<0.05) than the volatiles collected from 300 germinating corn seedlings.

Figure 76:
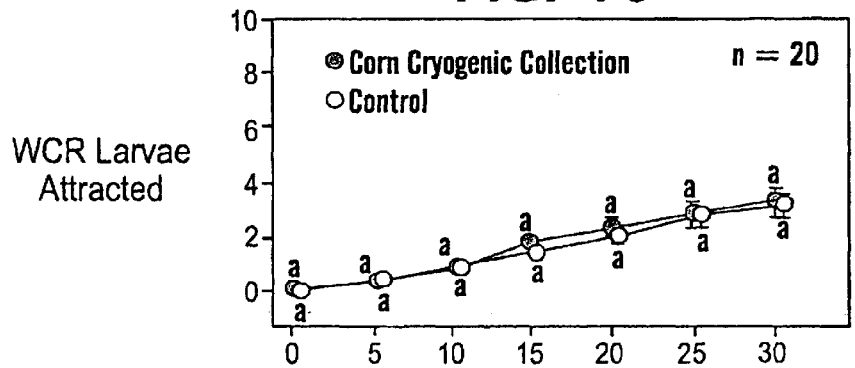
FIG. 76 shows a graph of a western corn root worm larvae choice-test bioassay with cryogenic collections of corn volatiles plus $CO_2$, versus $CO_2$ alone, using second-instar western corn root worm larvae. Significant differences (P<0.05) are indicated by different lower case letters. Bars "I" represent standard errors (for some COW measurements, the standard errors are too small to be visible on the graph).
Figure 77:
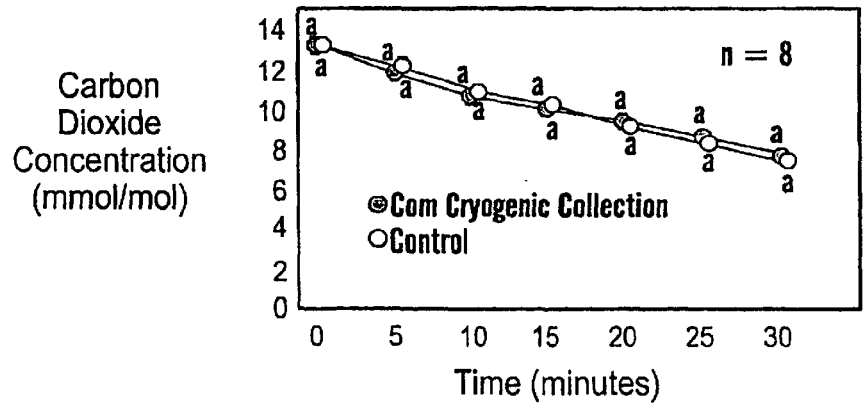
FIG. 77 illustrates a graph of $CO_2$ concentrations (measured with GC-MS-SIM) taken from inside the bioassay apparatus of FIG. 75. Significant differences (n<0.05) are indicated by different lower case letters. Bars "I" represent standard errors (for some $CO_2$ measurements, the standard errors are too small to be visible on the graph).
Figure 78:
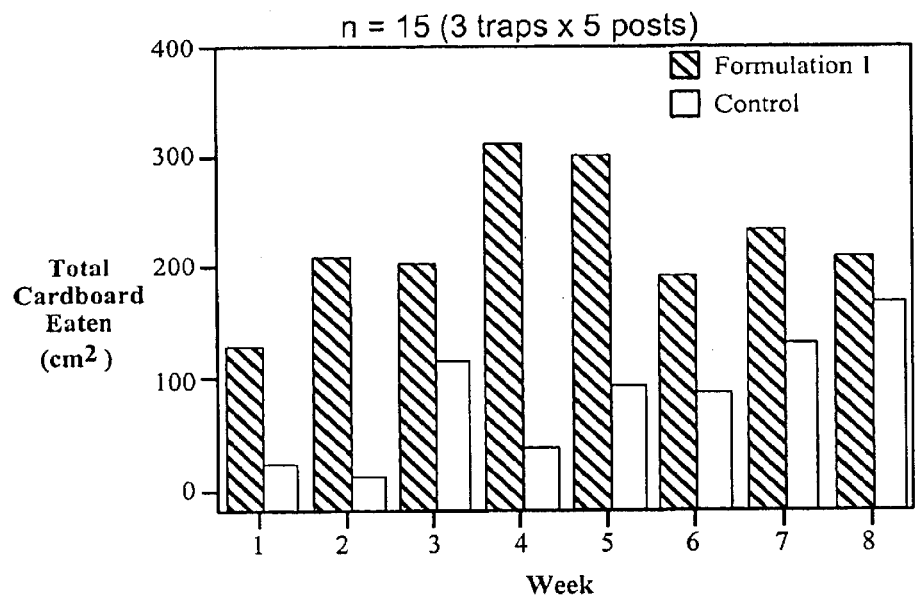
FIG. 78 shows a graph of termite bait field test using Formulation 1 described in the Detailed Description herein below.

Petri Dish Bioassay. There was no significant difference between the number of larvae that chose the cryogenic collection of corn volatiles and larvae that chose the control (P>0.05) in the petri dish bioassay (FIG. 76). During the 30 minutes that the bioassay was run, there was no significant difference between the $CO_2$ concentration on the corn side and the control side inside the petri dish apparatus (FIG. 77).

Discussion

Our current experiments show that the attraction of western corn root worm larvae to corn roots is due to $CO_2$ alone, and that no other volatile chemical cues are involved. In an extensive series of choice tests with volatile compounds from germinating corn seedlings on 1 side of the choice tests and with different concentrations of $CO_2$ on the other side, the larvae were strongly attracted to volatile compounds from corn that were presented on 1 side of the bioassay, when ambient air was present on the other side. However, larvae chose equally between the 2 sides of the bioassay when corn volatiles were present on 1 side and an equivalent concentration of $CO_2$ was present on the other side. Moreover, when corn volatiles were present on 1 side and a higher concentration of $CO_2$ was present on the other side, most of the larvae chose the $CO_2$ side.

Using the vertical Y-tube apparatus containing glass beads, a number of different approaches were tested. The headspace from germinating corn seeds was tested against 3 defined concentrations of $CO_2$ with diapausing and non-diapausing western corn root worm larvae. Volatiles from feeding-damaged corn roots were used to test the possible production of attractive compounds by corn roots when they are under attack by western corn root worm larvae. Surprisingly, the larvae chose the control side slightly (but significantly) more often when an equivalent concentration of $CO_2$ was present on that side. It is possible that corn roots that are attacked by western corn root worm larvae respond by producing volatile compounds that are slightly repellent to the larvae. We tested the atmosphere within soil that contained growing corn roots against the atmosphere within control soil to test the possibility that attractive compounds are produced by the interaction of corn roots with microbes in the soil. In this test, the soil atmosphere from growing corn roots was slightly repellent to the larvae. We tested the possibility that compounds of limited volatility may be involved in larval attraction by preparing glass beads coated directly with volatiles produced by germinating corn seeds, and also by testing soil that was removed from growing corn roots in the Y-tube apparatus. There was no significant difference between the number of larvae choosing between the treatment and the control in both experiments when the $CO_2$ concentrations were equal on both sides of the choice tests, indicating that compounds of low volatility are not involved in larval attraction.

Diethyl ether extracts of germinating corn seeds on filter paper were tested with equal concentrations of $CO_2$ on both sides of the choice test, and cryogenic collections of corn volatiles were tested in the same manner. In both tests there was no significant difference between the number of larvae choosing between the treatment and the control for all doses tested except for the highest dose, which was repellent.

In all of these experiments there was no indication that any compound other than $CO_2$ is involved in the attraction of western corn root worm larvae to corn roots. This conclusion is in stark contrast to results obtained previously in our laboratory. Employing a 3-petri-dish bioassay apparatus with $2^{nd}$ instar western corn root worm larvae, Hibbard and Bjostad (1989, 1990, 1994) isolated and identified 6-methoxy-2-benzoxazolinone (MBOA) as well as 3 long-chain fatty acids (stearic acid, oleic acid and linoleic acid) as attractants for western corn root worm larvae. Subsequent field tests showed these compounds to have little or no effect (Hibbard et al. 1995). To test rigorously any possibility that volatile compounds may be active in the attraction of western corn root worm larvae, we repeated the experiments previously done in our laboratory with the petri dish bioassay apparatus and cryogenic collections of corn volatiles. We followed the methods we used previously (Hibbard and Bjostad 1988, 1990) with 2 exceptions. First, we attached the petri dish apparatus to a foamboard base and used a small bubble level to insure that the apparatus was not tilted to 1 side or the other, because the larvae have a geotropic tendency. Second, we capped the sample tubes as soon as the liquid air had boiled away and used GC-MS-SIM to determine when the $CO_2$ concentrations in the tubes were equal. Using this approach, we observed much less variablility in $CO_2$ concentrations than was present in our earlier work (Hibbard and Bjostad 1988). In these tests, the larvae chose equally between the corn volatiles and the control side, providing further corroboration that compounds other than $CO_2$ are not involved in larval attraction to corn.

We propose the use of $CO_2$ to attract soil organisms (insects, nematodes, mites) away from their host plants or to confuse the organisms so that they are unable to locate the host plants. One source of $CO_2$ that might be used is carbonated water. When used to irrigate the soil, carbonated water has been demonstrated to enrich the soil and increase the health and production of certain crops. Sources of $CO_2$ can also be used to attract soil-dwelling organisms to pesticide granules or to pellets containing a biocontrol agent. Under field conditions, sufficient $CO_2$ gradients can be produced by granules of potassium bicarbonate co-formulated with an acid and a pesticide that are broadcast or incorporated into the soil. Organic sources can be used to achieve a slow release of $CO_2$ for control of soil organisms using various approaches. One approach is the co-encapsulation of yeast and a nutrient substrate with calcium alginate, or with k-carrageenan, which is less expensive than calcium alginate. Calcium alginate co-encapsulation is relatively new technique in the fermentation industry that is currently used as a means for storage and dispersal of microorganisms, and has the potential to be employed in a variety of applications. Starch granules can also be used as formulations for microbial pesticides, and it is possible to incorporate chemical or biological sources of $CO_2$ into these granules to attract and kill soil pests.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A termite trap, comprising:
an enclosure for attracting termites, said enclosure including a plurality of openings, at least some of said openings defined through a portion of the enclosure so that the termites can enter the enclosure through said at least some of said openings;
an emitting source for emitting at least one gas of: (i) $CO_2$, and (ii) one or more mimics thereof;
wherein when said enclosure is in a desired position at a location having the termites, and said emitting source is provided in said enclosure, a concentration of said at least one gas is emitted from said openings so that when said concentration is encountered by the termites, the termites are attracted to said emitting source;
wherein said concentration is at least about 0.2% by volume of air encountered by termites;
wherein said concentration remains in an area about said enclosure so that the termites are attracted to said emitting source rather than to a structure sought to be protected from the termites; and
wherein said enclosure is, at least prior to being placed in the desired position, separate from the location having the termites.

2. The termite trap of claim 1, wherein said concentration is in a range extending to about 5% by volume.

3. The termite trap of claim 1, wherein said concentration is in a range extending to about 2% by volume.

4. The termite trap of claim 1, wherein said concentration is in a range from about 0.5% to 1% by volume.

5. The termite trap of claim 1, wherein said emitting source includes one of: carbonate, or bicarbonate formulation.

6. The termite trap of claim 1, said enclosure includes soil.

7. The termite trap of claim 6, wherein said soil has a moisture content of approximately 20% by weight.

8. The termite trap of claim 1, wherein said enclosure includes at least one of: an insecticide, insect growth regulator, a feeding stimulant, another termite attractant, and a material that changes termite movement.

9. The termite trap of claim 8, wherein said enclosure includes one of: hexaflumuron and a pheromone.

10. The termite trap of claim 9, wherein said enclosure includes hexaflumuron.

11. The method termite trap of claim 8, wherein said enclosure includes an insecticide for killing at least some termites of a colony near the location.

12. The termite trap of claim 8, wherein said enclosure includes a termite growth regulator for killing at least some termites of a colony near the location.

13. The termite trap of claim 1, wherein said enclosure includes one of: bacterial, fungal, algal, and other microorganism formulations for generating said concentration.

14. The termite trap of claim 13, wherein the desired position of said enclosure is outdoors.

15. The termite trap of claim 1, wherein said enclosure is positioned within two meters of a termite colony.

16. The termite trap of claim 1, wherein said emitting source includes one of: spent brewer's grain, ground germinated corn seeds, and spent grain extract.

17. The termite trap of claim 1, wherein said emitting source includes a material that is one of: charred and burned.

18. The termite trap of claim 17, wherein said material includes one of: wood, a cellulosic matrix, a polymeric matrix, wood, paper, cardboard, a fabric, a textile, wool, silk, bone, hair, horn, and claws.

19. The termite trap of claim 1, wherein no more than about 10% of the surface area of said enclosure comprises said openings.

20. The termite trap of claim 1, wherein at, least some of said openings are approximately 3 millimeters in diameter.

21. The termite trap of claim 1, wherein said concentration attracts one of: *Reticulitermes tibialis, Reticulitermes flavipes,* and *Reticulitermes virginicus.*

22. The termite trap of claim 21, wherein said concentration attracts *Reticulitermes tibialis.*

23. The termite trap of claim 21, wherein said concentration attracts *Reticulitermes flavipes.*

24. The termite trap of claim 21, wherein said concentration attracts *Reticulitermes virginicus.*

25. The termite trap of claim 1, wherein the termites are attracted through said openings by said emitting source.

26. The termite trap of claim 1, wherein said enclosure includes a sufficient amount of said emitting source for maintaining the emissions of the at least one gas so that the concentration of at least about 0.2% by volume of air is encountered by termites over a period of at least two weeks in an area large enough to attract the termites away from a portion of the structure susceptible to termite damage.

27. The termite trap of claim 26, wherein the area has an extent that is no more than approximately two meters from the structure.

28. The termite trap of claim 1, wherein said emitting source includes sodium bicarbonate.

29. The termite trap of claim 1, wherein said emitting source includes a product derived from corn.

30. The termite trap of claim 1, wherein said emitting source includes corn cob grits.

31. The termite trap of claim 1, wherein said enclosure includes a substantially enclosed bottom for supporting the contents therein.

32. The termite trap of claim 1, wherein said openings are sized for termites to pass through.

33. The termite trap of claim 1, wherein said openings are not generated by termites.

34. The termite trap of claim 1, wherein said enclosure is constructed of one or more of: plastic, glass, ceramic, and metal.

35. The termite trap of claim 1, wherein said openings in said enclosure are manufactured according to a predetermined design for said openings.

36. The termite trap of claim 1, wherein at least a majority of said openings are positioned below ground.

37. The termite trap of claim 1, wherein said concentration is less than a concentration for inhibiting the termites from entering said enclosure.

38. A termite trap, comprising:
an enclosure for attracting termites thereto, said enclosure including openings;
means for emitting at least one gas of: (i) $CO_2$, and (ii) one or more mimics thereof;
wherein when said enclosure and said means for emitting are in a desired position at a location having the termites, such that said means for emitting is provided within said enclosure, a concentration of said at least one gas is emitted from said openings so that when said concentration is encountered by the termites, the termites are attracted to said emitting source;
wherein said concentration is at least about 0.2% by volume of air encountered by termites, and said concentration is less than approximately 5% by volume of the air;
wherein said concentration remains in an area about said enclosure so that the termites are attracted to said emitting source rather than to a structure sought to be protected from the termites; and
wherein said enclosure is, at least prior to being placed in the desired position, separate from the location having the termites.

39. The termite trap of claim 38, wherein said enclosure includes at least one of: an insecticide, insect growth regulator, a feeding stimulant, or a termite attractant different from said at least one gas.

40. The termite trap of claim 38, wherein said means for emitting includes a product derived from corn.

41. The termite trap of claim 38, wherein said means for emitting includes corn cob grits.

42. A termite trap, comprising:
an enclosure for attracting termites, said enclosure including a plurality of openings, said openings defined through an exterior of the enclosure such that termites are able to enter said enclosure;
an emitting source for emitting at least one gas of: (i) $CO_2$, and (ii) one or more mimics thereof;
wherein when said enclosure is in a desired position at a location having the termites, and said emitting source is provided in said enclosure, a concentration of said at least one gas is emitted from said openings so that when said concentration is encountered by the termites, the termites are attracted to said emitting source;
wherein said concentration is at least about 0.2% by volume of air encountered by termites, and said concentration is less than an amount that is physiologically detrimental to the termites;
wherein said concentration remains in an area about said enclosure so that the termites are attracted to said emitting source rather than to a structure sought to be protected from the termites; and
wherein said enclosure is, at least prior to being placed in the desired position, separate from the location having the termites.

43. The termite trap of claim 42, wherein at least one of the following holds:
(a) said concentration is encountered by termites over a period of at least two weeks in an area large enough to reduce termite attraction to the structure;
(b) said concentration is in a range extending to about 5% by volume;
(c) said enclosure includes at least one of: hexaflumuron, or a pheromone;
(d) said enclosure is positioned within two meters of a termite colony;
(e) said enclosure is spaced apart from the structure approximately at least one meter;
(f) said openings have at least one dimension of approximately three millimeters; and
(g) said openings are not generated by termites.

44. The termite trap of claim 43, wherein at least some of (a) through (g) hold.

45. The termite trap of claim 43, wherein a majority of (a) through (g) hold.

46. The termite trap of claim 43, wherein at least six of (a) through (g) hold.

47. The termite trap of claim 43, wherein all of (a) through (g) hold.

48. The termite trap of claim 42, wherein at least one of the following holds:
(a) said enclosure includes one of: bacterial, fungal, algal, and other microorganism formulations for generating said concentration;
(b) said emitting source includes at least one of: a carbonate or bicarbonate formulation;
(c) said emitting source includes at least one of: spent grain, or ground germinated corn seeds;

(d) said emitting source includes a material that is at least one of: charred or burned;

(e) said concentration is less than an amount to prevent movement of the termites; and (f) said concentration is less than a concentration for inhibiting the termites from entering said enclosure.

49. The termite trap of claim 48, wherein at least some of (a) through (f) hold.

50. The termite trap of claim 48, wherein a majority of (a) through (f) hold.

51. The termite trap of claim 48, wherein at least five of (a) through (f) hold.

52. The termite trap of claim 48, wherein all of (a) through (f) hold.

53. The termite trap of claim 42, wherein at least one of:

(a) said enclosure includes soil;

(b) said enclosure includes at least one: an insecticide, insect growth regulator, a feeding stimulant, another termite attractant, or a material that changes termite movement;

(c) said enclosure is positioned within two meters of a termite colony;

(d) said enclosure is transported so that said enclosure is more available for use at the location having the termites;

(e) said enclosure is constructed of one or more of: plastic, glass, ceramic, and metal;

(f) said openings in said enclosure are provided according to a predetermined design for said openings.

54. The termite trap of claim 53, wherein at least some of (a) through (f) hold.

55. The termite trap of claim 53, wherein a majority of (a) through (f) hold.

56. The termite trap of claim 53, wherein at least five of (a) through (f) hold.

57. The termite trap of claim 53, wherein all of (a) through (f) hold.

58. The termite trap of claim 42, wherein said concentration is in a range extending to about 2% by volume.

59. The termite trap of claim 42, wherein said concentration is in a range from about 0.5% to 1% by volume.

60. A method to attract termites, comprising:

providing an enclosure having a plurality of openings for termites to pass therethrough, at least some of said openings defined through a portion of the enclosure;

providing an emitting source for emitting at least one gas of: (i) $CO_2$, and (ii) one or more mimics thereof including haloalkanes and alkylcarbonates;

wherein when said enclosure is in a desired position, at a location having the termites, with said emitting source in said enclosing, a concentration of said at least one gas is emitted from said openings so that when said concentration is encountered by the termites, the termites are attracted to said emitting source;

wherein said concentration is approximately at least 0.2% but volume of an ambient atmosphere;

wherein said emitted concentration remains in an area bout said enclosure for an effective time so that the termites are attracted to said emitting source rather than to a structure sought to be protected from the termites; and wherein said enclosure is, at least prior to being placed in the desired position, separate from the location having the termites.

61. The method of claim 60, wherein said concentration is in a range extending to approximately 5% by volume, wherein said enclosure includes a sufficient amount of said emitting source for maintaining the emissions of the at least one gas so that the concentration is not lethal to the termites, and is at least about 0.2% by volume of the ambient atmosphere that is encountered by termites over a period of at least two months in an area large enough to reduce termite attraction to the structure.

62. The method of claim 60, wherein said concentration is in a range extending to about 5% by volume.

63. The method of claim 60, wherein said concentration is in a range extending to about 2% by volume.

64. The method of claim 60, wherein said concentration is in a range from about 0.5% to 1% by volume.

65. The method of claim 60, wherein said emitting source includes at least one of: a carbonate or bicarbonate formulation.

66. The method of claim 60, further including a step of providing soil in said enclosure.

67. The method of claim 60, further including providing said soil with a moisture content of approximately 20% by weight.

68. The method of claim 60, further including a step of providing in said enclosure at least one of: an insecticide, insect growth regulator, a feeding stimulant, another termite attractant, or a material that changes termite movement.

69. The method of claim 18, further including a step of including in said enclosure at least one of: hexaflumuron, or a pheromone.

70. The method of claim 69, wherein said enclosure includes hexaflumuron.

71. The method of claim 68, wherein the termites enter said enclosure.

72. The method of claim 68, wherein said enclosure includes an insecticide for killing at least some termites of a colony near the location.

73. The method of claim 60, wherein said enclosure includes one of: bacterial, fungal, algal, and other microorganism formulations for generating said concentration.

74. The method of claim 73, wherein the desired position of said enclosure is outdoors.

75. The method of claim 60, wherein said enclosure is positioned within two meters of a termite colony.

76. The method of claim 60, wherein said emitting source includes at least one of: spent brewer's grain, or ground germinated corn seeds.

77. The method of claim 60, wherein said emitting source includes a material that is at least one of: charred or burned.

78. The method of claim 23, wherein said material includes at least one of: wood, a cellulosic matrix, a polymeric matrix, wood, paper, cardboard, a fabric, a textile, wool, silk, bone, hair, horn, or claws.

79. The method of claim 60, wherein said concentration is less than an amount to prevent movement of the termites.

80. The method of claim 60 further including a step of providing said enclosure below ground.

81. The method of claim 60, wherein said concentration is less than a concentration for inhibiting the termites from entering said enclosure.

82. The method of claim 60 wherein said concentration is in a range greater than 0.2% by volume.

83. The method of claim 60, wherein said enclosure is spaced apart from the structure approximately at least one meter.

84. The method of claim 60, wherein said openings have at least one dimension of approximately three millimeters.

85. The method of claim 60, wherein said enclosure is provided substantially below the ground when the at least one gas is emitted by said emitting source.

86. The method of claim 60, wherein said step of providing said emitting source includes providing one of: sodium bicarbonate, and spent grain extract.

87. The method of claim 86, wherein said emitting source includes spent grain extract.

88. The method of claim 60, wherein each of said openings moves correspondingly with a movement of said enclosure.

89. The method of claim 60, further including a step of transporting said enclosure so that said enclosure is more available for use at the location having the termites.

90. The method of claim 60, wherein said openings are not generated by termites.

91. The method of claim 60, wherein said enclosure is constructed of one or more of: plastic, glass, ceramic, and metal.

92. The method of claim 91, further including a step of providing said openings in said enclosure according to a predetermined design for said openings.

93. The method of claim 60, wherein at least a majority of said openings are positioned below ground.

94. The method of claim 60, wherein said emitting source includes a product derived from corn.

95. The method of claim 60, wherein said emitting source includes corn cob grits.

96. The method of claim 60, wherein said concentration attractions *Reticulitermes tibialis*.

97. The method of claim 60, wherein said concentration attracts *Reticulitermes flavipes*.

98. The method of claim 60, wherein said concentration attracts *Reticulitermes virginicus*.

99. A method to attract termites, comprising:
providing an enclosure having a plurality of openings for termites to pass therethrough;
providing an emitting source for emitting at least one gas of: (i) $CO_2$, and (ii) one or more mimics thereof;
wherein when said enclosure is in a desired position, at a location having the termites, with said emitting source in said enclosure, a concentration of said at least one gas is emitted from said openings so that when said concentration is encountered by the termites, the termites are attracted to said emitting source;
wherein said concentration is approximately at least 0.2% by volume of air, and said concentration is less than approximately 5% by volume of the air;
wherein said emitted concentration remains in an area about said enclosure so that the termites are attracted to said emitting source rather than to a structure sought to be protected from the termites; and
wherein said enclosure is, at least prior to being placed in the desired position, separate from the location having the termites.

100. The method of claim 99, wherein at least one of the following holds:
(a) said concentration is encountered by termites over a period of at least two weeks in an area large enough to reduce termite attraction to the structure;
(b) said concentration is in a range extending to about 5% by volume;
(c) said enclosure includes at least one of: hexaflumuron, or a pheromone;
(d) said enclosure is positioned within two meters of a termite colony;
(e) said enclosure is spaced apart from the structure approximately at least one meter;
(f) said openings have at least one dimension of approximately three millimeters; and
(g) said openings are not generated by termites.

101. The method of claim 100, wherein at least some of (a) through (g) hold.

102. The method of claim 100, wherein a majority of (a) through (g) hold.

103. The method of claim 100, wherein at least six of (a) through (g) hold.

104. The method of claim 100, wherein all of (a) through (g) hold.

105. The method of claim 99, wherein at least one of the following holds:
(a) said enclosure includes one of: bacterial, fungal, algal, and other microorganism formulations for generating said concentration;
(b) said emitting source includes at least one of: a carbonate or bicarbonate formulation;
(c) said emitting source includes at least one of: spent grain, or ground germinated corn seeds;
(d) said emitting source includes a material that is at least one of: charred or burned;
(e) said concentration is less than an amount to prevent movement of the termites; and
(f) said concentration is less than a concentration for inhibiting the termites from entering said enclosure.

106. The method of claim 105, wherein at least some of (a) through (f) hold.

107. The method of claim 105, wherein a majority of (a) through (e hold.

108. The method of claim 105, wherein at least five of (a) through (e hold.

109. The method of claim 105, wherein all of (a) through (f) holds.

110. The method of claim 99, wherein at least one of the following steps are performed:
(a) providing soil in said enclosure;
(b) providing in said enclosure at least one of: an insecticide, insect growth regulator, a feeding stimulant, another termite attractant, or a material that changes termite movement;
(c) positioning said enclosure within two meters of a termite colony;
(d) transporting said enclosure so that said enclosure is more available for use at the location having the termites;
(e) constructing said enclosure from one or more of: plastic, glass, ceramic, and metal; and
(f) providing said openings in said enclosure according to a predetermined design for said openings.

111. The method of claim 110, wherein at least some of (a) through (f) hold.

112. The method of claim 110, wherein a majority of (a) through (f) hold.

113. The method of claim 110, wherein at least five of (a) through (f) hold.

114. The method of claim 110, wherein all of (a) through (e hold.

115. The method of claim 99, wherein said concentration attracts at least one of *Reticulitermes tibialis*, *Reticulitermes flavipes*, and *Reticulitermes virginicus*.

116. A method for attracting termites, comprising:
providing, in an enclosure having an interior for containing an emitting source for emitting at least one gas of: (i) $CO_2$, and (ii) one or more mimics thereof;

providing, in said enclosure, a plurality of openings for said at least one gas to pass therethrough, and for the termites to pass therethrough;

wherein when said enclosure is in a desired position, at a location having the termites, with said emitting source in said enclosure, and at least most of said openings below ground, a concentration of said at least one gas is emitted from said openings below the ground so that when said concentration is encountered by the termites, the termites move toward said emitting source;

wherein said concentration is approximately at least four times a concentration of said at least one gas in an ambient atmosphere above the ground substantially at the location, and said concentration is less than approximately twenty-five times the concentration of said at least one gas in an ambient atmosphere above the ground substantially at the location, and said concentration remains about said enclosure, below ground, for at least two weeks; and wherein said enclosure is, at least prior to being placed in the desired position, separate from the location having the termites.

117. The method of claim 116, further including a step of transporting said enclosure so that said enclosure is more available for use at the location having the termites.

118. The method of claim 116, wherein said concentration is less than a concentration for inhibiting the termites from entering said enclosure.

119. The method of claim 116, wherein said openings are not generated by termites.

120. The method of claim 116, wherein said enclosure is constructed of one or more of: plastic, glass, ceramic, and metal.

121. The method of claim 116, wherein said enclosure includes at least one of: an insecticide, insect growth regulator, a feeding stimulant, or a termite attractant different from said at least one gas.

122. The method of claim 116, wherein said emitting source includes a product derived from corn.

123. The method of claim 116, wherein said emitting source includes corn cob grits.

124. A method to attract termites, comprising:

providing an enclosure having a plurality of openings for termites to pass therethrough, at least some of said openings defined through an exterior of the enclosure;

providing an emitting source for emitting at least one gas of: (i) $CO_2$, and (ii) one or more mimics thereof;

wherein when said enclosure is in a desired position, at a location having the termites, with said emitting source in said enclosure, a concentration of said at least one gas is emitted from said openings so that when said concentration is encountered by the termites, the termites are attracted to said emitting source;

wherein said concentration is approximately at least 0.2% by volume of air, and said concentration is less than an amount that is lethal to the termites;

wherein said emitted concentration remains in an area about said enclosure so that the termites are attracted to said emitting source rather than to a structure sought to be protected from the termites; and wherein said enclosure is, at least prior to being placed in the desired position, separate from the location having the termites.

125. The method of claim 124, wherein at least one of the following holds:

(a) said concentration is encountered by termites over a period of at least two weeks in an area large enough to reduce termite attraction to the structure;

(b) said concentration is in a range extending to about 5% by volume;

(c) said enclosure includes at least one of: hexaflumuron, or a pheromone;

(d) said enclosure is positioned within two meters of a termite colony;

(e) said enclosure is spaced apart from the structure approximately at least one meter;

(f) said openings have at least one dimension of approximately three millimeters; and (g) said openings are not generated by termites.

126. The method of claim 125, wherein at least some of (a) through (g) hold.

127. The method of claim 125, wherein a majority of (a) through (g) hold.

128. The method of claim 125, wherein at least six of (a) through (g) hold.

129. The method of claim 125, wherein all of (a) through (g) hold.

130. The method of claim 124, wherein at least one of the following holds:

(a) said enclosure includes one of: bacterial, fungal, algal, and other microorganism formulations for generating said concentration;

(b) said emitting source includes at least one of: a carbonate or bicarbonate formulation;

(c) said emitting source includes at least one of: spent grain, or ground germinated corn seeds;

(d) said emitting source includes a material that is at least one of: charred or burned;

(e) said concentration is less than an amount to prevent movement of the termites; and (f) said concentration is less than a concentration for inhibiting the termites from entering said enclosure.

131. The method of claim 130, wherein at least some of (a) through (f) hold.

132. The method of claim 130, wherein a majority of (a) through (f) hold.

133. The method of claim 130, wherein at least five of (a) through (f) hold.

134. The method of claim 130, wherein all of (a) through (f) hold.

135. The method of claim 124, wherein at least one of the following steps are performed:

(a) a step of providing soil in said enclosure;

(b) providing in said enclosure at least one of: an insecticide, insect growth regulator, a feeding stimulant, another termite attractant, or a material that changes termite movement;

(c) positioning said enclosure within two meters of a termite colony;

(d) transporting said enclosure so that said enclosure is more available for use at the location having the termites;

(e) said enclosure is constructed of one or more of: plastic, glass, ceramic, and metal; and (f) further including a step of providing said openings in said enclosure according to a predetermined design for said openings.

136. The method of claim 135, wherein at least some of (a) through (f) hold.

137. The method of claim 135, wherein a majority of (a) through (f) hold.

138. The method of claim 135, wherein at least five of (a) through (f) hold.

139. The method of claim 135, wherein all of (a) through (f) hold.

140. The method of claim 124, wherein one or more of the following hold:
 (a) at least some of said openings are approximately termite sized;
 (b) about 10% of the surface area of said enclosure comprises said openings; and
 (c) the termites are attracted through said openings by said emitting source.

141. The method of claim 124, wherein said concentration attracts at least one of *Reticulitermes tibialis, Reticulitermes flavipes,* and *Reticulitermes virginicus.*

* * * * *